(12) United States Patent
Greiner et al.

(10) Patent No.: US 10,723,442 B2
(45) Date of Patent: Jul. 28, 2020

(54) ADAPTIVE THRUST VECTOR UNMANNED AERIAL VEHICLE

(71) Applicant: FLIR Detection, Inc., Stillwater, OK (US)

(72) Inventors: Helen Greiner, Wayland, MA (US); Felipe Bohorquez, Cambridge, MA (US); Alexey Zaparovanny, Westford, MA (US); Kenneth D. Sebesta, Winchester, KY (US)

(73) Assignee: FLIR DETECTION, INC., Stillwater, OK (US)

( * ) Notice: Subject to any disclaimer, the term of this patent is extended or adjusted under 35 U.S.C. 154(b) by 80 days.

(21) Appl. No.: 15/870,727

(22) Filed: Jan. 12, 2018

(65) Prior Publication Data

US 2018/0155011 A1 Jun. 7, 2018

Related U.S. Application Data

(63) Continuation-in-part of application No. 15/316,011, filed as application No. PCT/US2015/033992 on Jun.
(Continued)

(51) Int. Cl.
*B64C 15/02* (2006.01)
*B64C 27/20* (2006.01)
(Continued)

(52) U.S. Cl.
CPC ............. *B64C 15/02* (2013.01); *B64C 27/20* (2013.01); *B64C 39/024* (2013.01); *B64D 1/22* (2013.01);
(Continued)

(58) Field of Classification Search
CPC .......... B64D 27/24; B64D 27/00; B64D 7/00; B64D 1/22; B64D 33/04; B64D 5/00; B64D 47/08; B64C 15/00; B64C 39/024; B64C 27/00; B64C 29/0025; B64C 29/02; B64C 37/00; B64C 11/001; B64C 29/0033; B64C 13/16; B64C 3/30; B64C 37/02;
(Continued)

(56) References Cited

U.S. PATENT DOCUMENTS

2011/0226174 A1* 9/2011 Parks .................. B60F 5/02
114/313
2012/0286102 A1* 11/2012 Sinha .................. B64C 15/00
244/7 B (Continued)

*Primary Examiner* — Behrang Badii
(74) *Attorney, Agent, or Firm* — Haynes and Boone, LLP

(57) ABSTRACT

A method for unmanned delivery of an item to a desired delivery location includes receiving, at an unmanned vehicle, first data representative of an approximate geographic location of the desired delivery location, receiving, at the unmanned vehicle, second data representative of a fiducial expected to be detectable at the desired delivery location, using the first data to operate the unmanned vehicle to travel to the approximate geographic location of the desired delivery location, upon arriving at the approximate geographic location of the desired delivery location, using the second data to operate the unmanned vehicle to detect the fiducial; and upon detecting the fiducial, using the fiducial to operate the unmanned vehicle to deliver the item.

31 Claims, 44 Drawing Sheets

Related U.S. Application Data 3, 2015, now abandoned, application No. 15/870,727, filed on Jan. 12, 2018, which is a continuation-in-part of application No. 14/581,027, filed on Dec. 23, 2014.

(60) Provisional application No. 62/446,785, filed on Jan. 16, 2017, provisional application No. 62/445,720, filed on Jan. 12, 2017, provisional application No. 62/007,160, filed on Jun. 3, 2014, provisional application No. 61/920,913, filed on Dec. 26, 2013.

(51) Int. Cl.

| | | |
|---|---|---|
| *B64C 39/02* | (2006.01) | |
| *G05D 1/10* | (2006.01) | |
| *B64D 1/22* | (2006.01) | |
| B64D 47/08 | (2006.01) | |
| B60K 1/00 | (2006.01) | |
| B64C 15/00 | (2006.01) | |
| B64C 1/30 | (2006.01) | |
| B64C 29/00 | (2006.01) | |
| B64C 27/08 | (2006.01) | |
| B64D 27/24 | (2006.01) | |

(52) U.S. Cl.
CPC ............... *G05D 1/102* (2013.01); *B60K 1/00* (2013.01); *B64C 1/30* (2013.01); *B64C 15/00* (2013.01); *B64C 27/08* (2013.01); *B64C 29/0025* (2013.01); *B64C 2201/027* (2013.01); *B64C 2201/042* (2013.01); *B64C 2201/104* (2013.01); *B64C 2201/108* (2013.01); *B64C 2201/123* (2013.01); *B64C 2201/127* (2013.01); *B64C 2201/128* (2013.01); *B64C 2201/141* (2013.01); *B64C 2201/145* (2013.01); *B64D 27/24* (2013.01); *B64D 47/08* (2013.01)

(58) Field of Classification Search
CPC ..... B64C 15/02; B64C 23/069; B64C 23/076; B64C 5/02; B64C 3/56; B64C 39/10; B64C 39/026; B64C 27/20; B64C 1/22; B64C 2201/027; B64C 2201/042; B64C 2201/104; B64C 2201/108; B64C 2201/123; B64C 2201/127; B64C 2201/128; B64C 2201/141; B64C 2201/145; B63G 8/08; B63G 8/001; B60K 1/00; B60K 1/04; B60K 7/0007; B60K 17/356; H04N 5/23248; H04N 5/38; H04N 5/23238; H04N 7/00; B60F 5/02; B60F 3/0061; G05D 1/0044; G05D 1/0094; G05D 1/102; G05D 1/0066; A63H 17/00; A63H 27/12; A63H 33/003; B63H 21/17; H04L 65/1006; F42B 15/20; A61B 50/31; G16H 40/67; G08G 5/0013; G08G 5/0039; G08G 5/0069; G08G 5/0082; G01S 7/024; G01S 7/4052; G01S 7/38; G01S 13/933; H01Q 15/23; H01Q 15/22

See application file for complete search history.

(56) References Cited

U.S. PATENT DOCUMENTS

| | | | |
|---|---|---|---|
| 2014/0061376 A1* | 3/2014 | Fisher ................. | B64D 27/24 244/62 |
| 2015/0259066 A1* | 9/2015 | Johannesson ........... | B64C 27/08 244/17.27 |

\* cited by examiner

Multicopter

Multicopter + propeller

Multicopter + propeller
+ lifting surface

| Configuration | Mass (lbs) | Hover power (W) | Cruise Power (W) | Range (Km) | Range (Mi) |
|---|---|---|---|---|---|
| Multicopter | 22.5 | 1385 | 1540 | 10.5 | 6.5 |
| Multicopter + pusher prop | 23.5 | 1460 | 1350 | 16 | 10 |
| Multicopter + pusher prop + wing | 25 | 1580 | 965 | 22.5 | 14 |

FIG. 18J

ADAPTIVE THRUST VECTOR UNMANNED AERIAL VEHICLE

CROSS-REFERENCE TO RELATED APPLICATIONS

This application claims priority to U.S. application Ser. No. 14/581,027 filed on Dec. 23, 2014 which claims priority to U.S. Provisional Application Ser. No. 61/920,913, filed Dec. 26, 2013, and is also a continuation-in-part of U.S. application Ser. No. 15/316,011 filed on Dec. 2, 2016 which claims priority to International Application Number PCT/US2015/033992, filed Jun. 3, 2014, and U.S. Provisional Application No. 62/007,160 filed Jun. 3, 2014, and further claiming priority to U.S. Provisional Application No. 62/445,720 filed Jan. 12, 2017, and U.S. Provisional Application No. 62/446,785 filed Jan. 16, 2017, the entire contents of these applications being incorporated herein by reference.

BACKGROUND

This invention relates to unmanned delivery of items to specified locations using unmanned aerial vehicles (UAVs).

Traditionally, delivery companies such as UPS and FedEx deliver items to customers using delivery vehicles (e.g., trucks) which are operated by delivery people. The delivery vehicles travel a predetermined route and deliver packages to customer locations along the route. At the customer location, the delivery person verifies that the delivery location (e.g., customer address) is correct and then leaves the package in a safe place at the delivery location.

In recent years the use of UAVs has become widespread, particularly in military and recreational applications. Until recently, commercial use of UAVs was limited due to the technological constraints of UAVs (e.g., limited range, poor reliability, etc.) as well as the relatively high cost of UAVs.

Due to advances in technology and an increased prevalence of UAVs, UAVs are becoming cost effective and sufficiently reliable for use in commercial applications.

At the same time, there is a need for a cost effective, efficient means of delivering items to customers over the last miles between a delivery hub/fulfillment center and the customer's location.

Many groups have proposed using drones for delivery. Recently, Amazon has presented the idea of delivering packages to customer locations over the last mile using autonomous multi-rotor vehicles. It is unclear how the vehicles employed by these groups accurately maneuvers the drones to deliver items, verify that the delivery location is correct, or decide where to safely leave packages.

SUMMARY

Preferred embodiments of unmanned aerial vehicles described herein relate to systems and methods for navigating aerial vehicles to transport objects. Such battery powered UAVs can include multi-rotor systems that can both hover and fly with one or more rotors oriented to propel the vehicle in one direction. Aerodynamic flights surfaces can provide lift and steering functions. In certain embodiments, the UAV comprises a plurality of hover rotors, and one or more propelling rotors that can be vertically oriented or tilted to drive the UAV in a selected direction. The UAV can be steered using the hovering rotors which can be selectively driven and/or oriented or can be used with flight control surfaces on the spars or wings of the UAV to adjust the direction of flight. A navigation device on the UAV can be used to control flight operations as described herein. One or more processors on the UAV can be programmed to automate the delivery of objects In an aspect, in general, a method for unmanned delivery of an item to a desired delivery location includes receiving, at an unmanned vehicle, first data representative of an approximate geographic location of the desired delivery location, receiving, at the unmanned vehicle, second data representative of a fiducial expected to be detectable at the desired delivery location, using the first data to operate the unmanned vehicle to travel to the approximate geographic location of the desired delivery location, upon arriving at the approximate geographic location of the desired delivery location, using the second data to operate the unmanned vehicle to detect the fiducial, and upon detecting the fiducial, operating the unmanned vehicle to travel to the delivery location and deliver the item.

Aspects may include one or more of the following features.

The fiducial may be selected from a group including a two-dimensional code, a QR code, or a bar code. Using the second data to operate the unmanned vehicle to detect the fiducial may include capturing images using a camera mounted on the unmanned vehicle and processing the captured images to determine if the fiducial is represented in the images. Operating the unmanned vehicle to deliver the item may include operating a winch mounted on the unmanned vehicle to lower the item to the ground. Prior to operating the winch to lower the item to the ground, the unmanned vehicle may determine whether any obstructions are present in the delivery location.

Delivery of the item to the delivery location may be aborted if the unmanned vehicle determines that obstructions are present in the delivery location. Operating the unmanned vehicle to deliver the item may include causing the vehicle to drop the item into a receptacle. The receptacle may be configured to soften the landing of the item. Operating the unmanned vehicle to deliver the item may include landing at the delivery location and then dropping the item at the delivery location. The method may also include notifying a customer that the item has been delivered to the delivery location after delivering the item to the delivery location. Notifying the customer may include one or more of sending an email to the customer or sending a text message to the customer.

The first data representative of an approximate geographic location of the desired delivery location may be determined from a mapping of street addresses to global positioning system coordinates. Using the first data to operate the unmanned vehicle to travel to the approximate geographic location of the desired delivery location may include notifying a customer of an estimated time of arrival of the item at the delivery location. Notifying the customer may include one or more of sending an email to the customer or sending a text message to the customer. The fiducial may include a radio-frequency beacon. The radio-frequency beacon may include a near-field communication radio frequency signal.

Receiving the first data representative of an approximate geographic location of the desired delivery location may include receiving the first data from a mobile device and using the second data to operate the unmanned vehicle to detect the fiducial may include detecting the fiducial as generated from the mobile device. The method may also include updating the first data representative of an approximate geographic location of the desired delivery location as the mobile device moves. The fiducial may be a permanently installed fiducial associated with the delivery location. The fiducial may be a user-printed fiducial.

In another aspect, in general, a method for unmanned delivery of an item to a desired delivery location includes receiving, at an unmanned vehicle, first data representative of an approximate geographic location of the desired delivery location, receiving, at an unmanned vehicle, second data including a mapping of wireless network identifiers to representations of geographic locations, using the first data to operate the unmanned vehicle to travel to the approximate geographic location of the desired delivery location, and upon arriving at the approximate geographic location of the desired delivery location, using the second data to operate the unmanned vehicle to travel to the delivery location and deliver the item.

Using the second data to operate the unmanned vehicle to travel to the delivery location may include determining the delivery location using triangulation of a plurality of wireless networking signals in an area of the delivery location.

In another aspect, in general, an unmanned aerial vehicle for delivery of a package includes a fuselage including a package bay and a lifting surface, a plurality of rotors affixed to the fuselage, wherein the unmanned aerial vehicle is operable in a first mode with the rotors operating in a substantially horizontal configuration, and the unmanned aerial vehicle is operable in a second mode with at least some of the rotors operating in a substantially vertical configuration.

In the exemplary embodiment, the unmanned vehicle is a multi-rotor vehicles (e.g. quadcopters, hexacopters, octocopters). The multi-rotor vehicles generally have motors rigidly mounted to the airframe and control vehicle motion by adjusting thrust of individual motors based on an idealized model of all motors generating thrust in the vertical direction. This makes for a system which can only be controlled in roll, pitch, yaw, and net thrust. Such a multi-rotor vehicle can move in space by holding a particular roll or pitch angle and varying the net thrust. This approach can lead to system instability as the vehicle hovers. Hover quality can be improved by controlling each axis independently of the vehicle's roll and pitch.

Approaches described herein use a hybrid multicopter configuration that uses a propeller in the vertical plane for propulsion and a lifting surface to supplement the rotors in forward flight. Configurations include a simple multicopter, a multicopter with a pusher prop, and a multicopter with pusher prop and a lifting surface. Each configuration includes a performance analysis.

Approaches described herein employ thrusters which are mounted to a multi-rotor helicopter frame of the unmanned aerial vehicle with dihedral and twist. That is, the thrust directions are fixed, and not all parallel. Each thruster generates an individual thrust line which is generally not aligned with the thrust lines of other thrusters. Free-body analysis yields the forces and moments acting on the body from each thruster. The forces and moments are summed together to produce a unique mapping from motor thrust to net body forces and moments. A desired input including roll, pitch, and yaw moments and forward, lateral, and vertical thrusts can be received and used to calculate the necessary change in motor thrusts, and thus by extension motor speeds, to achieve the desired input.

Approaches described herein use statically mounted thrusters to develop net thrusts (e.g., a net horizontal or vertical thrust) without changing the net roll, pitch, and yaw torques.

Approaches described herein use statically mounted thrusters to develop net moments without changing net thrusts generated by the motors. A further embodiment provides for the mounted thrusters to change direction to provide a plurality of flight modes. A fine adjustment of thruster direction can be included for a plurality of thrusters or all the thrusters. A plurality of services can be used to provide fine direction adjustment within a plane of within a cone. A plurality of the thrusters can each include a second motor to rotate the associated thruster between two or more flight modes as described in greater detail herein.

In an aspect, in general, an aerial vehicle includes a body having a center and a number of spatially separated thrusters. The spatially separated thrusters are statically coupled to the body at locations around the center of the body and are configured to emit thrust along a number of thrust vectors. The thrust vectors have a number of different directions with each thruster configured to emit thrust along a different one of the thrust vectors. One or more of the thrust vectors have a component in a direction toward the center of the body or away from the center of the body.

The thrust vectors may be emitted in six different directions. The thrust vectors may be emitted in eight different directions. The thrust vectors may be emitted in ten different directions. The thrusters may be distributed symmetrically about the center of the body. The thrusters may be distributed on a plane defined by the body.

All of the thrust vectors may have a shared primary component in a first direction. The first direction is may be a vertical direction. The aerial vehicle may include a controller configured to receive a control signal characterizing a desired spatial position for the aerial vehicle and a desired spatial orientation for the aerial vehicle, determine a net force vector and a net moment vector based on the received control signal, and cause the thrust generators to generate the net force vector and the net moment vector. The controller may be further configured to cause the thrust generators to vary the net force vector while maintaining the net moment vector. The controller may be further configured to cause the thrust generators to vary the net moment vector while maintaining the net force vector. The body may include a number of spars and each thruster of the number of thrusters is statically coupled to an end of a different one of the spars.

Each thruster may include a motor coupled to a propeller or turbine. The motors of a first subset of the number of thrusters may rotate in a first direction and the motors of a second subset of the number of thrusters may rotate in a second direction, different from the first direction. The motors for all of the thrusters may rotate in a same direction. The motors of a first subset of the number of thrusters may have a first maximum rotational velocity and the motors of a second subset of the number of thrusters may have a second maximum rotational velocity, less than the first maximum rotational velocity. At least some of the thrusters may be coupled to the body at a dihedral angle relative to the body and/or at least some thrusters may be coupled to the body at a twist angle relative to the body.

The aerial vehicle may include an imaging sensor coupled to the body. The aerial vehicle may include an aerodynamic body covering disposed on the body. The imaging sensor may be statically coupled to the body. The imaging sensor may be coupled to the body using a gimbal. The imaging sensor may include a still camera. The imaging sensor may include a video camera.

In some aspects, the aerial vehicle is configured to maintain a desired spatial orientation while at the same time generating a net thrust that varies in magnitude and/or direction). In some aspects, a sensor such as a still or video camera is statically coupled to the multi-rotor vehicle and an orientation of the vehicle is maintained such that the camera remains pointed in a given direction while the net thrust vector generated by the vehicle causes the vehicle to move in space. Note that the sensor can comprise the camera, the IMU, the GPS sensor, the pressure sensor, or other sensors that control flight operation. The control system can include a processor that computes updated motor speeds and twist angles.

Preferred embodiments employ a control system that communicates with an external flight management system to control flight operations of the unmanned aerial vehicle. The control system on the unmanned aerial vehicle can comprise a system-on-chip (SOC) that includes one or more integrated circuits having one or more memories to process sensor data and stored instructions regarding flight path, payload operation and numerous flight control operations as described herein. The one or more integrated circuits can include field programmable gate arrays (FPGA) and/or application specific integrated circuits (ASIC).

Among other advantages, certain aspects employ a first navigation technology to travel to an approximate area of a delivery location and then use a second navigation technology to very accurately travel to the exact delivery location. Approaches allow for a decoupling of the positional control of the multi-rotor helicopter from the rotational control of the multi-rotor helicopter. That is, the position of the multi-rotor helicopter can be controlled independently of the rotation of the multi-rotor helicopter. The system can include a plurality of rotor tilt positions including a parallel axis mode, a multi-axis mode, and a flight mode in which a plurality of rotors are tiled for forward flights.

Dynamic in-air stability is improved using the multi-axis mode in which the thrust vectors of each motor are oriented on different axes. The number of parts necessary to orient a camera at a given angle is reduced. This leads to cheaper, more robust models that perform better in a wide variety of conditions.

By using motors that all rotate in the same direction, the number of unique parts required to build the aerial vehicle is reduced, resulting in a reduced cost for the aerial vehicle.

By using motors that may rotate in different directions, stability, desired spatial positioning, and desired spatial orientation for the multi-rotor helicopter is improved, resulting in an improved ability to deliver items.

Other features and advantages of the invention are apparent from the following description, and from the claims.

DESCRIPTION OF DRAWINGS

FIGS. 18A-18J describe hybrid multicopter configurations and performance analysis of the hybrid multicopter configurations.

DESCRIPTION

Figure 1:
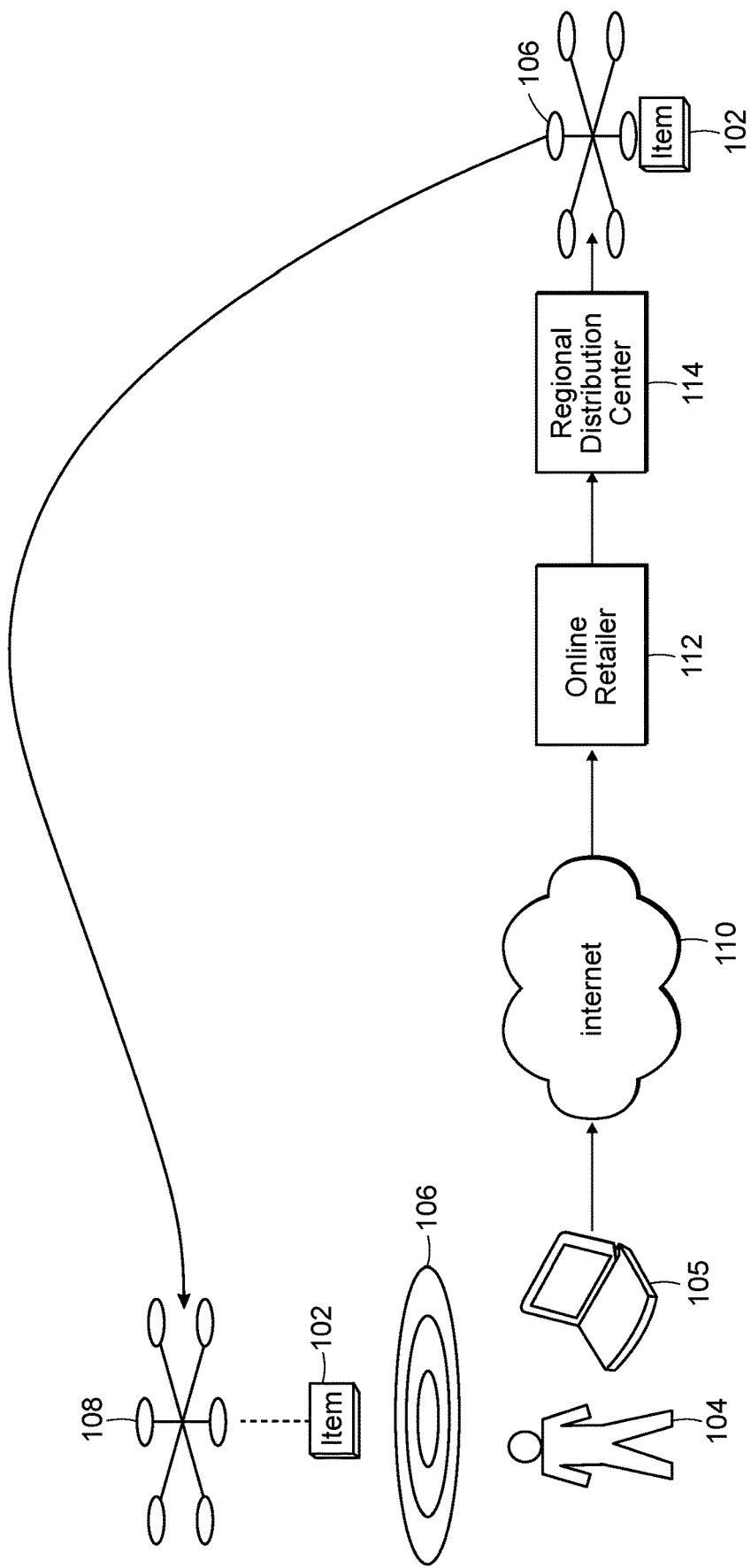
FIG. 1 is an unmanned vehicle delivery system.

Referring to FIG. 1, an unmanned vehicle delivery system 100 receives an order for an item 102 from a user 104 via, for example, a computer 105. Using information included in the order, the system 100 delivers the item 102 to a delivery location 106 specified by the user 104 using an unmanned delivery vehicle 108 (e.g., an unmanned aerial vehicle).

When the user 104 places the order, the order is transmitted over a network 110 (e.g., the internet) to a retailer (e.g., an online retailer) 112 where the order is initially processed. After initially processing the order, the retailer 112 sends order information to a regional distribution center 114 which is located in the same geographical region as the delivery location 106. At the regional distribution center 114, the item 102 is attached to the unmanned delivery vehicle 108. The unmanned delivery vehicle 108 is also programmed with instructions (e.g., GPS coordinates associated with the delivery location 106) for delivering the item to the delivery location 106.

Once the unmanned delivery vehicle 108 has the item 102 attached thereto and is programmed with instructions for delivering the item 102 to the delivery location 106, the unmanned delivery vehicle 108 launches and delivers the item 102 to the delivery location 106.

After delivering the item 102, the unmanned delivery vehicle 108 returns to the regional distribution center 114 where it retrieves another item, is reprogrammed, and repeats the delivery process.

While the general unmanned delivery process described above seems simple, a number of challenges to the process exist. The examples described in detail below address the challenges to the unmanned delivery process and improve the overall performance of the process.

Figure 2:
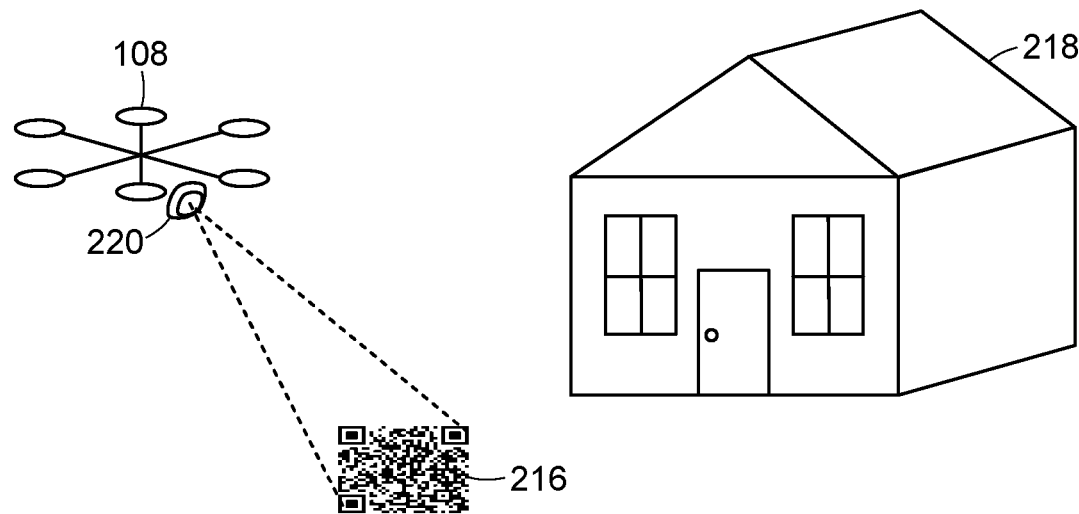
FIG. 2 is an unmanned vehicle detecting a fiducial.

Referring to FIGS. 1 and 2 when a customer orders an item as described in FIG. 1, the customer provides a shipping address (i.e., the address where they want their item delivered). The retailer then provides the customer with a printable fiducial 216. In some examples, the printable fiducial 216 is in the form of a QR code or a bar code which is specific to the customer (and possibly unique to the order). The online retailer then instructs the customer to print the fiducial 216 and to place it outdoors in a location where they want their item to be delivered (i.e., the delivery location 106). In some examples, the online retailer also instructs the customer to place the fiducial 216 in a location that is easily accessible by a UAV 108 (e.g., a location unobstructed by trees, fences, power lines, and so on). The customer prints the fiducial 216, places the printed fiducial 216 in a location outside of their house 218, and waits.

At the same time at the regional distribution center 114 near the customer's house 218, a package including the customer's item 102 is loaded onto an unmanned aerial vehicle (UAV) 108 (e.g., a multi-rotor UAV) and the UAV 108 is programmed to fly to a Global Positioning System (GPS) coordinate associated with the customer's address. In some examples, the GPS coordinate is obtained from a mapping service such as Google Maps which approximately maps GPS coordinates to street addresses.

Once programmed, the UAV 108 leaves the regional distribution center 114 and flies toward the GPS coordinate associated with the customer's address. When the UAV 108 reaches the GPS coordinate, the UAV 108 begins to fly around the GPS coordinate in an efficient manner. At the same time, a camera 220 on board the UAV 108 is activated and begins taking still photographs or video of the surrounding area. An image processor processes the photographs or video to determine whether the fiducial 216 is present in the photographs or video.

Figure 3:
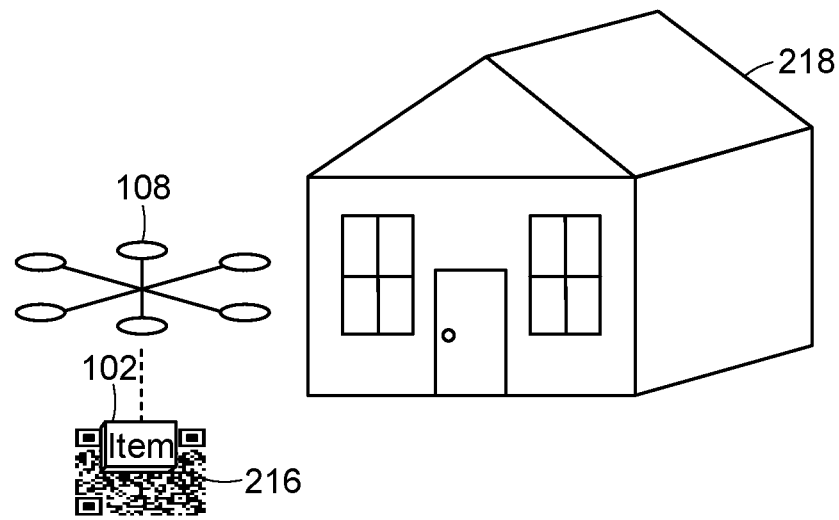
FIG. 3 is an unmanned vehicle delivering a package onto a fiducial.

Referring to FIG. 3, once the fiducial 216 is detected, the UAV 108 flies toward the fiducial 216 until the UAV 108 is directly above the fiducial 216. The UAV 108 then flies to a sufficiently low altitude such that it can safely deliver (e.g., drop) the package including the customer's item 102 onto the fiducial 216.

Once the package has been delivered, the UAV 108 flies back to the regional distribution center 114 where it retrieves the next customer's package and the delivery process repeats.

In some examples, rather than having a customer print out a fiducial 216 for each order, the customer may have a permanent fiducial 216 installed at their location. For example, a customer could install a tile mosaic which appears to be decorative but is actually a re-usable and weatherproof fiducial 216 for UAV delivery.

In some examples, the package is connected to a winch on the UAV 108. When the UAV 108 arrives above the fiducial 216, the package is lowered onto the fiducial 216 using the winch. The package is then disconnected from the winch and the winch is retracted before the UAV 108 returns to the regional distribution center. In some examples, if there is a person, animal, or some other object which could potentially be harmed by the lowering of the package, the UAV 108 will not lower the package. In some examples, the package is not lowered onto the fiducial 216 but is instead lowered onto a visual map point.

In some examples, rather than dropping the package onto the fiducial 216 or winching the package down to the fiducial 216, the UAV 108 simply lands on the fiducial 216 and places the package on the fiducial 216.

In general, it is not a strict requirement that the package end up directly on the fiducial 216. For examples, there may be an acceptable margin of error (e.g., a 5 ft. radius around the fiducial) for placement of the package on or around the fiducial 216.

In some examples, once the package is delivered, the UAV 108 causes a text message, an email, or some other suitable notification to be sent to the customer, indicating that their package has been delivered.

In some examples, as the UAV 108 travels to the customer's location, the UAV 108 communicates with the regional distribution center such that an estimated time of delivery is continually updated. This estimated time of delivery can be provided to the user via any number of communications means (e.g., text message, email, the online retailer's website, and so on).

In some examples, the presence of a fiducial 216 can be used to easily verify that the delivery location is correct and determine where to safely leave packages.

Presently, if a person wants to purchase an item, they generally need to either order the item and wait a number of days for the item to be delivered or go out to a store and buy the item there. If a person is out of their home, wants the instant gratification of immediately obtaining an item, and is unable or unwilling to go to a store, they currently have no way of obtaining their item. For example, a person walking around a city may want to purchase a drink for immediate consumption but may not have the time or the desire to walk to a convenience store to purchase the drink. This person would have no way of obtaining their drink.

Figure 4:
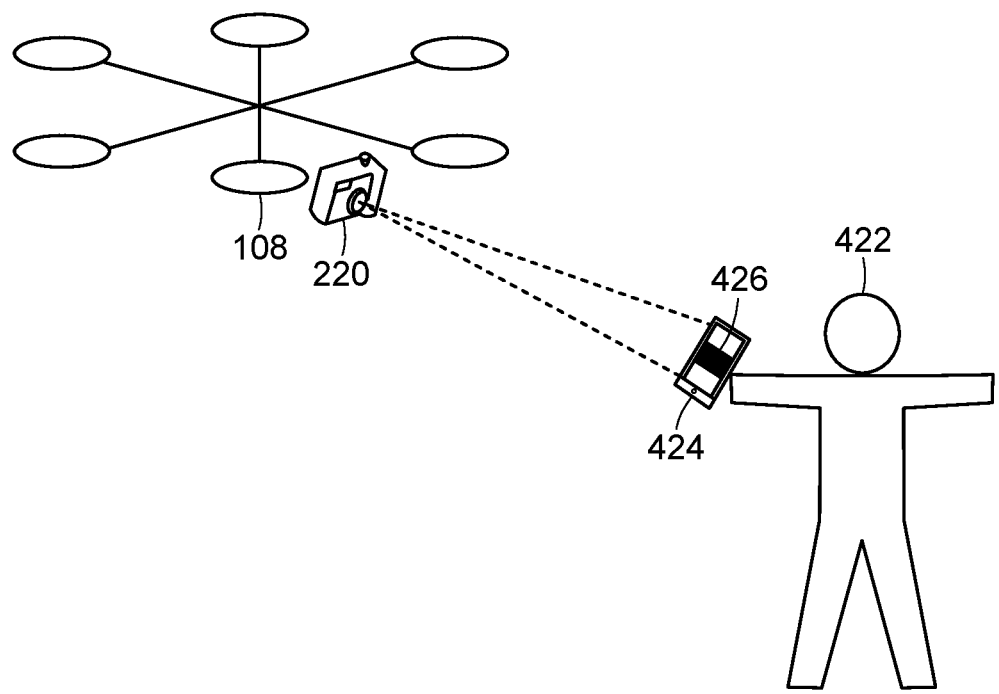
FIG. 4 is an unmanned vehicle detecting a fiducial on a customer's mobile device.
Figure 5:
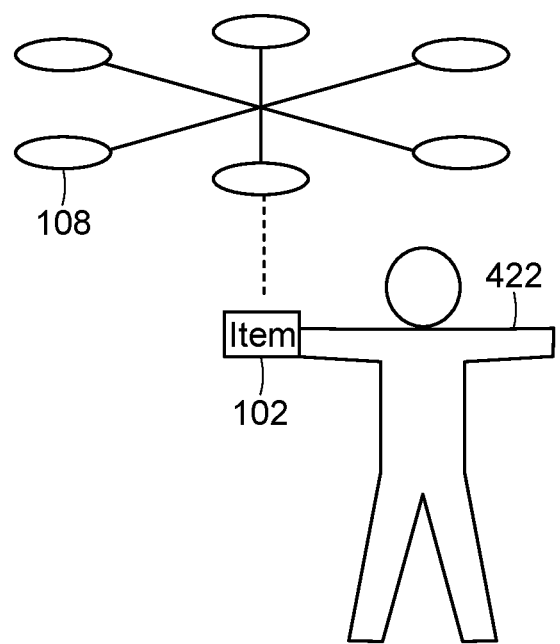
FIG. 5 is an unmanned vehicle delivering a package to a customer.

Referring to FIGS. 4 and 5, in some examples, items can be ordered by a customer 422 using, for example, a mobile device 424 and delivered by an unmanned aerial delivery vehicle 108 (UAV) directly to the customer 422 at the location of their mobile device 424 without ever requiring the UAV 108 to land.

When the customer 422 places their order, order information is sent from their mobile device 424 to a retailer 112 and then to a regional distribution center 114. In some examples, the order information includes an identifier of the ordered item 102 and a location of the customer 422 (e.g., a GPS coordinate of the customer 422).

At the distribution center 114, the ordered item 102 is loaded onto a delivery UAV 108 and the customer's GPS coordinate is programmed into the delivery UAV 108.

Once programmed, the UAV 108 leaves the distribution center 114 and flies toward the GPS coordinate associated with the customer 422. When the UAV 108 reaches the GPS coordinate, the UAV 108 begins to fly around the GPS coordinate in an efficient manner.

At the same time, a validation system included in the UAV 108 searches for a validation beacon 426 associated with the customer 422. In some examples, the validation beacon 426 is a fiducial such as a QR code or bar code displayed on the screen of the customer's mobile device 424. In this case, a camera 220 on board the UAV 108 takes still photographs or video of the surrounding area as the UAV 108 flies around the GPS coordinate. An image processor processes the photographs or video to determine whether the fiducial 426 is present in the photographs or video. Once the fiducial 426 is detected, the UAV 108 flies toward the fiducial until the UAV 108 is directly above the fiducial 426 (and presumably the customer 422). The UAV 108 then flies to a sufficiently low altitude such that the item 102 can be safely delivered to the customer 422.

In other examples, the validation beacon is a near-field communications signal such as a Bluetooth signal, a WiFi signal, or an infrared signal. In this case, a sensor such as a Bluetooth, WiFi, or infrared sensor monitors the environment as the UAV 108 flies around the GPS coordinate. When the UAV 108 detects the validation beacon signal the UAV 108 flies in such a way that the received signal strength is maximized. At this point the UAV 108 is presumably closest to the customer 422. The UAV 108 then flies to a sufficiently low altitude such that the item can be safely delivered to the customer 422.

In some examples, the UAV 108 delivers the package by flying to an altitude where the customer 422 can grab their item from the UAV 108. In some examples, the package is touch sensitive such that the customer 422 can touch the package and trigger a release mechanism on the UAV 108, releasing the package. For example, the package or the payload bay mechanism may be provided with a capacitive sensor which triggers a release mechanism on the UAV 108.

In some examples, rather than directly handing the package to the customer 422, the UAV 108 includes a winch which winches the package down to the customer 422. Such a winching scheme can increase the distance between the customer 422 and the UAV 108, thereby increasing the safety of the transaction. In some examples, if there is a person, animal, or some other object which could potentially be harmed by the lowering of the package, the UAV 108 will not lower the package. In some examples, the UAV 108 lowers the package onto a point away from but in a vicinity of a person.

In some examples, the customer 422 may be on the move and the customer's mobile device 424 can continually update the UAV 108 with the customer's current GPS coordinate. In this way, the customer's location can be tracked by the UAV 108 and the customer 422 doesn't have to wait in one location for their delivery.

In some examples, the UAV 108 includes an on-board camera 220 which captures still photographs or videos as the UAV 108 flies. When the UAV 108 approaches the customer 422 to make its delivery, a people detection algorithm analyzes the still photographs or videos and recognizes people in the vicinity of the UAV 108. The UAV 108 then plots a flight path which avoids the recognized people. In some examples, the people detection algorithm or a facial detection algorithm can be used to identify the customer 422. For example, the customer 422 provides the retailer 112 with a "selfie" or photograph of the customer 422. When the UAV 108 arrives at the delivery location, the UAV 108 implements facial recognition and tracking using the on-board camera 220 to identify the customer 422. In this way, the UAV 108 can fly to a position near the customer 422 and make its delivery, even in a crowd of people. Note that image processing and other navigational computation processes can be performed by the on-board image processor, by a ground station control system, or using land based computing procedurals using remote servers, processors, and databases.

Once the package has been delivered, the UAV 108 flies back to the distribution center where it retrieves the next customer's package and the delivery process repeats.

In some examples, a customer 422 may order an item and provide a GPS coordinate, other than their own, to which the item should be delivered. For example, a customer 422 may purchase an item for their friend and provide their friend's GPS coordinate as the delivery destination. The friend is then sent an indication (e.g., an email or a text message) that the item is being delivered to them. When the item arrives, the friend can validate that the order is for them using any of the validation techniques described above (e.g., presenting a QR code on their mobile device).

Mappings of street addresses to GPS coordinates are currently in existence. One example of such a mapping is included in the Google Maps application. These mappings are generally approximate in nature and are not sufficiently accurate to be useful for automated delivery of items to a specific location at an address.

Furthermore, once an automated delivery vehicle (e.g., a UAV 108) reaches a GPS coordinate associated with a customer's address, there is no way to validate that the GPS coordinate is actually associated with the customer's address.

In this example, existing aerial photography (e.g., satellite images from, e.g., Google Maps) is used to identify a preferred delivery location.

Figure 6:
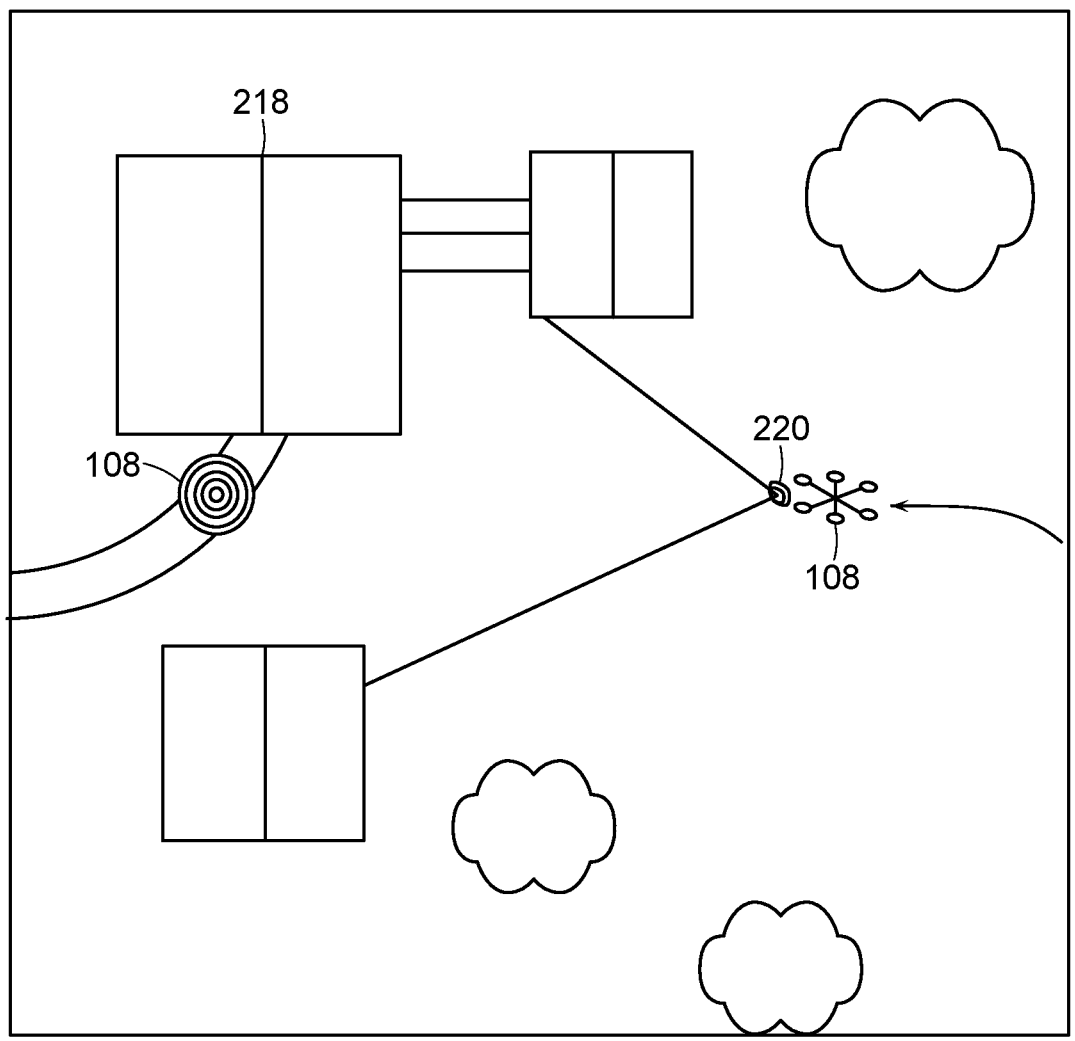
FIG. 6 is an unmanned vehicle performing visual location matching.

Referring to FIGS. 1 and 6, when a customer orders an item from, for example, an online retailer's website, the customer provides a shipping address (i.e., the address where they want their item delivered). The customer is also prompted to select a desired delivery location 106 on a map by placing an icon (e.g., a bullseye or an arrow) on an image of his/her house 218 derived from aerial or satellite imagery, for example, the icon could be placed in the center of a path, a backyard, a driveway, etc.

Subsequently, at a regional distribution center 114 near the customer's house 218, a package including the customer's item is loaded onto a UAV 108 (e.g., a multi-rotor UAV) and the UAV 108 is programmed to fly to a GPS coordinate associated with the desired delivery location 106. In some examples, the GPS coordinate is obtained from a mapping service such as Google Maps.

Once programmed, the UAV 108 leaves the regional distribution center 114 attempts to fly to a position above the specified location 106 or an offset from the specified location 106 and it gets there within the GPS/map registration accuracy. Once the UAV 108 has reached the GPS coordinate associated with the delivery location 106, the UAV 108 is ostensibly in range to capture imagery around the delivery location 106. From this point the UAV 108, augments its navigation with visual imagery by comparing its real time imagery (acquired using a camera 220) with the imagery associated with the user-specified delivery location 106 (e.g., Google Maps imagery). For example, the UAV 108 matches features in the terrain captured in its real time imagery with features from the map, allowing the UAV 108 to hover over a location that is much closer to the user-specified delivery location 106. The UAV 108 then either lands and makes the drop or lowers the package, including the customer's item onto the user-specified delivery location 106.

Once the package has been delivered, the UAV 108 flies back to the regional distribution center 114 where it retrieves the next customer's package and the delivery process repeats.

In some examples, the SSID associated with the customer's WiFi network is also programmed into the UAV 108 making it easier to get into range to see the delivery location 106. In some examples, WiFi signals emitted by access points in and/or around a customer's house 218 can also be used to accurately deliver an item to a delivery location 106 specified by the customer and to validate that the delivery location 106 is correct.

In some examples, the customer selects the desired delivery location 106 by pointing to it (mouse of touchscreen) on an aerial image.

One advantage of this approach is that using terrain map in addition to a GPS system (and in some cases a WiFi signal) can result in highly accurate delivery of the customer's item to a customer designated delivery location 106.

Another advantage of this approach is that imagery can be used to validate that the package is placed where the customer wants it to a greater precision than if GPS alone were used.

In some examples, when the customer places their order, a GPS coordinate associated with specific location on the customer's property (e.g., the customer's doorstep) is provided to the retailer's website. The UAV 108 can then deliver the customer's item to this specific location using the above-described combination of GPS and vision based positioning systems.

In some examples, trees, houses, and large objects can be identified a-priori on the map and then used to geo-reference locally at the delivery site.

As is described above, mappings of street addresses to GPS coordinates such as those included in the Google Maps application are generally approximate in nature and are not sufficiently accurate to be useful for automated delivery of items to a specific location at an address. For situations where GPS is not sufficiently accurate or is unreliable, companies such as Google, Skyhook, and Navizon have developed WiFi positioning systems which rely on a mapping of wireless access points to GPS coordinates. In some examples, WiFi positioning systems use these mappings to triangulate a location of a device (e.g., a smart phone or a UAV) based on a measured received signal strength from a number of access points which are both in the vicinity of the device and represented in the mapping.

Furthermore, once an automated delivery vehicle (e.g., a UAV 108) reaches a GPS coordinate associated with a customer's address, there is no way to validate that the GPS coordinate is actually associated with the customer's address.

To solve these problems, WiFi signals emitted by access points in and/or around a customer's house 218 can be used to accurately deliver an item to a location 106 specified by the customer and to validate that the delivery location 106 is correct.

Figure 7:
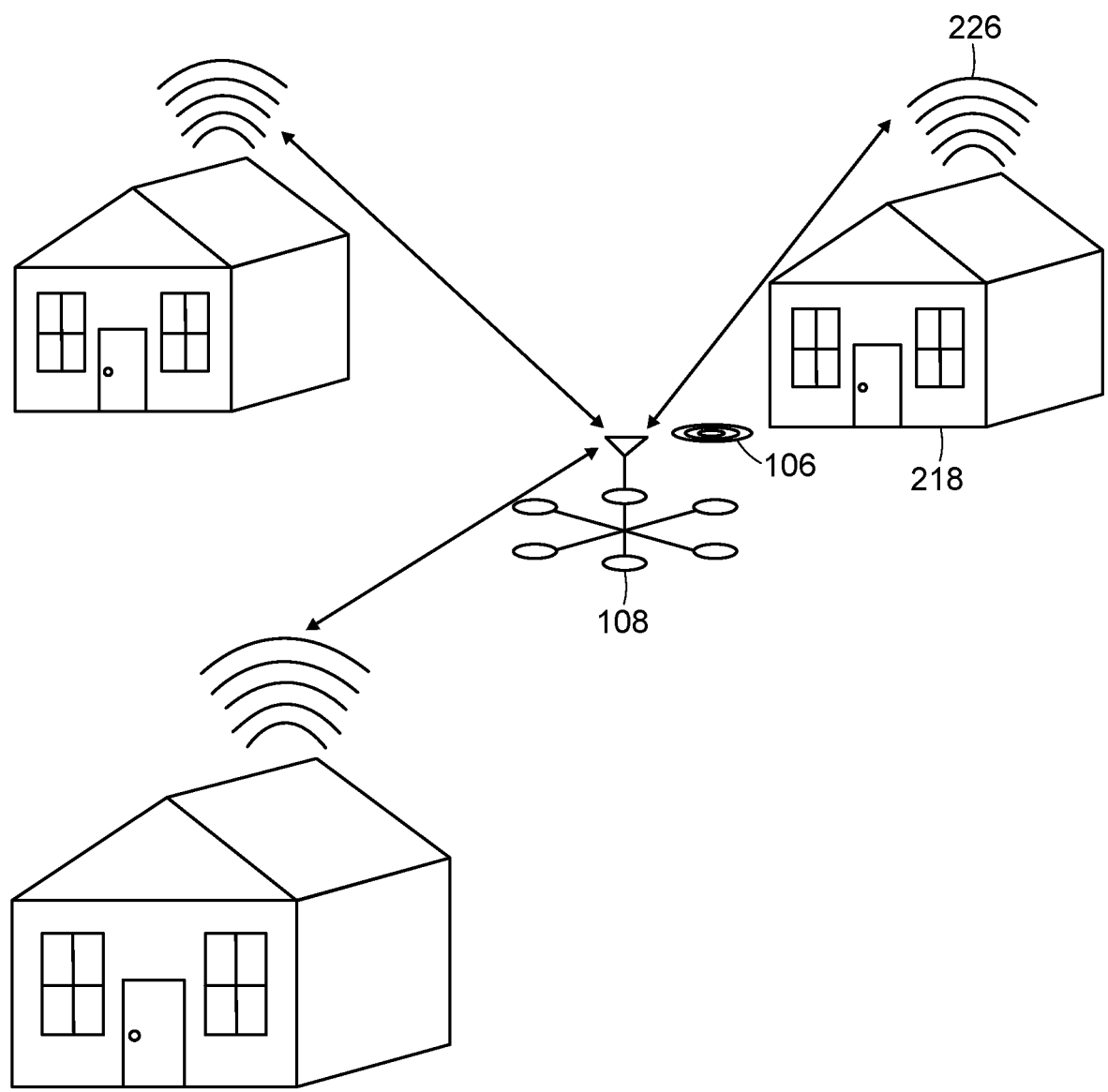
FIG. 7 is an unmanned vehicle navigating using WiFi signals.

Referring to FIGS. 1 and 7 when a customer orders an item 102 from, for example, an online retailer's website, the customer provides a shipping address (i.e., the address where they want their item delivered). In some examples, identifying information related to the customer's WiFi network 226 (e.g., the Service Set Identifier (SSID) for their WiFi network) is also provided to the retailer's website.

Subsequently, at a regional distribution center 114 near the customer's house 218, a package including the customer's item 102 is loaded onto a UAV 108 (e.g., a multi-rotor UAV) and the UAV 108 is programmed to fly to a GPS coordinate associated with the customer's address. In some examples, the GPS coordinate is obtained from a mapping service such as Google Maps which approximately maps GPS coordinates to street addresses. In some examples, the SSID associated with the customer's WiFi network 226 is also programmed into the UAV 108.

Once programmed, the UAV 108 leaves the regional distribution center 114 and flies toward the GPS coordinate. Once the UAV 108 has reached the GPS coordinate associated with the customer's address, the UAV 108 is ostensibly in range of the WiFi network 226 with identifying information (e.g., SSID) which matches the identifying information provided by the customer. At this point, the UAV 108 enables a WiFi signal sensor associated with a WiFi positioning system in addition to its GPS system. In general, the WiFi positioning system utilizes a mapping of access points associated with surrounding WiFi signals to GPS coordinates to pinpoint the UAV's 108 location. In some examples, such a mapping is provided by a third party such as Google Location Services, Navizon, or SkyHook.

Figure 8:
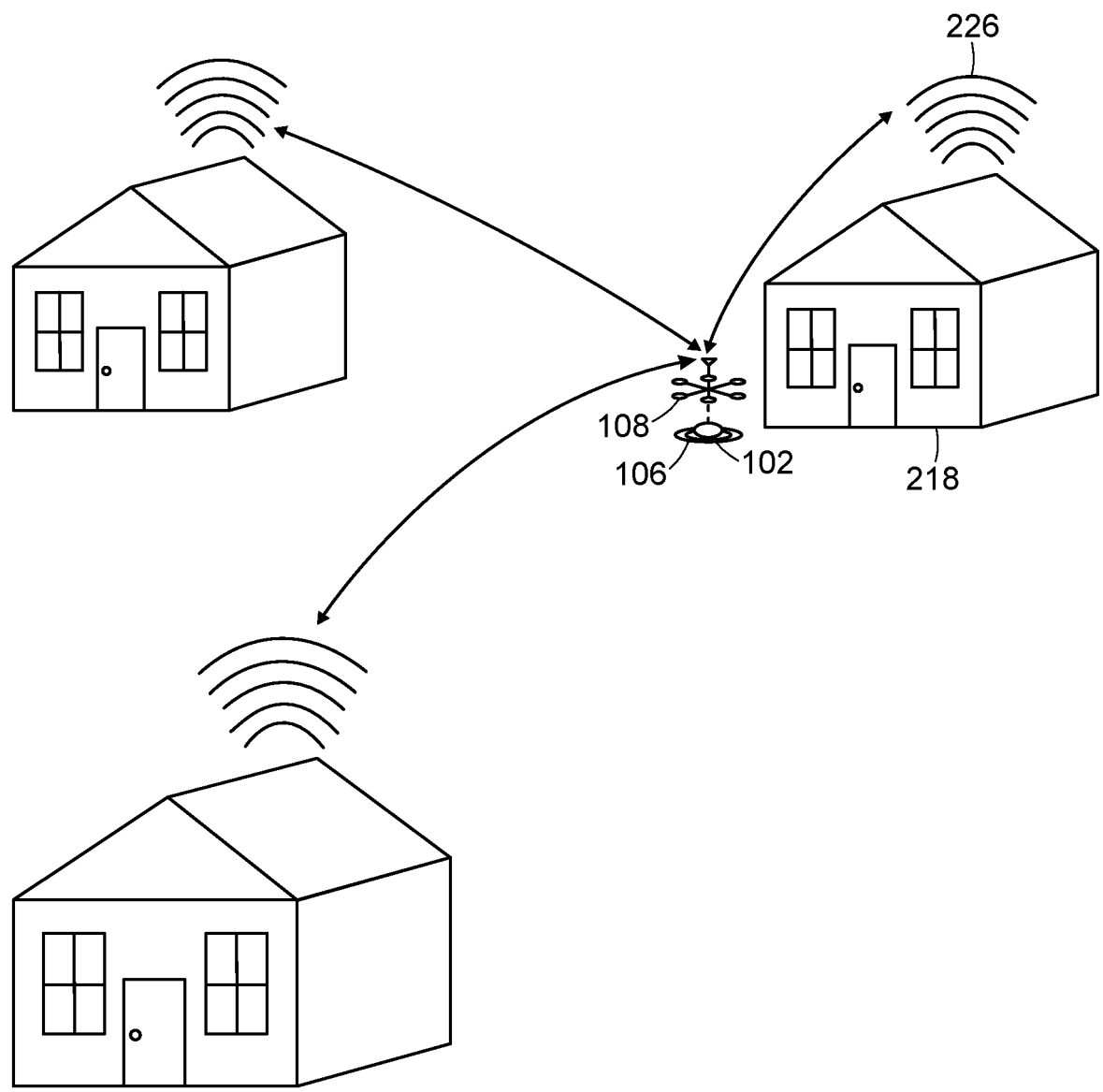
FIG. 8 is an unmanned vehicle delivering a package to a delivery site using WiFi signals.

Referring to FIG. 8, the UAV 108 uses the WiFi positioning system to efficiently move in a direction toward the WiFi signal associated with the SSID provided by the customer (and presumably toward their actual address). At some point (e.g., when it is determined that the received signal strength of the customer's WiFi signal is above a threshold) the UAV 108 is considered to be at the delivery location 106 at the customer's address. At this point the UAV 108 flies to a sufficiently low altitude such that it can safely deliver (e.g., drop) the package including the customer's item 102 onto the customer's lawn.

Once the package has been delivered, the UAV 108 flies back to the regional distribution center 114 where it retrieves the next customer's package and the delivery process repeats.

One advantage of this approach is that using a WiFi positioning system in addition to a GPS system can result in highly accurate delivery of the customer's item to the customer's location.

Another advantage of this approach is that an SSID of the customer's wireless network 226 (provided by the customer) can be used to validate that the UAV 108 is delivering the customer's item to the customer's address.

In some examples, when the customer places their order, a GPS coordinate associated with specific location on the customer's property (e.g., the customer's doorstep) is provided to the retailer's website. The UAV 108 can then deliver the customer's item to this specific location using the above-described combination of GPS and WiFi positioning systems.

In some examples, rather than determining the customer's GPS coordinates from a service such as Google maps, the customer's GPS coordinates are determined by consulting a database which maps identifying information of WiFi networks 226 (e.g., SSIDs) to GPS coordinates. In particular, such a database is searched for the SSID associated with the customer's WiFi network 226 and, if found, the GPS coordinate associated with the SSID is used as the delivery coordinate.

In some examples, as the UAV 108 travels around the regional distribution center delivering packages, the UAV 108 monitors WiFi networks in the area to create its own database relating WiFi networks and GPS coordinates. This database can be used in conjunction with the WiFi positioning system described above.

Even with the advent of electronic communications such as email text messaging, there is still a need for communication via paper. One common example is a document (e.g., a contract) which requires original signatures. The completion of such documents is often a time sensitive matter, requiring the signing of the document to be completed in a matter of hours.

While delivery using email or text message is nearly instantaneous, an original signature cannot be transmitted using these technologies. Conversely, original signatures can be obtained using services such as the U.S. Postal Service, FedEx, or UPS. However, these services generally take one or more days to deliver documents (even if the documents only need to be delivered across a city).

For this reason, courier services (e.g., bicycle couriers, automobile couriers, and so on) exist. These services involve a human retrieving a small package or document from a sender and quickly delivering the document to a recipient (usually within a small geographic area such as a city). Use of such courier services can be expensive and, since they involve humans, can result in mistakes due to human error.

To overcome some of the drawbacks of using courier services, Unmanned Aerial Vehicles (UAVs) can be used as couriers, delivering documents and small packages between locations within a small geographic area.

Figure 9:
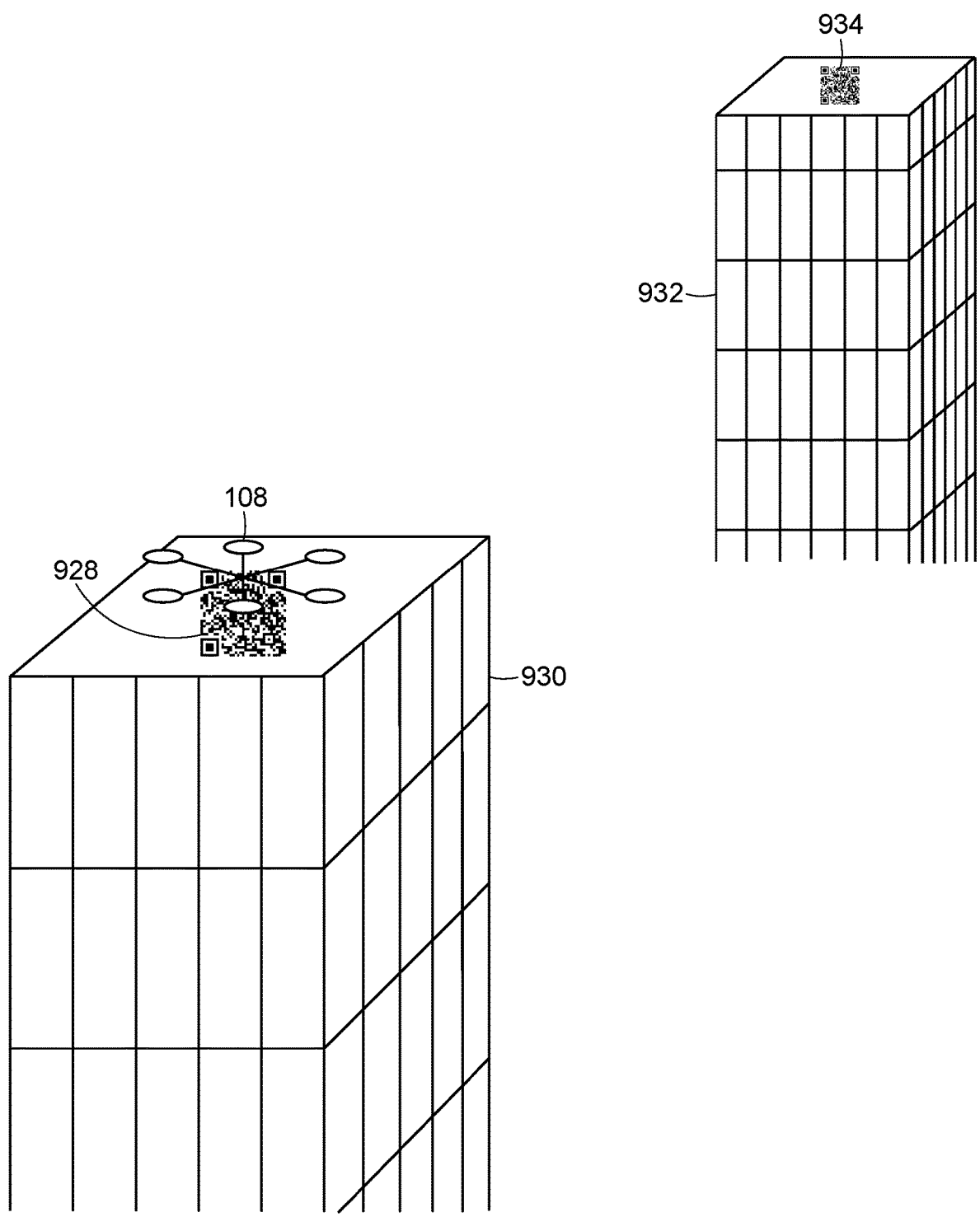
FIG. 9 is an unmanned vehicle courier system.

Referring to FIG. 9, a UAV 108 (e.g., a multi-rotor unmanned aerial vehicle) is parked on a first base station 928 on a roof of a first building 930. A second building 932 has a second base station 934 on its roof. In some examples, each of the base stations 928, 934 includes a fiducial (e.g., a QR code or a bar code) which is visible from the airspace above the base station. Note that the aerial vehicle can be launched from a stationary or moving vehicle and hand on such a vehicle using an array of beacons to automatically orient the vehicle to a handling surface.

At some point, a first person in the first building 930 needs a document or small package to be delivered to a second person in the second building 932. The first person has their document or package attached to the UAV 108 and indicates to the UAV 108 that the package should be delivered to a person at the second building 932. In some examples, the first person provides an address for delivery and a computer program calculates an approximate GPS coordinate corresponding to the address using a mapping application such as Google Maps.

Figure 10:
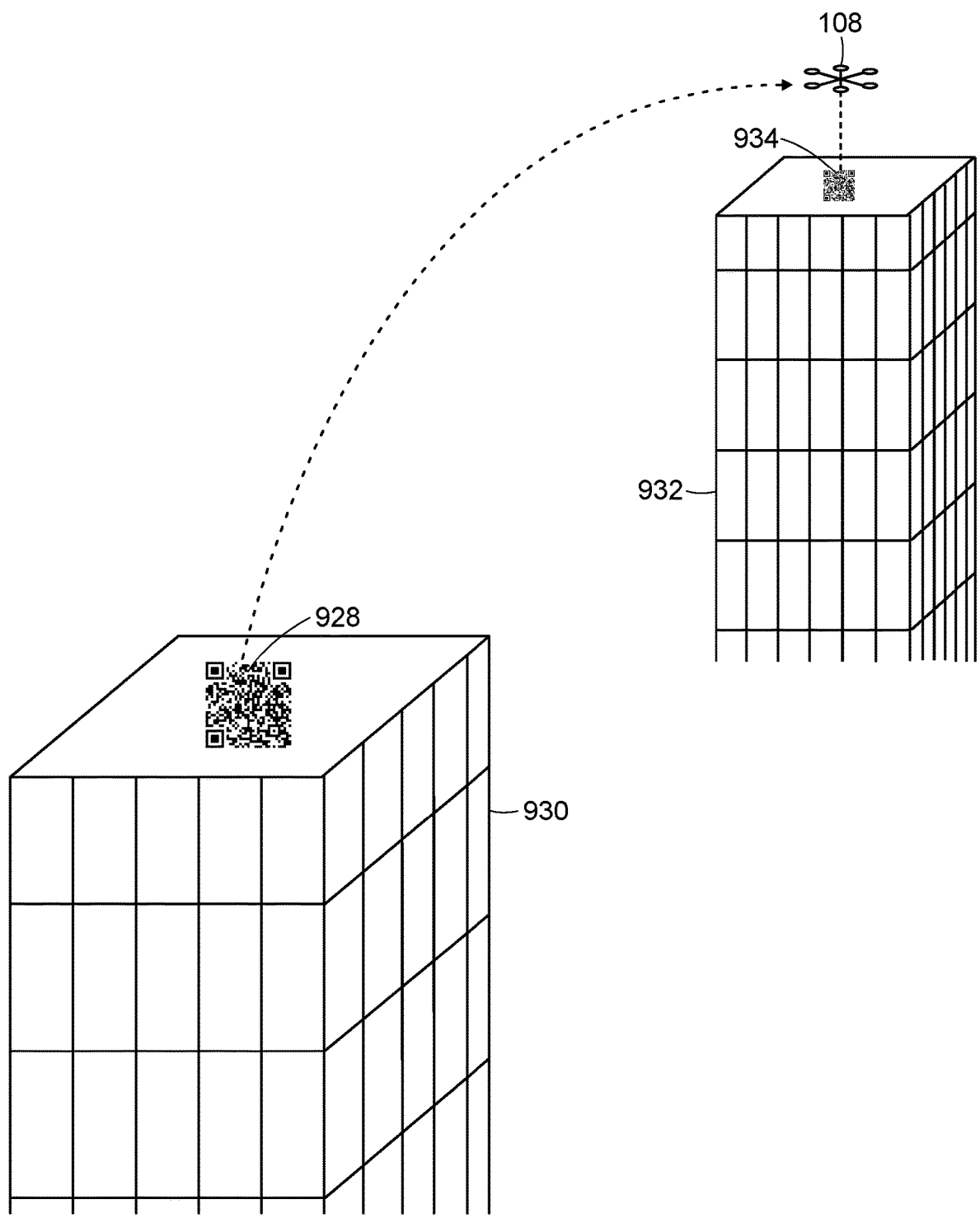
FIG. 10 is an unmanned vehicle courier system delivering an item.

Referring to FIG. 10, once the package is attached to the UAV 108 and the approximate delivery GPS coordinate is programmed into the UAV 108, the UAV 108 launches from the first base station 928 and flies toward the GPS coordinate associated with the delivery location (i.e., the second building 932). When the UAV 108 reaches the GPS coordinate, the UAV 108 begins to fly around the GPS coordinate in an efficient manner. At the same time, a camera on board the UAV 108 is activated and begins taking still photographs or video of the surrounding area. An image processor processes the photographs or video to determine whether the fiducial associated with the second building 932 is present in the photographs or video. Once the fiducial is detected, the UAV 108 flies toward the fiducial and lands on the second base station 934 which is associated with the fiducial.

The UAV 108 then causes a delivery notice (e.g., an email or a text message) to be sent to the second person in the second building 932, indicating that they should retrieve their document or package. The second person then retrieves their document or package, completing the delivery.

In some examples, the base stations on each of the buildings include a charger for the UAV. In such examples, the UAV 108 may stay on the base station 934 of the second building 932, charging its batteries as it waits for its next courier assignment. In other examples, the UAV 108 may charge its batteries to ensure that it can safely return to the first building 930 where it waits for its next courier assignment.

In some examples, the base stations on each of the buildings include a weather station to monitor the weather. The weather information collected by the base stations can be used to determine whether it is safe for the UAV 108 to fly from one building to the other.

In some examples, other types of fiducials can be used to accurately land the UAV 108 on a base station. For example, visible or infrared light fiducials can be used.

Figure 11:
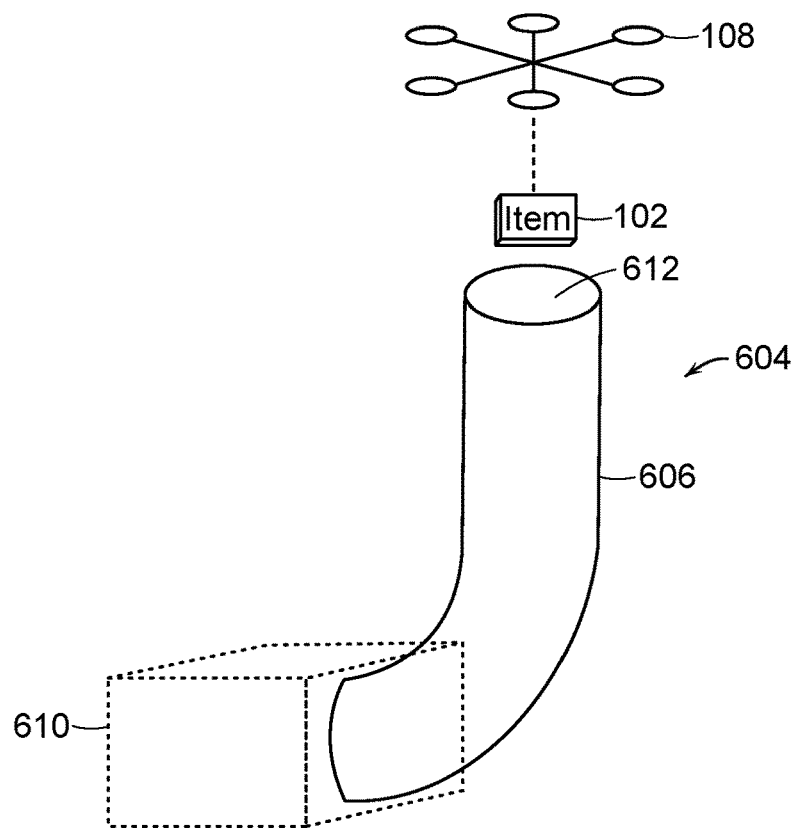
FIG. 11 is a package receptacle including a decelerating slide.

Referring to FIG. 11, in some examples, to ensure that the item 102 being delivered isn't damaged by being dropped from an excessive height, the UAV 108 drops the item 102 into a receptacle 604 including a decelerating slide 606 and a container 1601. When the item 102 is dropped into an open end 612 of the decelerating slide 606, the item 102 is slowly decelerated as it travels along a gradual bend in the decelerating slide 606. After passing through the decelerating slide 606, the item is deposited into the container 610 where it can be retrieved by a customer.

Figure 12:
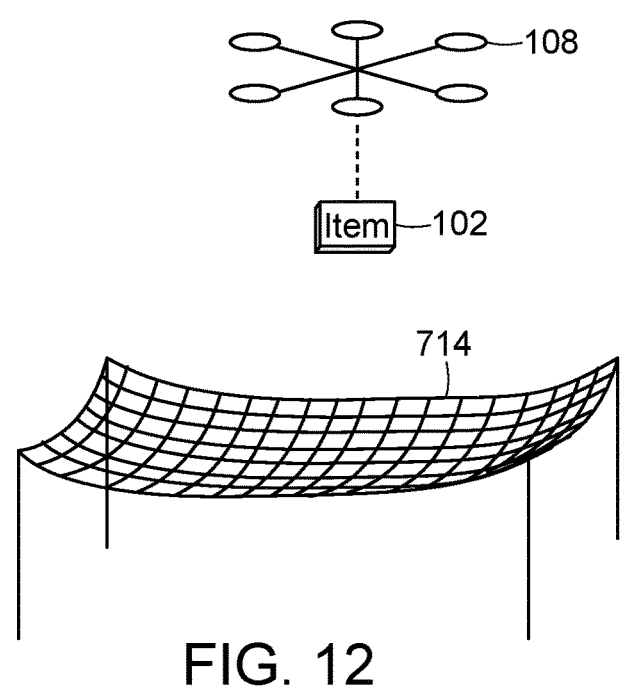
FIG. 12 is a package receptacle including a net.

Referring to FIG. 12, in some examples, to ensure that the item 102 being delivered isn't damaged by being dropped from an excessive height, the UAV 108 drops the item 102 into a net-like structure 714 which catches and safely decelerates the item 102 before it hits the ground.

In some examples, to ensure that the item 102 being delivered isn't damaged by being dropped from an excessive height, items may be packaged using packing materials and/or methods which prevent damage due to impact with the ground or other items. For example, products may be packaged such that they are surrounded on all sides by airbags, Styrofoam, honeycombed cardboard, or other cushioning materials.

Figure 13:
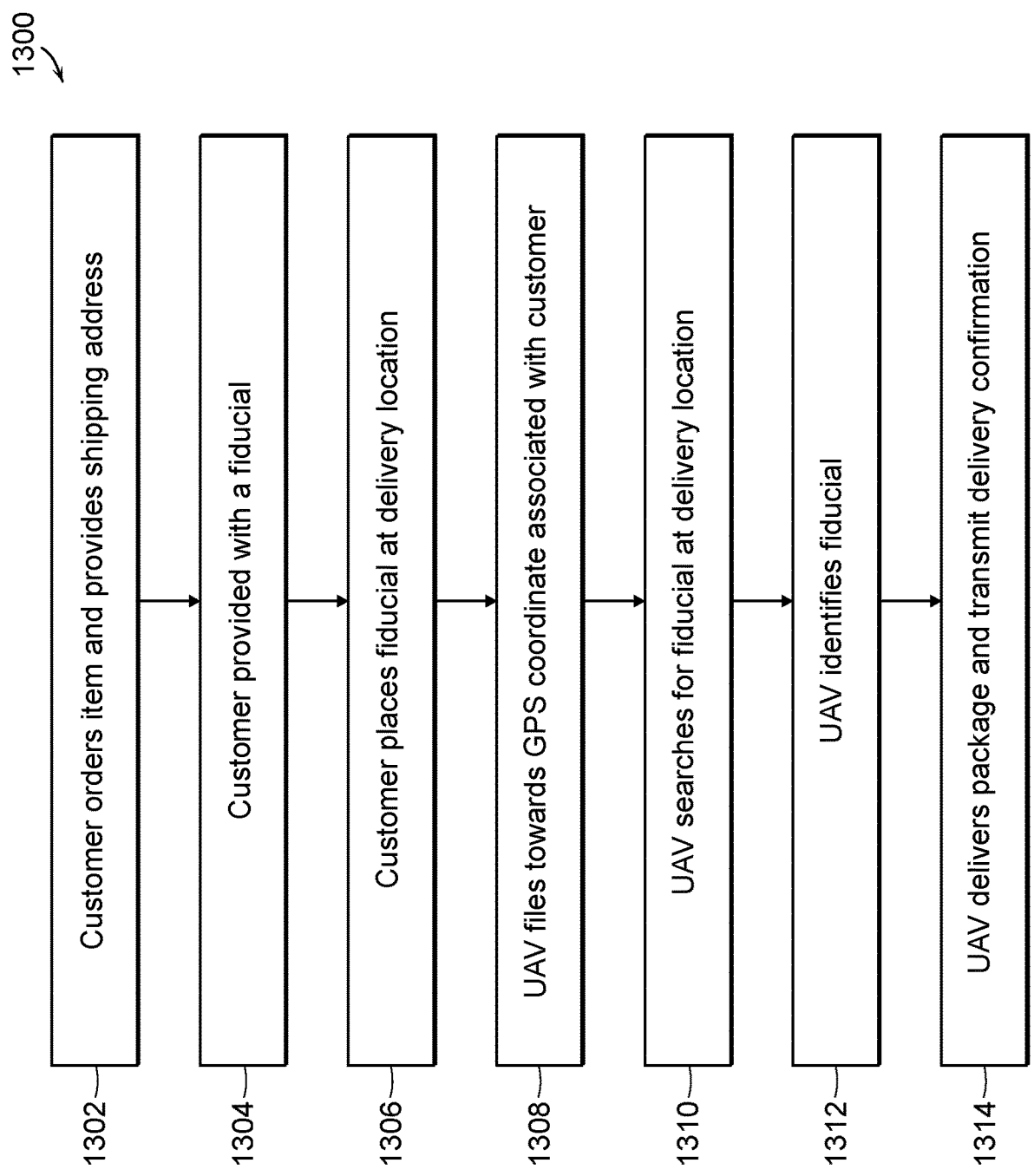
FIG. 13 is a flowchart of a first exemplary UAV delivery to a location.

FIG. 13 is a flowchart 1300 of a first exemplary UAV delivery to a location. At operation 1302, a customer orders an item and provides a shipping address. At operation 1304, a retailer provides the customer with, for example, a printable fiducial. The retailer instructs the customer to print the fiducial and place it outdoors in a location where the customer wants the item to be delivered. In some examples, rather than having a customer print out a fiducial for each order, the customer may have a permanent fiducial installed at their location. At operation 1306, the customer places the fiducial at their location, either by printing the fiducial and placing the fiducial in a location outside of their house or installing the fiducial in a location outside of their house.

At operation 1308, the UAV leaves a regional distribution center with the customer's item and flies toward the GPS coordinate associated with the customer's shipping address. At operation 1310, the UAV reaches the GPS coordinate and fly around the GPS coordinate in an efficient manner to identify the fiducial. For example, a camera on board the UAV is activated and begins taking still photographs or video of the surrounding area. An image processor processes the photographs or video to determine whether the fiducial is present in the photographs or video.

At operation 1312, the UAV detects the fiducial is detected. At operation 1314, the UAV delivers the customer's item at or near the fiducial. For example, the UAV flies directly above the fiducial. The UAV then flies to a sufficiently low altitude such that it can safely deliver (e.g., drop) a package including the customer's item onto the fiducial. In some examples, the package is connected to a winch on the UAV. When the UAV arrives above the fiducial, the package is lowered onto the fiducial using the winch. The package is then disconnected from the winch and the winch is retracted before the UAV returns to the regional distribution center. In some examples, the UAV simply lands on the fiducial and places the package on the fiducial.

Figure 14:
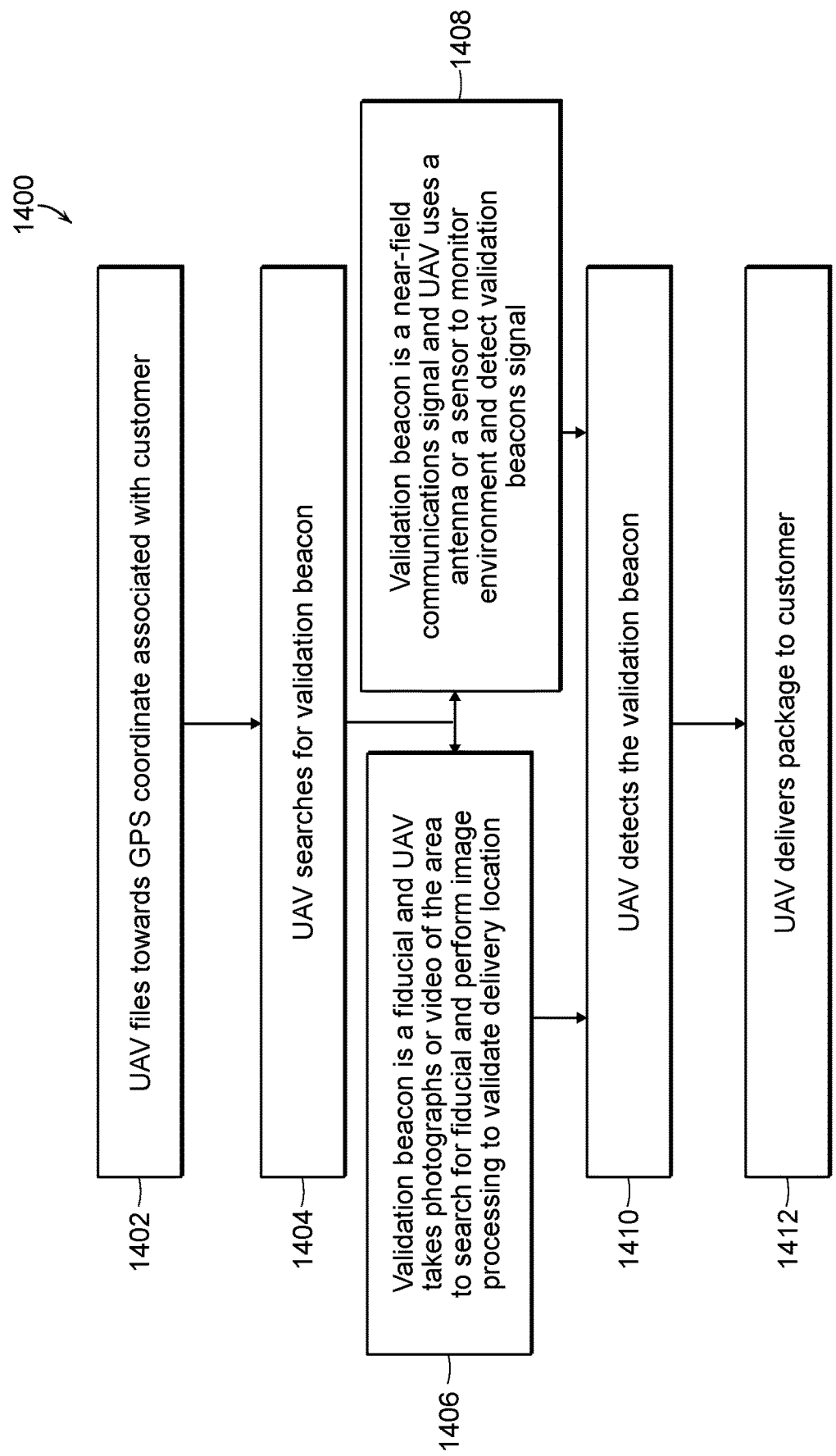
FIG. 14 is a flowchart of a second exemplary UAV delivery to a location.

FIG. 14 is a flowchart 1400 of a second exemplary UAV delivery to a location. At operation 1402, the UAV leaves a distribution center with a customer's item and flies toward a GPS coordinate programmed into the UAV and associated with the customer. When the UAV reaches the GPS coordinate, the UAV begins to fly around the GPS coordinate in an efficient manner.

At operation 1404, a validation system included in the UAV searches for a validation beacon associated with the customer. At operation 1406, in one embodiment, the validation beacon is a fiducial such as a QR code or bar code displayed on a screen of the customer's mobile device. A camera on board the UAV takes still photographs or video of the surrounding area as the UAV flies around the GPS coordinate. An image processor processes the photographs or video to determine whether the fiducial is present in the photographs or video. Once the fiducial is detected, the UAV flies toward the fiducial until the UAV is directly above the fiducial (and presumably the customer). At operation 1408, in another embodiment, the validation beacon is a near-field communications signal such as a Bluetooth signal, a WiFi signal, or an infrared signal. A sensor such as a Bluetooth, WiFi, or infrared sensor monitors the environment as the UAV flies around the GPS coordinate. The UAV detects the validation beacon signal the UAV flies in such a way that the received signal strength is maximized.

At operation 1410, UAV detects the validation beacon, as described above. At operation 1412, the UAV delivers the item to the customer. For example, the UAV flies to a sufficiently low altitude such that the item can be safely delivered to the customer.

Figure 15:
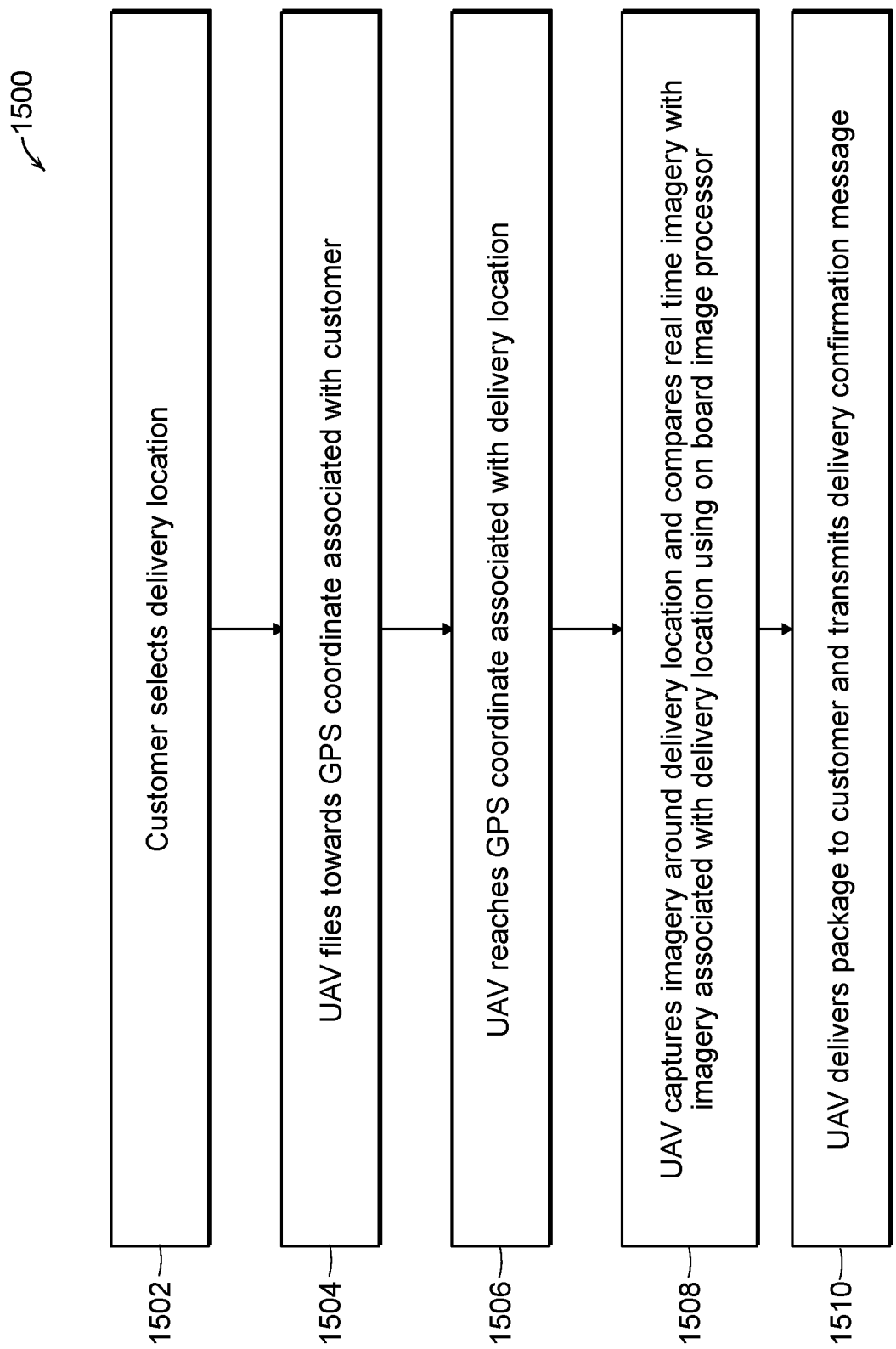
FIG. 15 is a flowchart of a third exemplary UAV delivery to a location.

FIG. 15 is a flowchart 1500 of a third exemplary UAV delivery to a location. At operation 1502, a customer select a desired delivery location on a map by, for example, placing an icon (e.g., a bullseye or an arrow) on an image of his/her house derived from aerial or satellite imagery. At operation 1504, a UAV with a package including the customer's item is programmed to fly to a GPS coordinate associated with the desired delivery location. The UAV leaves the regional distribution center and travels to GPS/map location.

At operation 1506, the UAV reaches the GPS coordinate associated with the delivery location and is ostensibly in range to capture imagery around the delivery location. At operation 1508, the UAV augments its navigation with visual imagery by comparing its real time imagery (acquired using a camera) with the imagery associated with the user-specified delivery location, allowing the vehicle to hover over a location that is much closer to the user-specified delivery location.

At operation 1510, the UAV delivers the package to the customer by either landing and dropping the package onto the user-specified delivery location or lowering the package including the customer's item onto the user-specified delivery location.

Figure 16:
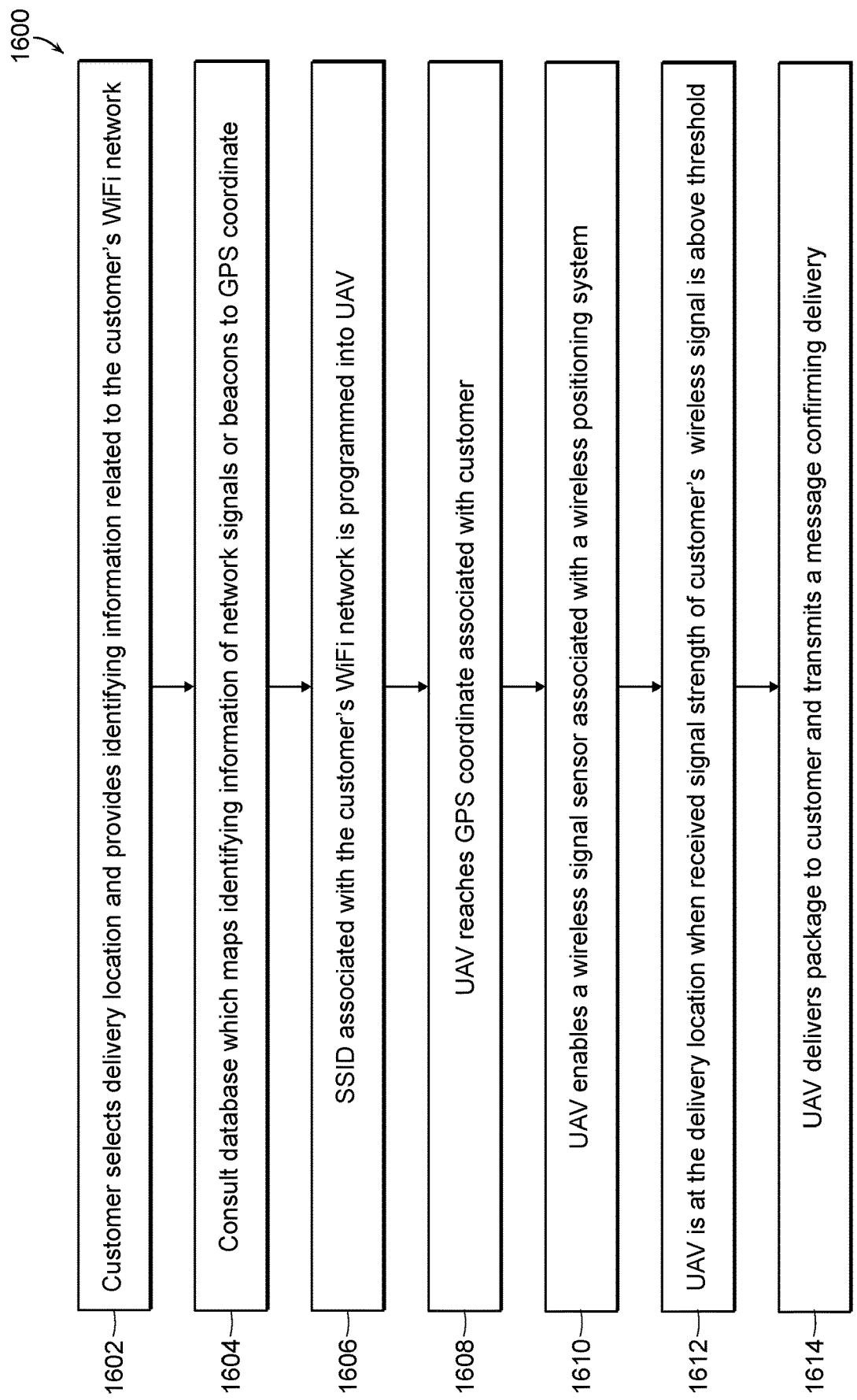
FIG. 16 is a flowchart of a fourth exemplary UAV delivery to a location.

FIG. 16 is a flowchart 1600 of a fourth exemplary UAV delivery to a location. At operation 1602, a customer orders an item from, for example, an online retailer's website and provides to the retailer's website a shipping address and identifying information related to the customer's WiFi network (e.g., the Service Set Identifier (SSID) for their WiFi network). In some embodiments, at operation 1604, the customer's GPS coordinates are determined by consulting a database which maps identifying information of WiFi networks (e.g., SSIDs) to GPS coordinates. For example, the database is searched for the SSID associated with the customer's WiFi network and, if found, the GPS coordinate associated with the SSID is used as the delivery coordinate.

At operation 1606, the SSID associated with the customer's WiFi network is programmed into the UAV making it easier to get into range to see the drop-off location. In some examples, WiFi signals emitted by access points in and/or around a customer's house can also be used to accurately deliver an item to a location specified by the customer and to validate that the delivery location is correct. At operation 1608, the UAV reaches the GPS coordinate associated with the customer's address and is ostensibly in range of the WiFi network with identifying information (e.g., SSID) which matches the identifyeng information provided by the customer.

At operation 1610, the UAV enables a WiFi signal sensor associated with a WiFi positioning system in addition to its GPS system. The UAV uses the WiFi positioning system to efficiently move in a direction toward the WiFi signal associated with the SSID provided by the customer (and presumably toward their actual address). At operation 1612, the UAV is considered to be at the delivery location at the customer's address when, for example, it is determined that a received signal strength of the customer's WiFi signal is above a threshold. At operation 1614, the UAV flies to a sufficiently low altitude such that it can safely deliver (e.g., drop) the package including the customer's item onto the customer's lawn.

Figure 17:
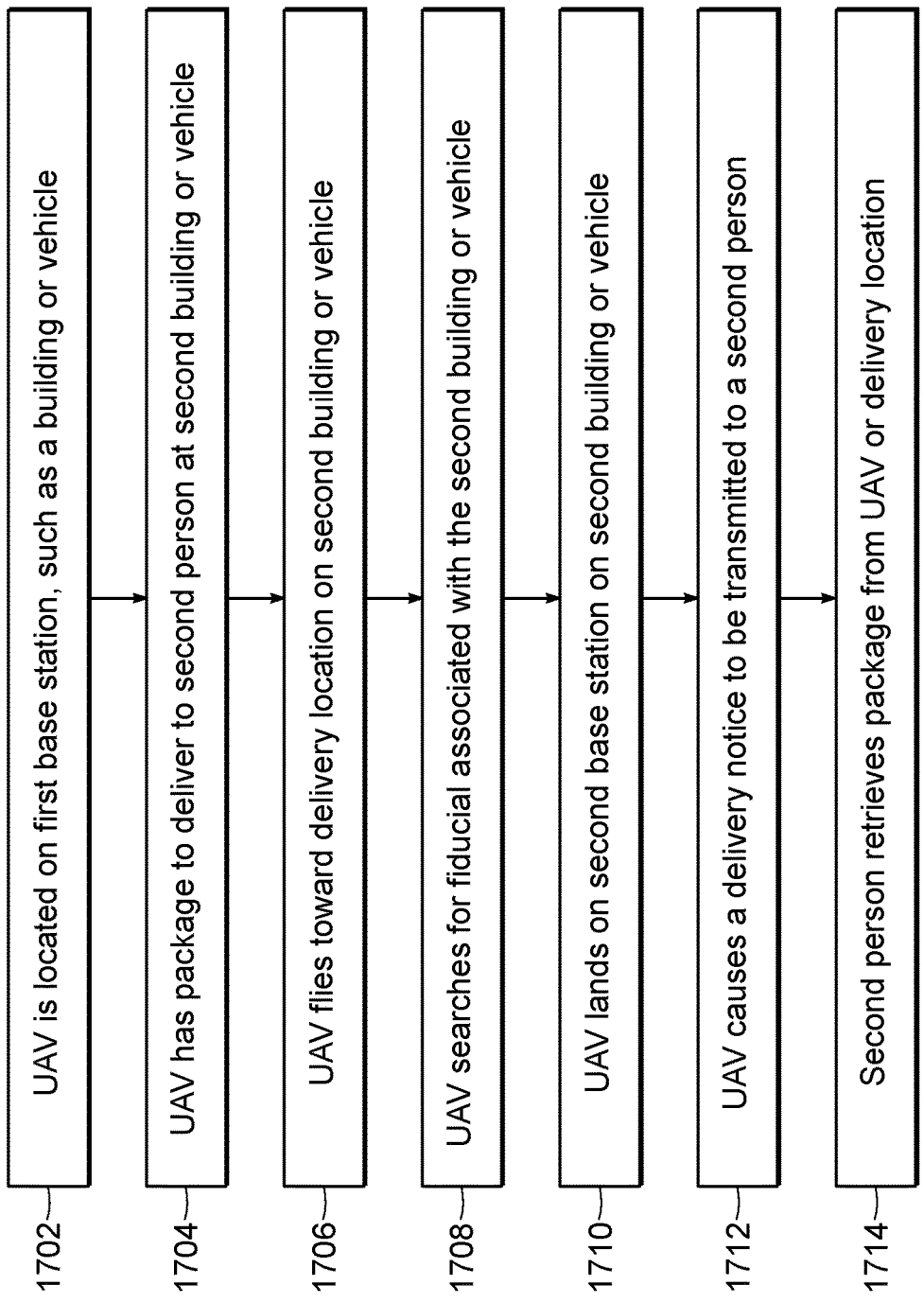
FIG. 17 is a flowchart of a fifth exemplary UAV delivery to a location.

FIG. 17 is a flowchart 1700 of a fifth exemplary UAV delivery to a location. At operation 1702, the UAV is located on a first base station on a roof of a first building. In some examples, each base station includes a fiducial (e.g., a QR code or a bar code) which is visible from the airspace above the base station.

At operation 1704, an item (i.e., a document or package) is attached to the UAV and indicates to the UAV that the package should be delivered to a second person at a second building. In some examples, a first person provides an address for delivery and a computer program calculates an approximate GPS coordinate corresponding to the address using a mapping application such as Google Maps.

At operation 1706, the UAV launches from the first base station and flies toward the GPS coordinate associated with the delivery location (i.e., the second building). At operation 1708, when the UAV reaches the GPS coordinate, the UAV begins to fly around the GPS coordinate in an efficient manner and a camera on board the UAV is activated and begins taking still photographs or video of the surrounding area. An image processor processes the photographs or video to determine whether the fiducial associated with the second building is present in the photographs or video. At operation 1710, once the fiducial is detected, the UAV flies toward the fiducial and lands on the second base station which is associated with the fiducial.

At operation 1712, the UAV causes a delivery notice (e.g., an email or a text message) to be sent to the second person in the second building, indicating that they should retrieve their document or package. At operation 1714, the second person then retrieves their document or package, completing the delivery.

In some examples, other types of fiducials can be used to accurately land the UAV on the base station. For example, visible or infrared light fiducials can be used.

Amazon, Matternet, CyPhy Works and others have suggested the use of flying drones for package delivery. These drone prototypes have been portrayed as having a conventional multi-rotor configuration. One of the main technological challenges of this idea is the limited range, endurance and payload that current battery technology imposes on conventional multi-rotor vehicles. In some examples, enhancing these parameters to the point where the use of multi-rotor vehicles is practical requires a redesign of the multi-rotor configuration.

Figure 18A:
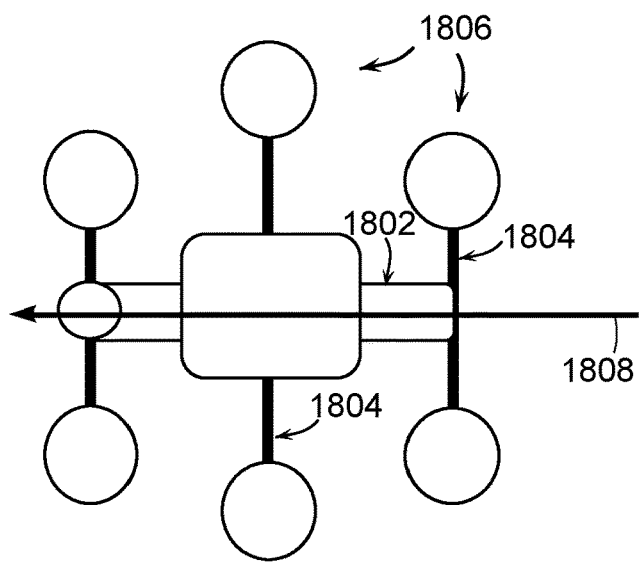
Figure 18B:
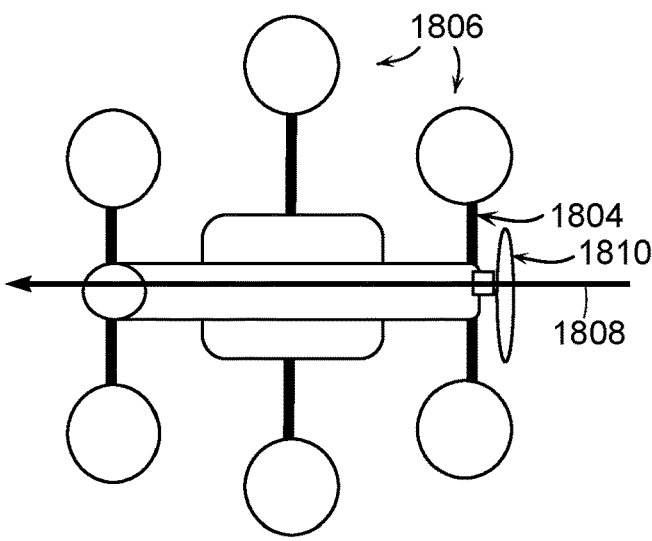
Figure 18C:
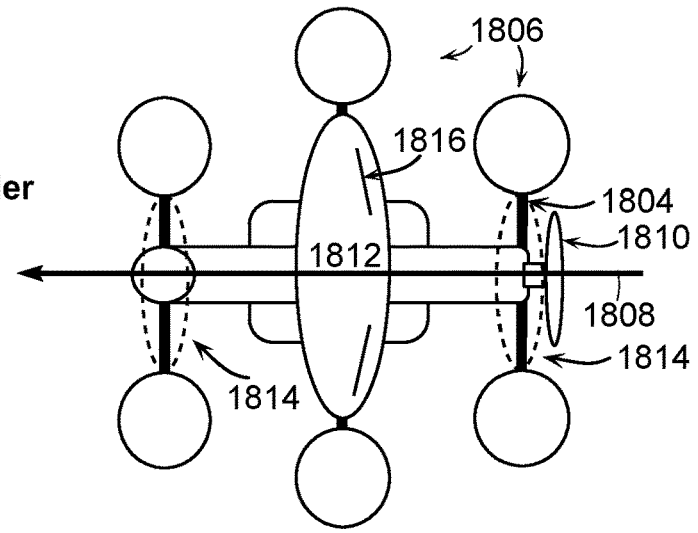

FIG. 18A-18C illustrate three hybrid multicopter configurations: FIG. 18A illustrates a multicopter without a propeller or an extended lifting surface. FIG. 18B illustrates a multicopter with a propeller but without an extended lifting surface. FIG. 18C illustrates a multicopter with a propeller and an extended lifting surface. FIG. 18C uses a propeller in the vertical plane for propulsion and an extended lifting surface to supplement the rotors in forward flight. Each configuration includes an aerodynamic body 1802, struts 1804, and rotors 1806. There is a primary axis 1808 of the multicopter in forward flight mode. The struts 1804 are generally orthogonal to the primary axis 1808. The body 1802 and struts 1804 can have an aerodynamic shape with respect to the primary axis 1808 for direction of movement. FIGS. 18B and 18C includes a propeller 1810. FIG. 18C includes a wing 1812. In additional embodiments, FIG. 18C may include additional smaller wings 1814. The configurations enhance the range of a standard multi-copter configuration to be used, for example, in a package delivery scenario.

The multicopter can be steered using hovering rotors 1806, which can be selectively oriented or can be used with flight control surfaces on the spars or wings of the UAV to adjust the direction of flight.

In some embodiments, the wing 1812 includes one or more flaps 1816. The flaps 1816 are used to increase the lift of the wing 1812, and are mounted on the wing 1816 trailing edges. Steering of the multicopter is controlled using the one or more flaps 1816 and/or the rotors 1806. The flaps 1816 may be of a different size, shape, and/or location than as illustrated in FIG. 18C. In further embodiments, the multicopter includes an inertial measurement unit (IMU) for automated flight control based on direction and, in combination with the one or more flaps 1816 and/or the rotors 1806, to compensate for environmental factors, such as cross-winds.

The analysis presented is founded on rotor momentum theory applied to forward flight and standard helicopter and airplane performance theory. The configurations take advantage of the fact that a rotor in forward flight requires less power to generate a given amount of thrust than in hover, and that lifting surfaces are more efficient at producing lift than rotors.

Figure 18D:
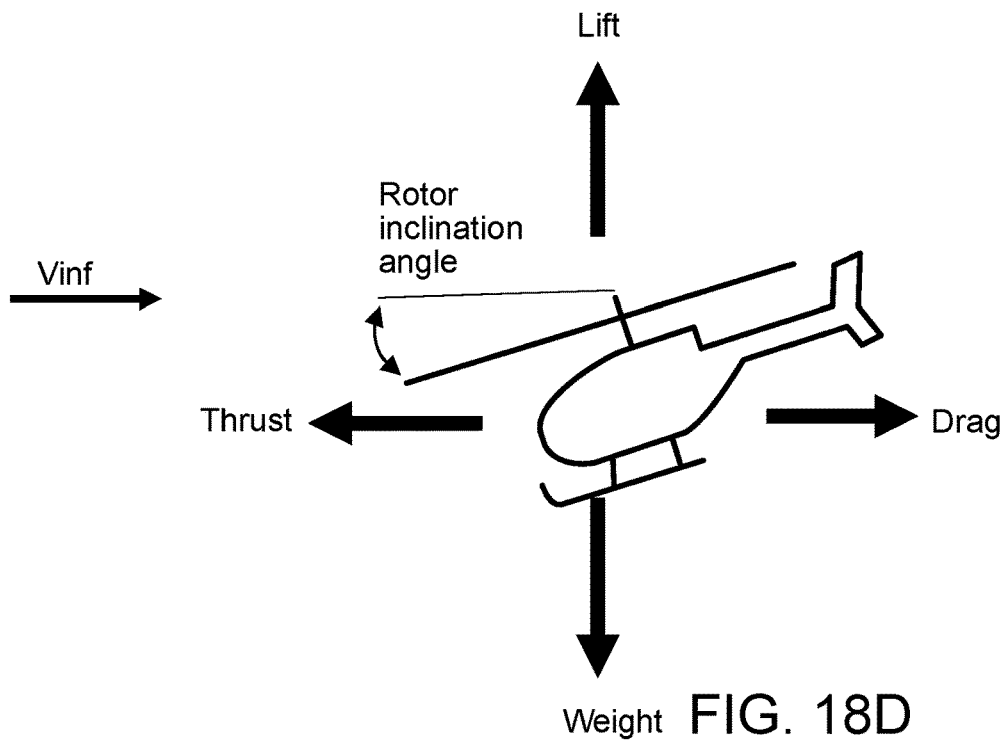

FIG. 18D illustrate a multicopter with rotors in a forward flight orientation. Conventional helicopters and multicopters need to tilt their rotors forward to provide a propulsive force to counteract the drag in addition to produce the lift necessary for the weight of the UAV.

Figure 18E:
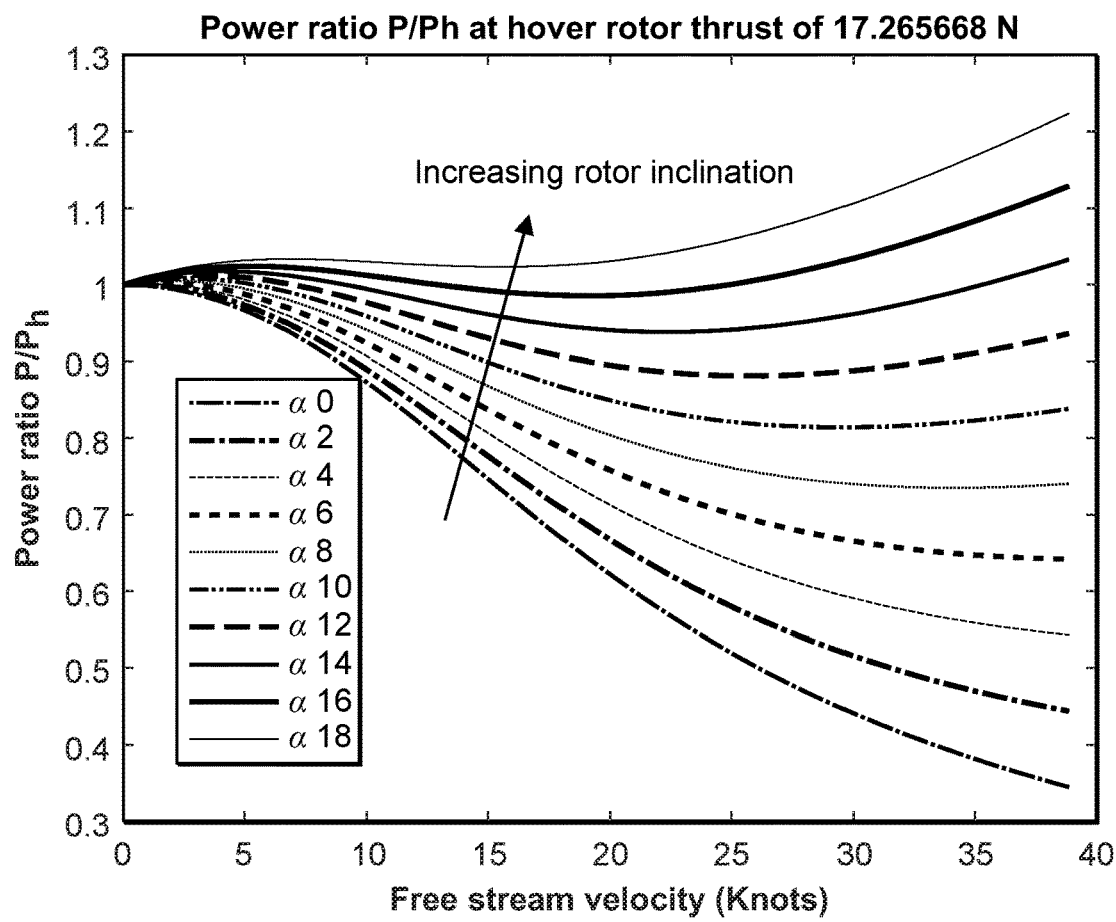

FIG. 18E illustrates a plot representing the theoretical behavior of a multicopter propeller for an exemplary multicopter. The plot shows that the induced power at fast forward flight can be a fraction (down to 40%, for example) of the induced power at hover when the rotor is operating at an effective inclination of 0 degrees. As the rotor inclination increases from 0 to higher angles, the induced power (power required for thrust generation) follows the trends shown on the plot, where $P/P_h$ is the ratio of forward flight power vs. power required to hover.

Measured data from an exemplary multicopter airframe showed that a vehicle inclination of ~15 degree was needed to achieve un-accelerated level forward flight at a velocity of 25 Knots.

The lifting surface is a good complement to the approach, considering that flight surfaces such as wings are much more efficient at producing lift than rotors. However, considering that a key design constraint are the overall vehicle dimensions, it is desired to have a design that minimizes the wingspan. Ideally, in this example, the wingspan does not extend beyond the rotors. This results in a wing with a low aspect ratio that is able only to produce a fraction of the lift necessary to counteract the vehicle weight.

In the model used for the calculations presented in FIGS. 18A-18J, a wing with a span of 1.5 m (5~ft) and an aspect ratio of 4 is used to illustrate the system parameters. Realistic aerodynamic airfoil and wing performance values were used based on a simple vortex lattice model. In some embodiments, the wing can be at least partially stowed to the airframe.

Figure 18F:
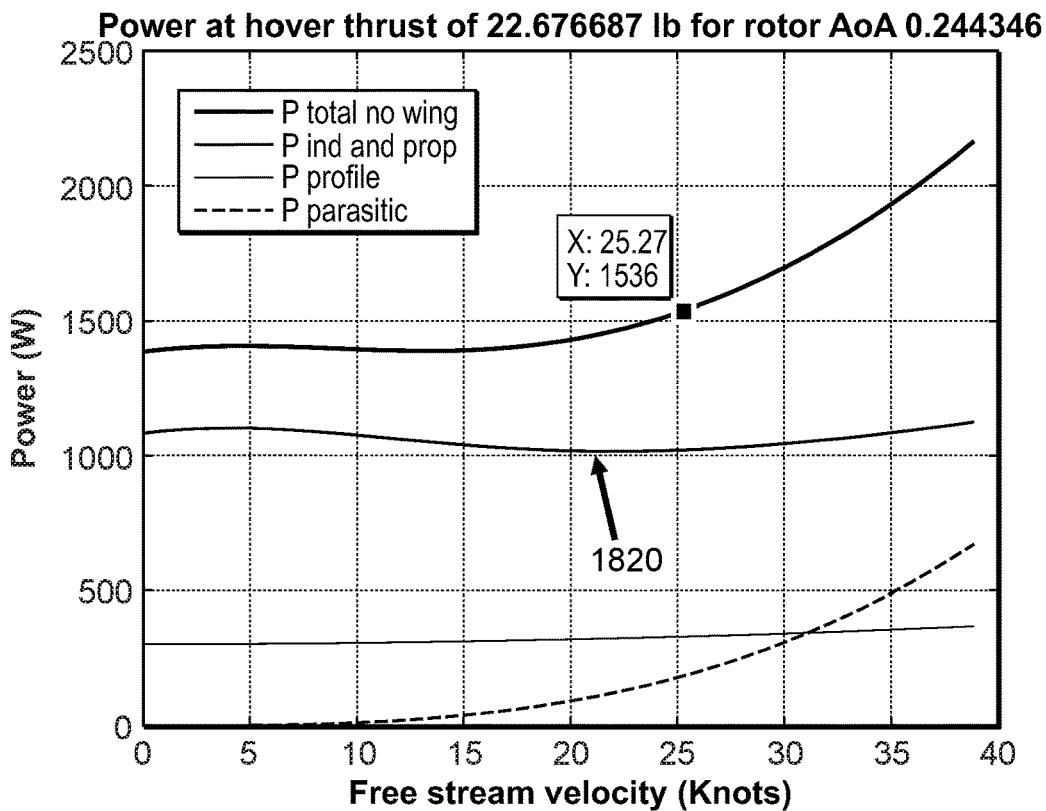

FIG. 18F illustrates a plot representing a performance of a simple multicopter design. The performance of the simple multicopter design is the baseline to which the other two approaches (a multicopter with a propeller and without an extended lifting surface, and a multicopter with a propeller and an extended lifting surface) are compared. The plot shows the estimated power predictions for a vehicle inclination of 14 degrees with a GTOW of 100 N. At 25 Knots forward speed, the system requires about 1540 W. Note the very shallow reduction in the induced power with forward flight (line 1820). At this inclination the benefits of forward flight in terms of power saving with respect to hover are marginal.

A multicopter configuration faces steep challenges in order to achieve high forward flight speeds that can compete with a fixed wing aircraft. Generally, there is a substantial drag increase when tilting the vehicle, large multicopters aren't commonly designed to be streamlined and efficient in forward flight.

Figure 18G:
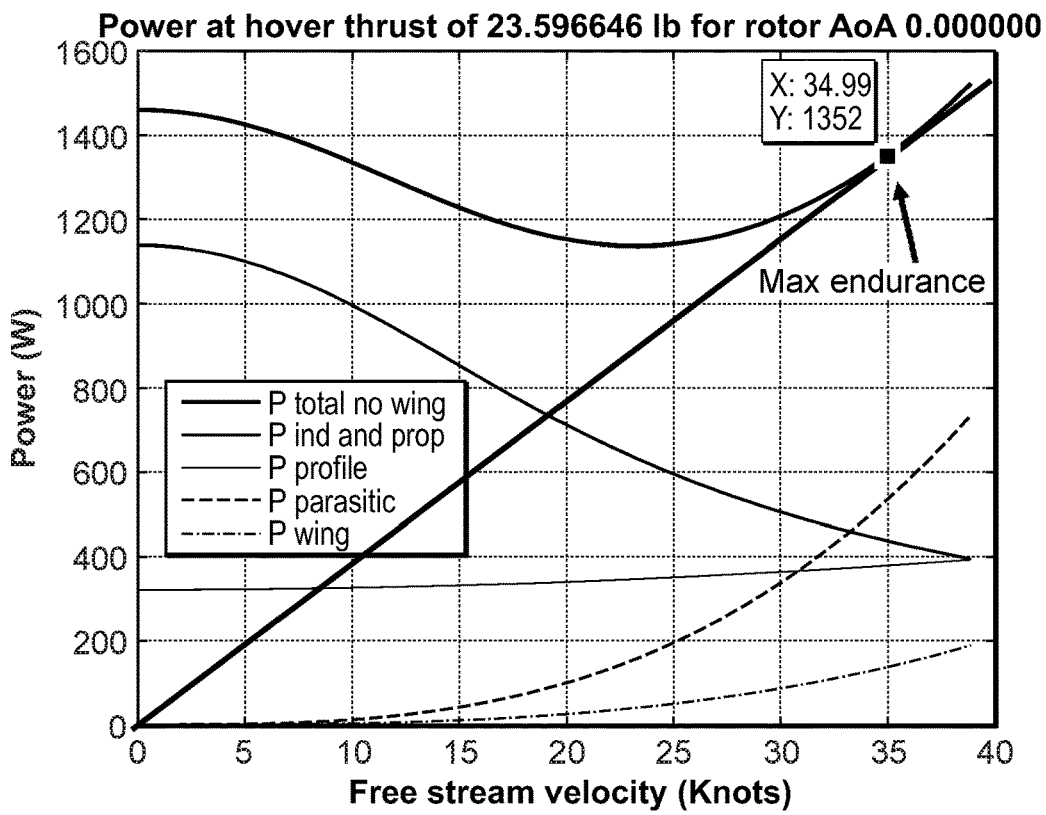

FIG. 18G illustrates a simple analytical model implemented to calculate the power requirements of a hex-copter with a drive propeller and a shorter wing. A small wing with a span of 1.5 m, an aspect ratio of 4, and realistic aerodynamic parameters was assumed. The nominal weight of the vehicle was assumed to be 102 N (~23 lb) which is around the expected Gross Take Off Weigh (GTOW) of the multicopter with a 5 lb payload.

The total power of the aircraft in cruise is calculated by adding the induced, profile and parasitic powers. For maximum range in the case of an aircraft with a drive propeller and no extended lifting surface such as a wing a power consumption of ~1350 W at 35 knots is expected.

Figure 18H:
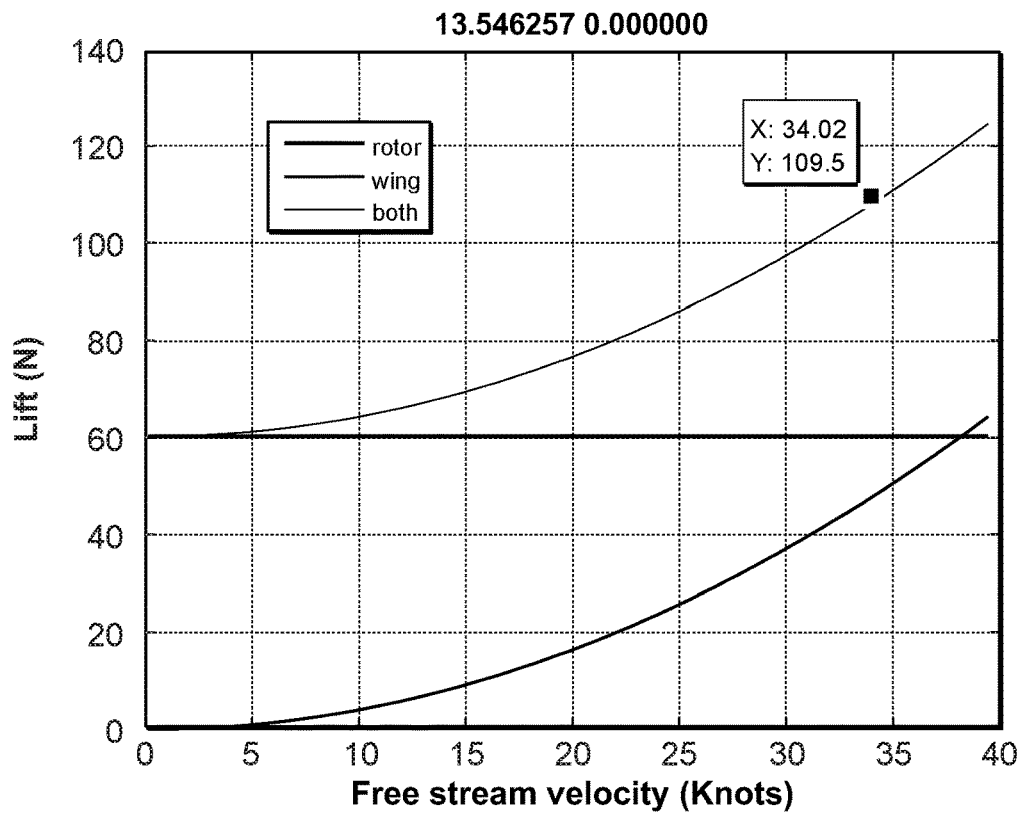
Figure 18I:
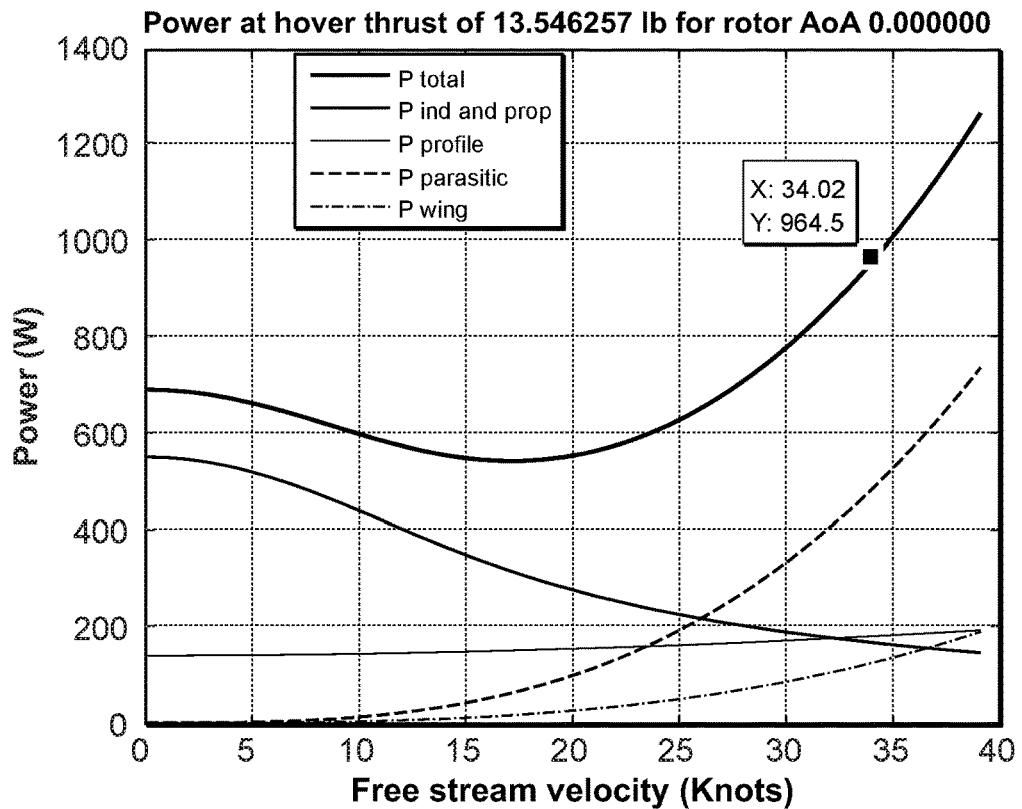

FIG. 18H-I illustrates a multicopter with a drive propeller and wing, including an aerodynamic extended lifting surface resulting in a reduction in the thrust requirements of the rotors during cruise. This resultant lower disk loading results in higher aerodynamic efficiency. The lift generated by the wing adds a new drag term to the force balance equation and increases the overall mass of the system. The analysis shows that drag and mass penalties are largely outweighed by the overall reduction in power at cruising speed.

Assuming a weight increase of 10 N (2.25 lb) with the wing, the system need to cruise at 35 knots to achieve level unaccelerated flight, and consumes about 965 W. This is a reduction in power of 385 W.

FIG. 18J illustrates a table representing the mass, hover, and cruise power for the three configurations described above. These idealized range calculations do not take into account all the factors in a standard mission profile, (takeoff, package drop off, and landing); rather, a continuous ideal cruise condition at a constant mass was assumed to illustrate the flight parameters.

This analysis assumes a vehicle with a battery capacity of 480 Wh (21.8 Ah, 22.2V) with a mass of 2800 g (6.2 lb), this is typical for a currently available lithium polymer battery. The parameters that define the aerodynamics of the system were chosen to approximate performance with enough resolution to identify trends and overall orders of magnitude. It is evident that use of at least one drive propeller (that is, a propeller configured to provide thrust in a forward axial direction along a propulsion axis of the UAV) and/or at least one extended lifting surface such as a wing increases range.

Figure 19:
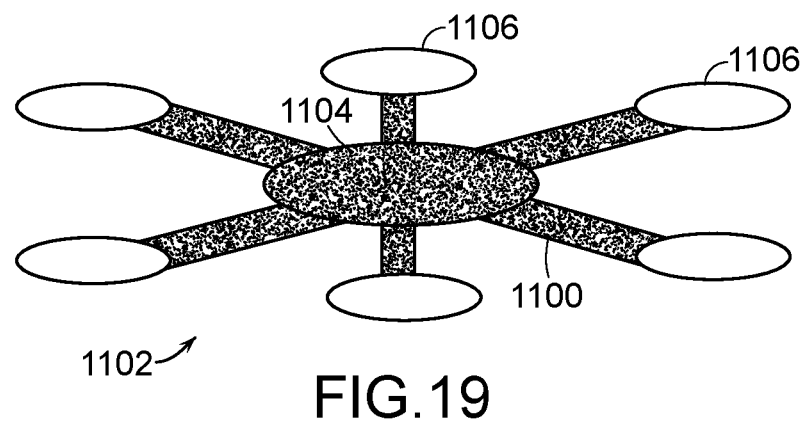
FIG. 19 is an unmanned aerial vehicle in a multi-copter mode.
Figure 20:
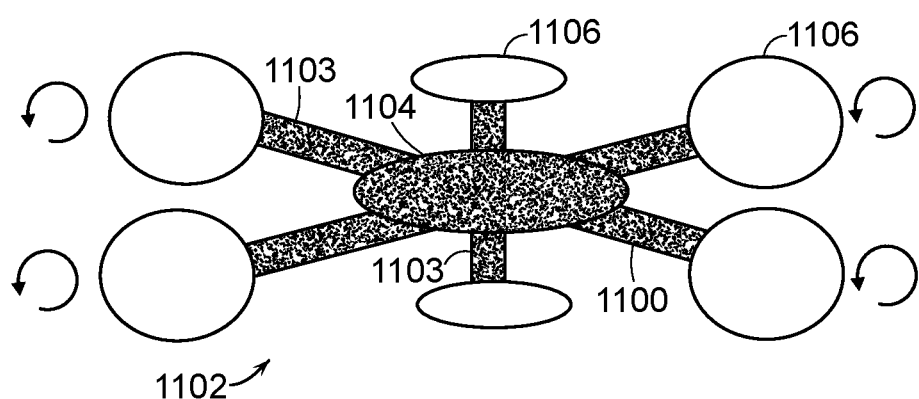
FIG. 20 is an unmanned aerial vehicle in a first forward flight mode.

Referring to FIGS. 19 and 20, a first exemplary multi-rotor UAV 1102 includes an airframe 1100 which facilitates operation of the UAV 1102 in two modes: a multi-copter mode (FIG. 19) and a forward flight mode (FIG. 20). To enable the two modes of operation, the airframe includes a streamlined fuselage 1100 which is aerodynamically optimized such that it reduces the drag in forward flight while simultaneously working as a lifting surface. The fuselage 1100 is surrounded by an array of an even number of rotors 1106 (e.g., 4, 6, 8, or 10) that tilt back and forth when switching between multi-copter mode and forward flight mode. For example, referring to FIG. 19, in multi-copter mode the rotors 1106 are all in a substantially horizontal configuration (i.e., substantially parallel to the ground) allowing for vertical take-off and landing, hovering, and low speed flight. Referring to FIG. 20, to convert to forward flight mode, at least some of the rotors 1106 tilt or rotate such that they are in a substantially vertical configuration (i.e., substantially perpendicular to the ground) allowing for higher speed forward flight.

In some examples, when the at least some rotors 1106 tilt or rotate from a substantially vertical configuration into a substantially horizontal configuration, the lifting surfaces on the spars 1103 connecting the at least some rotors 1106 to the center of the fuselage 1100 rotate from a substantially horizontal configuration into a substantially vertical configuration. Similarly, when the at least some rotors 1106 tilt or rotate from a substantially horizontal configuration into a substantially vertical configuration, the lifting surfaces on the spars 1103 rotate from a substantially vertical configuration to a substantially horizontal configuration.

In other examples, when the at least some rotors 1106 tilt or rotate between a substantially vertical configuration and a substantially horizontal configuration, the lifting surfaces on the spars 1103 of the at least some rotors 1106 remain in a substantially horizontal configuration.

In operation, the UAV 1102 performs vertical takeoffs and landings (e.g., when hovering to perform package delivery) in multi-copter mode and then switches to forward flight mode (i.e., tilted rotor configuration) when flying over longer distances. The faster speeds and reduced power consumption associated with forward flight mode allow the UAV 1102 to achieve a greater range and endurance than would be possible using a conventional multi-copter.

In some examples, the UAV 1102 includes a large internal volume than can hold a payload. For example, the streamlined fuselage 1100 may include a package bay 1104 that holds a payload either by enclosing it on the inside or making the surface of the package part of the fuselage 1100 itself. In some examples, the package bay is inside of the fuselage 1100 to ensure that the streamlined aerodynamics of the fuselage 1100 are preserved.

Figure 21:
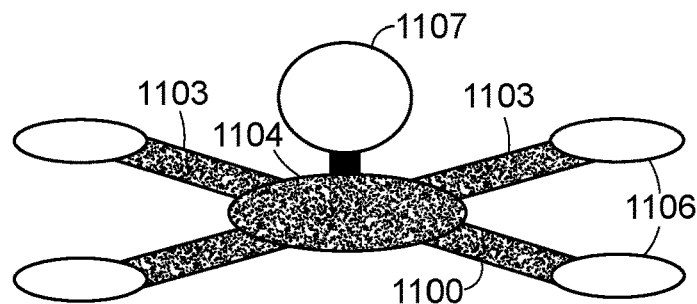
FIG. 21 is an unmanned aerial vehicle in a second forward flight mode.

Referring to FIG. 21 in another configuration, the UAV 1102 includes a streamlined fuselage 1100 including five spars 1103 extending from a central package bay 1104. A number (i.e., four in this case) of the spars 1103 each include a rotor 1106 mounted in a substantially horizontal position relative to the ground for providing vertical thrust for the UAV 1102. One (or more) of the spars 1103 includes a rotor 1107 mounted in a substantially vertical position relative to the ground for providing horizontal thrust for the UAV 1102.

Figure 22:
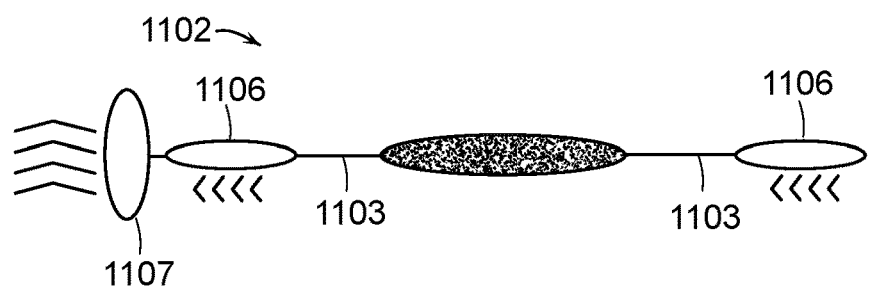
FIG. 22 is a side view of the unmanned aerial vehicle.

Referring to FIG. 22, in operation, when hovering or traveling over short distances, the rotors 1106 that are mounted in a substantially horizontal position are used primarily, with the rotor 1107 mounted in a substantially vertical position being used little, if at all. When traveling over longer distances, the rotor 1107 mounted in a substantially vertical position relative to the ground acts as a propeller, moving the UAV 1102 in a lateral direction, with the streamlined fuselage 1100 providing lift (i.e., the UAV 1102 'flies' like an airplane). When flying like an airplane, the UAV 1102 may use the rotors 1106 mounted in a horizontal position to provide additional lift, if necessary.

Figure 23:
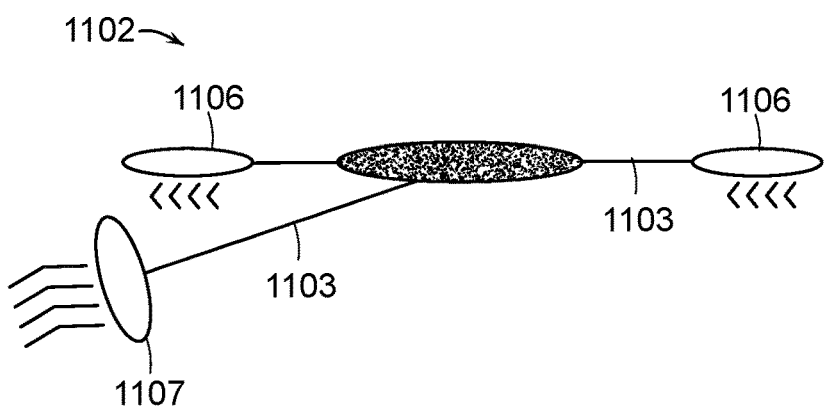
FIG. 23 is a side view of an unmanned aerial vehicle with a rotatable spar and rotor.

Referring to FIG. 23, in some examples, the spar 1103 that the horizontally mounted rotor 1107 is mounted upon is rotatable relative to the other spars 1103 of the UAV 1102. The spar 1103 may be rotated to alter the flight characteristics of the UAV 1102 and/or when the UAV 1102 switches between a hovering and a flying mode.

Figure 24:
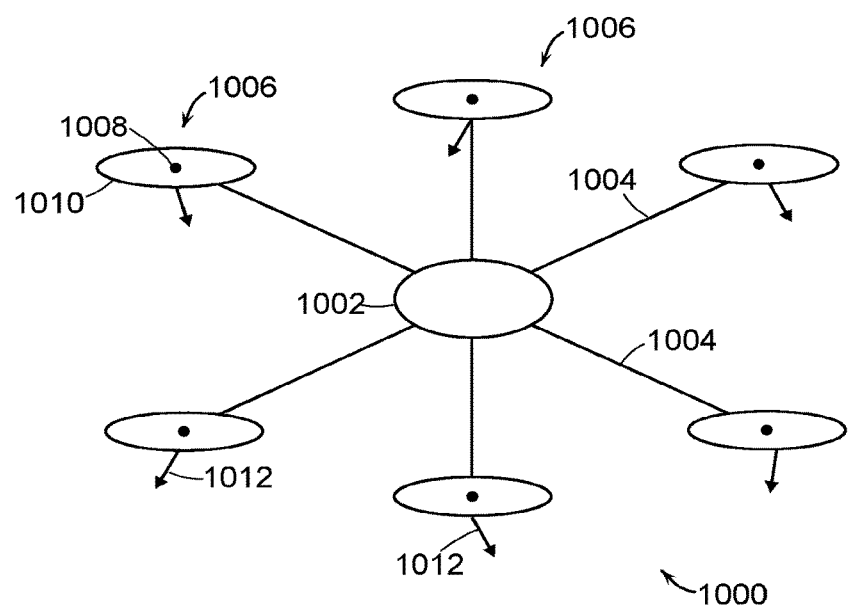
FIG. 24 is a perspective view of a multi-rotor helicopter.

Referring to FIG. 24, a second exemplary multi-rotor UAV helicopter 1000 includes a central body 1002 from which a number (i.e., n) of rigid spars 1004 radially extend. The end of each rigid spar 1004 includes a thruster 1006 rigidly mounted thereon. In some examples, each of the thrusters 1006 includes an electric motor 1008 (e.g., a brushless DC motor) which drives a rotor 1010 to generate thrust. Very generally, in operation the central body 1002 includes a power source which provides power to the motors 1008 which in turn cause the rotors 1010 to rotate. While rotating, each of the rotors 1010 forces air above the helicopter 1000 in a generally downward direction to generate a thrust having a magnitude and direction that can be represented as a thrust vector 1012.

Figure 25:
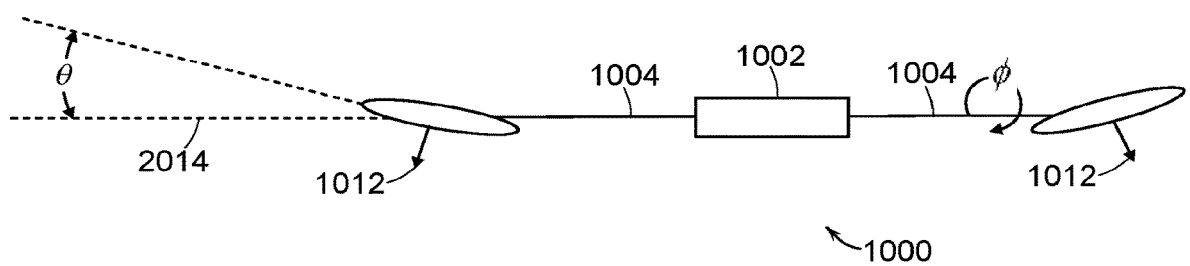
FIG. 25 is a side view of a multi-rotor helicopter.

Referring to FIG. 25, in contrast to conventional multi-rotor helicopter configurations, the multi-rotor helicopter 1000 of FIGS. 23 and 24 has each of its thrusters 1006 rigidly mounted with both a dihedral angle, $\theta$ and a twist angle, $\phi$. In some examples, both (1) the dihedral angle is the same for each spar 1004, and (2) the magnitude of the twist angle is the same for each spar 1004 with the sign of the twist angle being different for at least some of the spars 1004. To understand the mounting angles of the thrusters 1006, it is helpful to consider the plane defined by the rigid spars 1004 of the multi-rotor helicopter 1000 as being a horizontal plane 2014. With this in mind, mounting the thrusters 1006 with a dihedral angle includes mounting the thrusters 1006 at an angle, $\theta$ with respect to a line from the center of the rotor 1010 to the center of the central body 1002. Mounting a thruster 1006 with a twist angle at the end of a rigid spar 1004 includes mounting the thrusters 1006 at an angle, $\phi$ such that they are rotated about a longitudinal axis of the rigid spar 1004.

Due to the dihedral and twist mounting angles of the thrusters 1006, the thrust vectors 1012 are not simply perpendicular to the horizontal plane 2014 defined by the rigid spars 1004 of the multi-rotor helicopter 1000. Instead, at least some of the thrust vectors 1012 have a direction with an oblique angle to the horizontal plane 2014. The thrust force vectors, $\overline{F_i}$ are independent (i.e., no force vector is a multiple of other of the force vectors) or there are at least k (e.g., k=3, 6, etc.) independent thrust force vectors.

Figure 26:
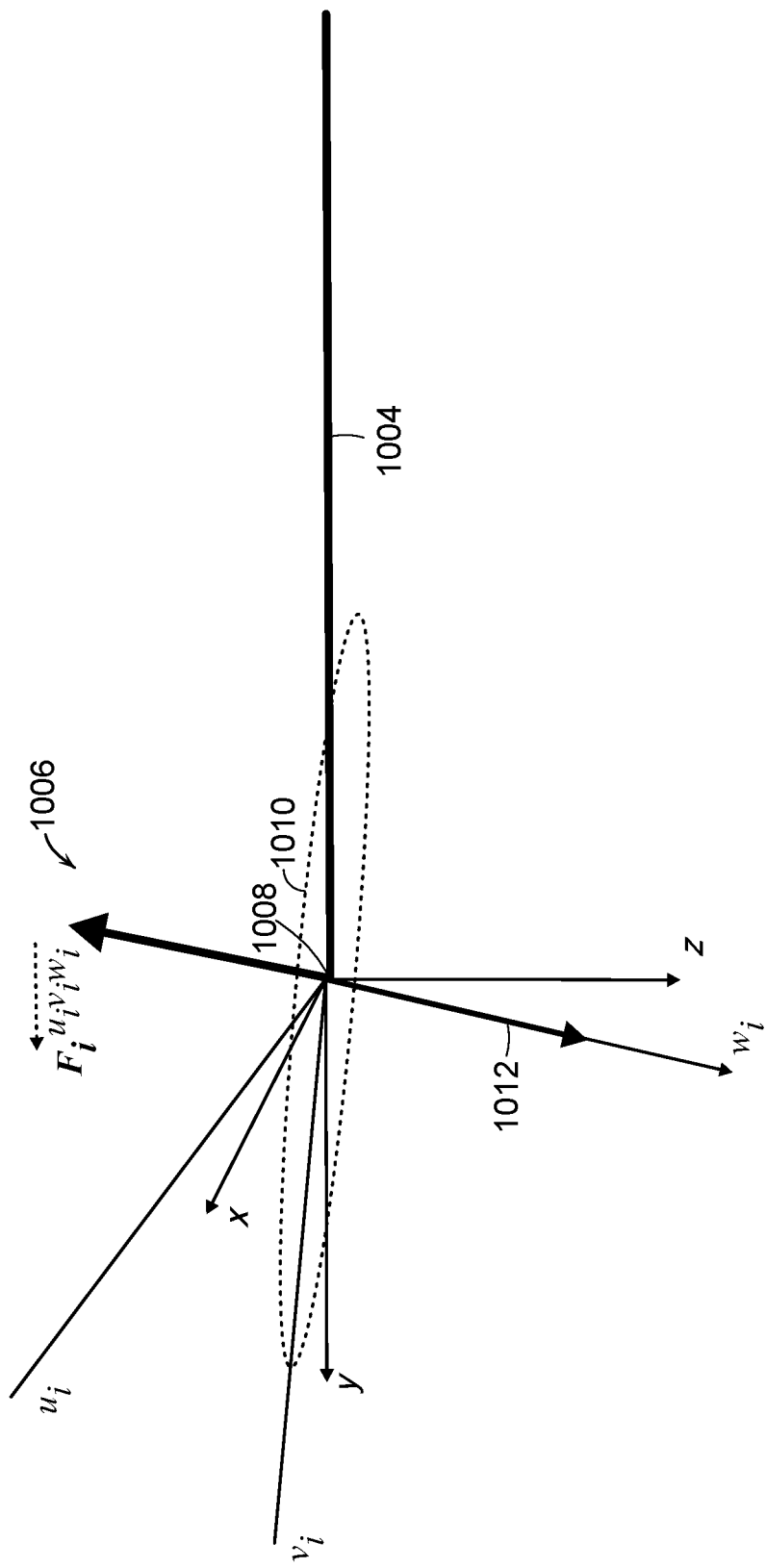
FIG. 26 is a detailed view of a thruster of the multi-rotor helicopter.

Referring to FIG. 26, a detailed view of an $i^{th}$ thruster 1006 shows two different coordinate systems: an x, y, z coordinate system and a $u_i$, $v_i$, $w_i$ coordinate system. The x, y, z coordinate system is fixed relative to the vehicle and has its z axis extending in a direction perpendicular to the horizontal plane defined by the rigid spars 1004 of the multi-rotor helicopter 1000. The x and y axes extend in a direction perpendicular to one another and parallel to the horizontal plane defined by the rigid spars 1004. In some examples, the x, y, z coordinate system is referred to as the "vehicle frame of reference." The $u_i$, $v_i$, $w_i$ coordinate system has its $w_i$ axis extending in a direction perpendicular to a plane defined by the rotating rotor 1010 of the $i^{th}$ thruster 1006 and its $u_i$ axis extending in a direction along the $i^{th}$ spar 1004. The $u_i$ and $v_i$ axes extend in a direction perpendicular to one another and parallel to the horizontal plane defined by the rotating rotor 1010. In some examples, the $u_i$, $v_i$, $w_i$ coordinate system is referred to as the "rotor frame of reference." Note that the x, y, z coordinate system is common for all of the thrusters 1006 while the $u_i$, $v_i$, $w_i$ is different for each (or at least some of) the thrusters 1006.

The rotational difference between the x, y, z and the $u_i$, $v_i$, $w_i$ coordinate systems for each of the n thrusters 1006 can be expressed as a rotation matrix $R_i$. In some examples, the rotation matrix $R_i$ can be expressed as the product of three separate rotation matrices as follows:

$$R_i = R_i^\psi R_i^\theta R_i^\phi$$

where $R_i^\psi$ is the rotation matrix that accounts for the rotation of the $i^{th}$ spar relative to the x, y, z coordinate system, $R_i^\theta$ is the rotation matrix that accounts for the dihedral angle, $\theta$ relative to the x, y, z coordinate system, and $R_i^\phi$ is the rotation matrix that accounts for the twist angle, $\phi$ relative to the x, y, z coordinate system.

Very generally, multiplying an arbitrary vector in the $u_i$, $v_i$, $w_i$ coordinate system by the rotation matrix $R_i$ results in a representation of the arbitrary vector in the x, y, z coordinate system. As is noted above, the rotation matrix $R_i$ at the $i^{th}$ spar depends on the spar number, i, the dihedral angle, $\theta$, and the twist angle, $\phi$. Since each spar has its own unique spar number, i, dihedral angle, $\theta$, and twist angle, $\phi$, each spar has a different rotation matrix, $R_i$. One example of a rotation matrix for a second spar with a dihedral angle of 15 degrees and a twist angle of $-15$ degrees is $$\begin{bmatrix} 0.4830 & -0.8700 & -0.0991 \\ 0.8365 & 0.4250 & 0.3459 \\ -0.2588 & -0.2500 & 0.9330 \end{bmatrix}$$

In general, the ith thrust vector 1012 can be represented as a force vector, $\overline{F_i^{x,y,z}}$ 113. The force vector, $\overline{F_i^{u_i v_i w_i}}$ 113 generated by the ith thruster 1006 extends only along the $w_i$ axis of the $u_i$, $v_i$, $w_i$ coordinate system for the ith thruster 1006. Thus, the ith force vector 1013 can be expressed as:

$$\overline{F_i^{u_i v_i w_i}} = \begin{bmatrix} 0 \\ 0 \\ f_i \end{bmatrix}$$

where $f_i$ represents the magnitude of the $i^{th}$ force vector 1013 along the $w_i$ axis of the $u_i$, $v_i$, $w_i$ coordinate system. In some examples, $f_i$ is expressed as:

$$f_i \approx k_1 \omega^2$$

where $k_1$ is an experimentally determined constant and $\omega_i^2$ is the square of the angular speed of the motor 1008.

The components of $i^{th}$ force vector 1013 in the x, y, z coordinate system can be determined by multiplying the $i^{th}$ force vector 1013 by the $i^{th}$ rotation matrix $R_i$ as follows:

$$\overline{F_i^{xyz}} = R_i \overline{F_i^{u_i v_i w_i}} = R_i \begin{bmatrix} 0 \\ 0 \\ f_i \end{bmatrix}$$

where $\overline{F_i^{xyz}}$ is a vector representation of the $i^{th}$ force vector 1013 in the x, y, z coordinate system.

The moment due to the $i^{th}$ thruster 1006 includes a motor torque component due to the torque generated by the thruster's motor 1008 and a thrust torque component due to the thrust generated by the rotor 1010 of the thruster 1006. For the $i^{th}$ thruster 1006, the motor rotates about the $w_i$ axis of the $u_i$, $v_i$, $w_i$ coordinate system, generating a rotating force in the $u_i$, $v_i$ plane. By the right hand rule, the motor torque generated by the $i^{th}$ thruster's motor 1008 is a vector having a direction along the $w_i$ axis. The motor torque vector for the $i^{th}$ thruster can be expressed as:

$$\overline{T_{1i}^{u_i v_i w_i}} = \begin{bmatrix} 0 \\ 0 \\ \tau_i \end{bmatrix}$$

where $$\tau_i \approx k_2 \omega_i^2,$$

with $k_2$ being an experimentally determined constant, and $\omega_i^2$ being the square of the angular speed of the motor 1008.

To express the motor torque vector in the x, y, z coordinate system, the motor torque vector is multiplied by the rotation matrix $R_i$ as follows:

$$\overline{T_{1i}^{xyz}} = R_i \overline{T_{1i}^{u_i v_i w_i}} = R_i \begin{bmatrix} 0 \\ 0 \\ \tau_i \end{bmatrix}$$

The torque due to the thrust generated by the rotor 1010 of the i$^{th}$ thruster 1006 is expressed as the cross product of the moment arm of the i$^{th}$ thruster 1006 in the x, y, z coordinate system, $\overline{r_i^{xyz}}$ and the representation of the i$^{th}$ force vector 1013 in the x, y, z coordinate system, $\overline{F_i^{xyz}}$:

$$\overline{T_{2i}^{xyz}} = \overline{r_i^{xyz}} \times \overline{F_i^{xyz}}$$

where the moment arm is expressed as the length of the i$^{th}$ spar 1004 along the $u_i$ axis of the $u_i$, $v_i$, $w_i$ coordinate system multiplied by the spar rotation matrix, $R_i^\varphi$.

$$\overline{r_i^{xyz}} = R_i^\varphi \begin{bmatrix} l \\ 0 \\ 0 \end{bmatrix}$$

The resulting moment due to the i$^{th}$ thruster 1006 can be expressed as:

$$\overline{M_i} = \overline{T_{1i}^{xyz}} + \overline{T_{2i}^{xyz}} = R_i \begin{bmatrix} 0 \\ 0 \\ \tau_i \end{bmatrix} + R_i^\varphi \begin{bmatrix} l \\ 0 \\ 0 \end{bmatrix} \times \begin{bmatrix} 0 \\ 0 \\ f_i \end{bmatrix}$$

The force vectors in the x, y, z coordinate system, $\overline{F_i^{xyz}}$ generated at each thruster 1006 can be summed to determine a net thrust vector:

$$\overline{F^{xyz}} = \sum_{i=1}^{n} \overline{F_i^{xyz}} = \sum_{i=1}^{n} R_i \begin{bmatrix} 0 \\ 0 \\ f_i \end{bmatrix}$$

By Newton's second law of motion, a net translational acceleration vector for the multi-rotor helicopter 1000 can be expressed as the net force vector in the x, y, z coordinate system, $\overline{F^{xyz}}$ divided by the mass, m of the multi-rotor helicopter 1000. For example, for a multi-rotor helicopter 1000 with n thrusters, the net translational acceleration vector can be expressed as:

$$\overline{a} = \frac{\overline{F^{xyz}}}{m} = \frac{1}{m} \sum_{i=1}^{n} R_i \begin{bmatrix} 0 \\ 0 \\ f_i \end{bmatrix}$$

The moments in the x, y, z coordinate system, $\overline{M_i^{xyz}}$ generated at each thruster 1006 can be summed to determine a net moment:

$$\overline{M^{xyz}} = \sum_{i=1}^{n} \overline{M_i^{xyz}} = \sum_{i=1}^{n} \left( R_i \begin{bmatrix} 0 \\ 0 \\ \tau_i \end{bmatrix} + R_i^\varphi \begin{bmatrix} l \\ 0 \\ 0 \end{bmatrix} \times R_i \begin{bmatrix} 0 \\ 0 \\ f_i \end{bmatrix} \right)$$

By Newton's second law of motion, a net angular acceleration vector for the multi-rotor helicopter 1000 can be expressed as the sum of the moments due to the n thrusters divided by the moment of inertia, J of the multi-rotor helicopter 1000. For example, for a multi-rotor helicopter 1000 with n thrusters, the net angular acceleration can be expressed as:

$$\overline{\alpha} = \frac{\overline{M^{xyz}}}{J} = \frac{1}{J} \sum_{i=1}^{n} \left( R_i \begin{bmatrix} 0 \\ 0 \\ \tau_i \end{bmatrix} + R_i^\varphi \begin{bmatrix} l \\ 0 \\ 0 \end{bmatrix} \times R_i \begin{bmatrix} 0 \\ 0 \\ f_i \end{bmatrix} \right)$$

Based on the above model of the multi-rotor helicopter 1000, it should be apparent to the reader that the magnitudes and directions of the overall translational acceleration vector $\overline{a}$ and the overall angular acceleration vector $\overline{\alpha}$ can be individually controlled by setting appropriate values for the angular speeds, $\omega_i$ for the motors 1008 of each of the n thrusters 1008.

Figure 27:
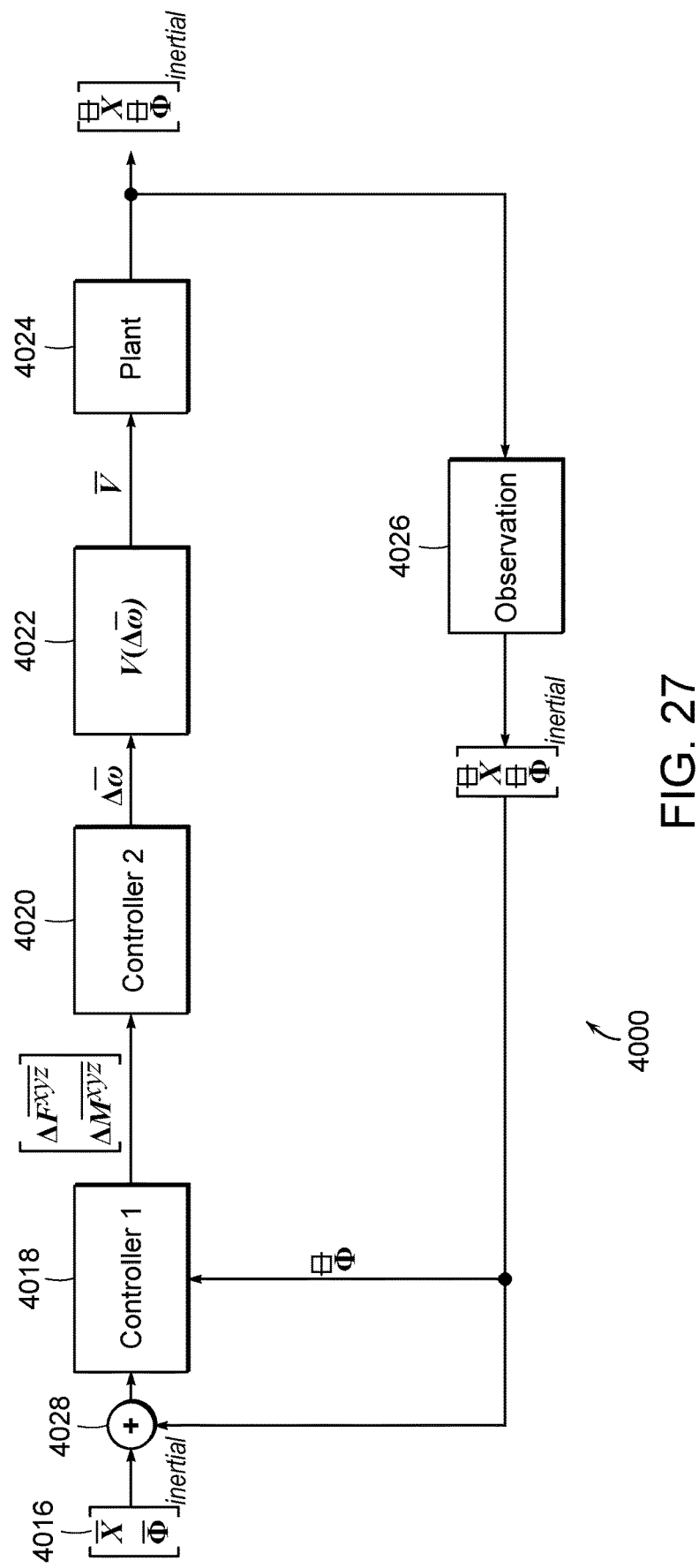
FIG. 27 is a block diagram of a first control system.

Referring to FIG. 27, in an exemplary approach to controlling a multi-rotor helicopter 1000, a multi-rotor helicopter control system 4000 receives a control signal 4016 including a desired position $\overline{x}$, in an inertial frame of reference (specified as an n, w, h (i.e., North, West, height) coordinate system (where the terms "inertial frame of reference" and n, w, h coordinate system are used interchangeably), and a desired rotational orientation $\overline{\Phi}$, in the inertial frame of reference (specified as a roll (R), pitch (P), and yaw (Y) in the inertial frame of reference), and generates a vector of voltages $\overline{v}$ used to drive the thrusters 1008 of the multi-rotor helicopter 1000 to move the multi-rotor helicopter 1000 to the desired position in space and the desired rotational orientation.

The control system 4000 includes a first controller module 4018, a second controller module 4020, an angular speed to voltage mapping function 4022, a plant 4024 (i.e., the multi-rotor helicopter 1000), and an observation module 4026. The control signal 4016, which is specified in the inertial frame of reference is provided to the first controller 4018 which processes the control signal 4016 to determine a differential thrust force vector, $\Delta \overline{F^{xyz}}$, and a differential moment vector, $\Delta \overline{M^{xyz}}$, each specified in the frame of reference of the multi-rotor helicopter 1000 (i.e., the x, y, z coordinate system). In some examples, differential vectors can be viewed as a scaling of a desired thrust vector. For example, the gain values for the control system 4000 may be found using empiric tuning procedures and therefore encapsulates a scaling factor. For this reason, in at least some embodiments, the scaling factor does not need to be explicitly determined by the control system 4000. In some examples, the differential vectors can be used to linearize the multi-rotor helicopter system around a localized operating point.

In some examples, the first controller 4018 maintains an estimate of the current force vector and uses the estimate to determine the differential force vector in the inertial frame of reference, $\Delta \overline{F^{inertial}}$, as a difference in the force vector required to achieve the desired position in the inertial frame of reference. Similarly, the first controller 4018 maintains an estimate of the current moment vector in the inertial frame of reference and uses the estimate to determine the differential moment vector in the inertial frame of reference, $\Delta \overline{M^{inertial}}$, as a difference in the moment vector required to achieve the desired rotational orientation in the inertial frame of reference. The first controller 4018 then applies a rotation matrix to the differential force vector in the inertial frame, $\Delta \overline{F^{inertial}}$, to determine its representation in the x, y, z coordinate system of the multi-rotor helicopter 1000, $\Delta \overline{F^{xyz}}$. Similarly, the first controller 4018 applies the rotation matrix to the differential moment vector in the inertial frame of reference, $\Delta \overline{M^{inertial}}$, to determine its representation in the x, y, z coordinate system of the multi-rotor helicopter 1000, $\Delta \overline{M^{xyz}}$.

The representation of the differential force vector in the x, y, z coordinate system, $\Delta \overline{F^{xyz}}$, and the representation of the differential moment vector in the x, y, z coordinate system, $\Delta \overline{M^{xyz}}$, are provided to the second controller 4020 which determines a vector of differential angular motor speeds:

$$\Delta \vec{\omega} = \begin{bmatrix} \Delta \omega_1 \\ \Delta \omega_2 \\ \vdots \\ \Delta \omega_n \end{bmatrix}$$

As can be seen above, the vector of differential angular motor speeds, $\Delta \vec{\omega}$, includes a single differential angular motor speed for each of the n thrusters 1006 of the multi-rotor helicopter 1000. Taken together, the differential angular motor speeds represent the change in angular speed of the motors 1008 required to achieve the desired position and rotational orientation of the multi-rotor helicopter 1000 in the inertial frame of reference.

In some examples, the second controller 4020 maintains a vector of the current state of the angular motor speeds and uses the vector of the current state of the angular motor speeds to determine the difference in the angular motor speeds required to achieve the desired position and rotational orientation of the multi-rotor helicopter 1000 in the inertial frame of reference.

The vector of differential angular motor speeds, $\Delta \vec{\omega}$, is provided to the angular speed to voltage mapping function 4022 which determines a vector of driving voltages:

$$\vec{V} = \begin{bmatrix} V_1 \\ V_2 \\ \vdots \\ V_n \end{bmatrix}$$

As can be seen above, the vector of driving voltages, $\vec{V}$, includes a driving voltage for each motor 1008 of the n thrusters 1006. The driving voltages cause the motors 1008 to rotate at the angular speeds required to achieve the desired position and rotational orientation of the multi-rotor helicopter 1000 in the inertial frame of reference.

In some examples, the angular speed to voltage mapping function 4022 maintains a vector of present driving voltages, the vector including the present driving voltage for each motor 1008. To determine the vector of driving voltages, $\vec{V}$, the angular speed to voltage mapping function 4022 maps the differential angular speed, $\Delta \omega_i$, for each motor 1008 to a differential voltage. The differential voltage for each motor 1008 is applied to the present driving voltage for the motor 1008, resulting in the updated driving voltage for the motor, $V_i$. The vector of driving voltages, $\vec{V}$, includes the updated driving voltages for each motor 1008 of the i thrusters 1006.

The vector of driving voltages, $\vec{V}$, is provided to the plant 4024 where the voltages are used to drive the motors 1008 of the i thrusters 1006, resulting in the multi-rotor helicopter 1000 translating and rotating to a new estimate of position and orientation:

$$\begin{bmatrix} \vec{X} \\ \vec{\Phi} \end{bmatrix}$$

The observation module 4026 observes the new position and orientation and feeds it back to a combination node 4028 as an error signal. The control system 4000 repeats this process, achieving and maintaining the multi-rotor helicopter 1000 as close as possible to the desired position and rotational orientation in the inertial frame of reference.

Figure 28:
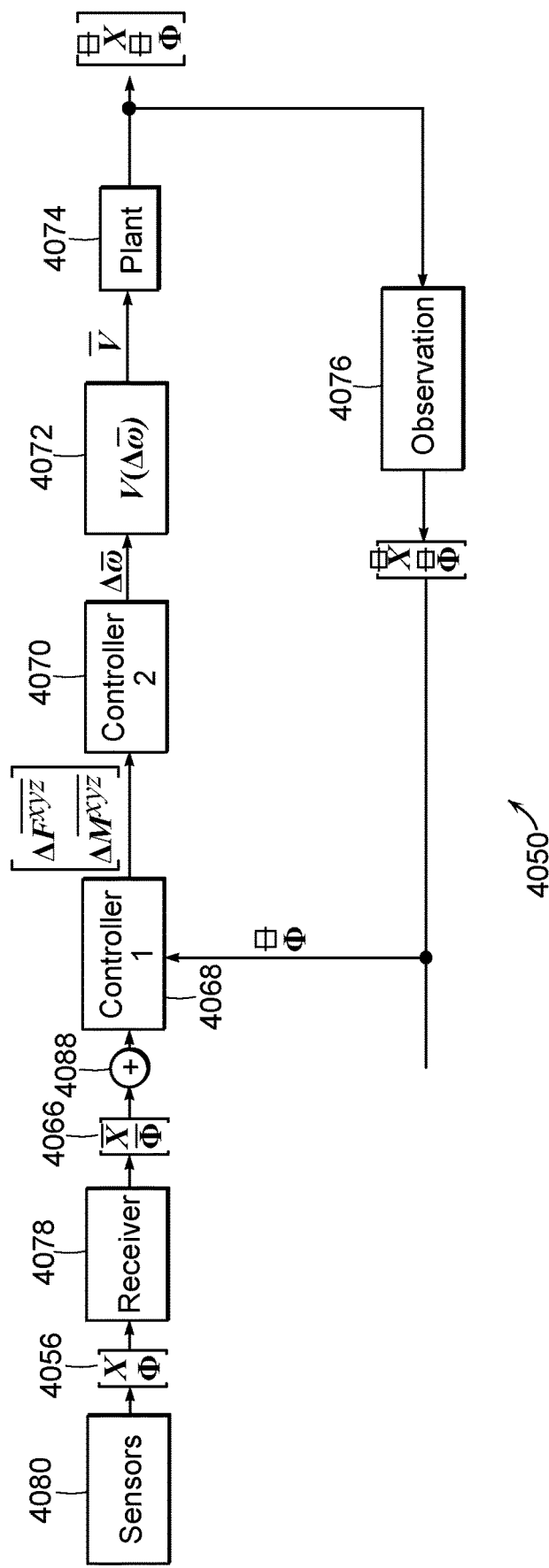
FIG. 28 is a block diagram of a second control system.

Referring to FIG. 28, in an exemplary approach to controlling a multi-rotor helicopter relative to a mobile target, a multi-rotor helicopter control system 4050 receives one or more sensor signals 4056 from one or more sensors 4080. The one or more sensor signals 4056 are associated with a position and a rotational orientation of the mobile target. The mobile target may be, for example, a mobile delivery platform connected to a car or a boat. The one or more sensor signals 4056 are used by the control system 4050 to generate a vector of voltages, $\vec{V}$, which are used to drive thrusters 1008 of the multi-rotor helicopter 1000 to move the multi-rotor helicopter 1000 to the desired position in space and the desired rotational orientation associated with the position and the rotational orientation of the mobile target. This exemplary approach enables the multi-rotor helicopter 1000 to automatically rotate the rotors to generate thrust to enable the multi-rotor helicopter 1000 to establish and maintain the position and the rotational orientation of the mobile target. For example, the multi-rotor helicopter 1000 may establish and maintain the position and the rotational orientation of the mobile target during deliveries to the mobile target and/or during take-off and landing procedures associated with the mobile target.

The control system 4050 includes a first controller module 4068, a second controller module 4070, an angular speed to voltage mapping function 4072, a plant 4074 (i.e., the multi-rotor helicopter 1000), an observation module 4076, and a receiver module 4078. One or more sensor signals 4056 from one or more sensors 4080 associated with the mobile target are wirelessly transmitted to the receiver module 4078. The one or more sensor signals 4056 includes a position x (specified as, for example, GPS coordinates) and a rotational orientation $\Phi_x$ (specified, for example, as a roll (R), pitch (P), and yaw (Y)) of the mobile target.

Receiver module 4078 transmits control signal 4066 to the first controller 4068 based on the position and rotational orientation of the mobile target received in the one or more sensor signals 4056. Control signal 4066 includes a desired position, $\vec{x}$, in the frame of reference (specified as an n, w, h (i.e., North, West, height) coordinate system) and a desired rotational orientation $\vec{\Phi}$ in the frame of reference (specified as a roll (R), pitch (P), and yaw (Y) in the frame of reference). As described below, control signal 4066 is used to generate a vector of voltages, $\vec{V}$, which are used to drive the thrusters 1008 of the multi-rotor helicopter 1000 to move the multi-rotor helicopter 1000 to the desired position in space and the desired rotational orientation associated with the mobile target. The frame of reference may be inertial or non-inertial depending on the movement of the mobile target.

The control signal 4066, which is specified in the frame of reference is provided to the first controller 4068 which processes the control signal 4066 to determine a differential thrust force vector, $\Delta \overline{F^{\infty}}$, and a differential moment vector, $\Delta \overline{M^{\infty}}$, each specified in the frame of reference of the multi-rotor helicopter 1000 (i.e., the x, y, z coordinate system) relative to the position of the mobile target. In some examples, differential vectors can be viewed as a scaling of a desired thrust vector. For example, the gain values for the control system 4050 may be found using empiric tuning procedures and therefore encapsulates a scaling factor. For this reason, in at least some embodiments, the scaling factor does not need to be explicitly determined by the control system 4050. In some examples, the differential vectors can be used to linearize the multi-rotor helicopter system around a localized operating point.

In some examples, the first controller 4068 maintains an estimate of the current force vector and uses the estimate to determine the differential force vector in the frame of reference, $\Delta \overline{F}$, as a difference in the force vector required to achieve the desired position in the frame of reference. Similarly, the first controller 4068 maintains an estimate of the current moment vector in the frame of reference and uses the estimate to determine the differential moment vector in the frame of reference, $\Delta \overline{M}$, as a difference in the moment vector required to achieve the desired rotational orientation in the frame of reference. The first controller 4068 then applies a rotation matrix to the differential force vector in the frame, $\Delta \overline{F}$, to determine its representation in the x, y, z coordinate system of the multi-rotor helicopter 1000, $\Delta \overline{F^{\infty}}$. Similarly, the first controller 4068 applies the rotation matrix to the differential moment vector in the frame of reference, $\Delta \overline{M}$, to determine its representation in the x, y, z coordinate system of the multi-rotor helicopter 1000, $\Delta \overline{M^{\infty}}$.

The representation of the differential force vector in the x, y, z coordinate system, $\Delta \overline{F^{\infty}}$, and the representation of the differential moment vector in the x, y, z coordinate system, $\Delta \overline{M^{\infty}}$, are provided to the second controller 4070 which determines a vector of differential angular motor speeds:

$$\Delta \overline{\omega} = \begin{bmatrix} \Delta \omega_1 \\ \Delta \omega_2 \\ \vdots \\ \Delta \omega_n \end{bmatrix}$$

As can be seen above, the vector of differential angular motor speeds, $\Delta \overline{\omega}$, includes a single differential angular motor speed for each of the n thrusters 1006 of the multi-rotor helicopter 1000. Taken together, the differential angular motor speeds represent the change in angular speed of the motors 1008 required to achieve the desired position and rotational orientation of the multi-rotor helicopter 1000 in the frame of reference relative to the mobile target.

In some examples, the second controller 4070 maintains a vector of the current state of the angular motor speeds and uses the vector of the current state of the angular motor speeds to determine the difference in the angular motor speeds required to achieve the desired position and rotational orientation of the multi-rotor helicopter 1000 in the frame of reference.

The vector of differential angular motor speeds, $\Delta \overline{\omega}$, is provided to the angular speed to voltage mapping function 4072 which determines a vector of driving voltages:

$$\overline{V} = \begin{bmatrix} V_1 \\ V_2 \\ \vdots \\ V_n \end{bmatrix}$$

As can be seen above, the vector of driving voltages, $\overline{V}$, includes a driving voltage for each motor 1008 of the n thrusters 1006. The driving voltages cause the motors 1008 to rotate at the angular speeds required to achieve the desired position and rotational orientation of the multi-rotor helicopter 1000 in the frame of reference.

In some examples, the angular speed to voltage mapping function 4072 maintains a vector of present driving voltages, the vector including the present driving voltage for each motor 1008. To determine the vector of driving voltages, $\overline{V}$, the angular speed to voltage mapping function 4072 maps the differential angular speed, $\Delta \omega_i$, for each motor 1008 to a differential voltage. The differential voltage for each motor 1008 is applied to the present driving voltage for the motor 1008, resulting in the updated driving voltage for the motor, $V_i$. The vector of driving voltages, $\overline{V}$, includes the updated driving voltages for each motor 1008 of the i thrusters 1006.

The vector of driving voltages, $\overline{V}$, is provided to the plant 4074 where the voltages are used to drive the motors 1008 of the i thrusters 1006, resulting in the multi-rotor helicopter 1000 translating and rotating to a new estimate of position and rotational orientation:

$$\begin{bmatrix} \overline{X} \\ \overline{\Phi} \end{bmatrix}$$

The observation module 4076 observes the new position and rotational orientation and feeds it back to a combination node 4082 as an error signal. The new position and rotational orientation may be determined using an onboard camera(s) and/or onboard sensors and/or positioning information received from the one or more sensors 4080. The control system 4050 repeats this process, achieving and maintaining the multi-rotor helicopter 1000 as close as possible to the desired position and rotational orientation in the frame of reference relative to the mobile target.

Figure 29:
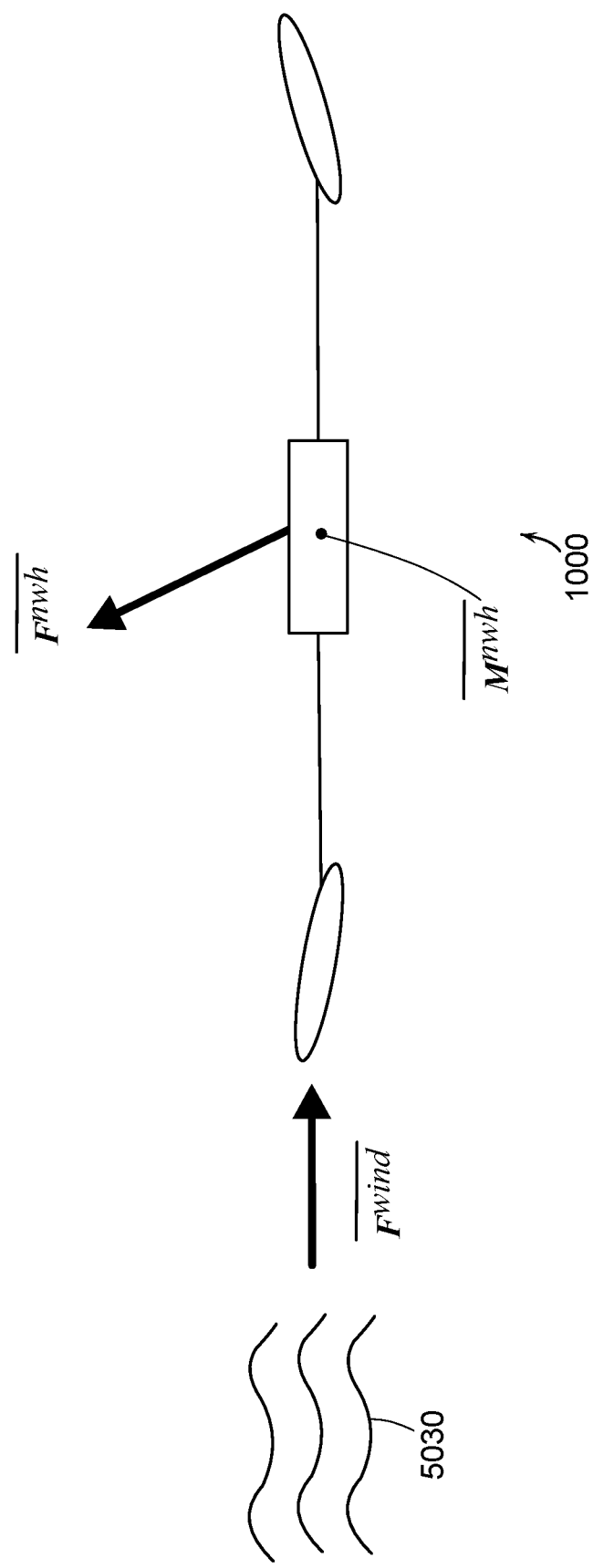
FIG. 29 shows the multi-rotor helicopter operating in the presence of a prevailing wind.

Referring to FIG. 29, in some examples, a multi-rotor helicopter 1000 is tasked to hover at a given position $\overline{X}$ in an inertial frame of reference in the presence a prevailing wind 5030. For example, the multi-rotor helicopter 1000 may be performing a package delivery requiring the multi-rotor helicopter 1000 to hover above a delivery location. The wind causes exertion of a horizontal force, $\overline{F}_{wind}$, on the multi-rotor helicopter 1000, tending to displace the multi-rotor helicopter 1000 in the horizontal direction.

Conventional multi-rotor helicopters may have to tilt their frames into the wind and adjust the thrust generated by their thrusters to counter the horizontal force of the wind, thereby avoiding displacement. However, tilting the frame of a multi-rotor helicopter into wind increases the profile of the multi-rotor helicopter that is exposed to the wind. The increased profile results in an increase in the horizontal force applied to the multi-rotor helicopter due to the wind. The multi-rotor helicopter must then further tilt into the wind and further adjust the thrust generated by its thrusters to counter the increased wind force. Of course, further tilting into the wind further increases the profile of the multi-rotor helicopter that is exposed to the wind. It should be apparent to the reader that tilting a multi-rotor helicopter into the wind results in a vicious cycle that wastes energy.

The approaches described above address this issue by enabling motion of the multi-rotor helicopter 1000 horizontally into the wind without tilting the frame of the multi-rotor helicopter 1000 into the wind. To do so, the control system described above causes the multi-rotor helicopter 1000 to vector its net thrust such that a force vector $\overline{F^{mvi}}$ is applied to the multi-rotor helicopter 1000. The force vector $\overline{F^{mvi}}$ has a first component that extends upward along the h axis of the inertial frame with a magnitude equal to the gravitational constant, g, exerted on the multi-rotor helicopter 1000. The first component of the force vector, $\overline{F^{mvi}}$, maintains the altitude of the multi-rotor helicopter 1000 at the altitude associated with the given position. The force vector, $\overline{F^{mvi}}$, has a second component extending in a direction opposite (i.e., into) the force exerted by the wind and having a magnitude equal to the magnitude of the force, $\overline{F^{wind}}$, exerted by the wind. The second component of the force vector maintains the position of the multi-rotor helicopter 1000 in the n, w plane of the inertial frame of reference.

To maintain its horizontal orientation, $\overline{\Phi}$, in the inertial frame of reference, the control system described above causes the multi-rotor helicopter 1000 to maintain the magnitude of its moment vector, $\overline{M^{mvi}}$, at or around zero. In doing so, any rotation about the center of mass of the multi-rotor helicopter 1000 is prevented as the multi-rotor helicopter 1000 vectors its thrust to oppose the wind.

In this way the force vector, $\overline{F^{mvi}}$, and the moment vector, $\overline{M^{mvi}}$, maintained by the multi-rotor helicopter's control system enable the multi-rotor helicopter 1000 to compensate for wind forces applied thereto without rotating and increasing the profile that the helicopter 1000 presents to the wind.

Figure 30:
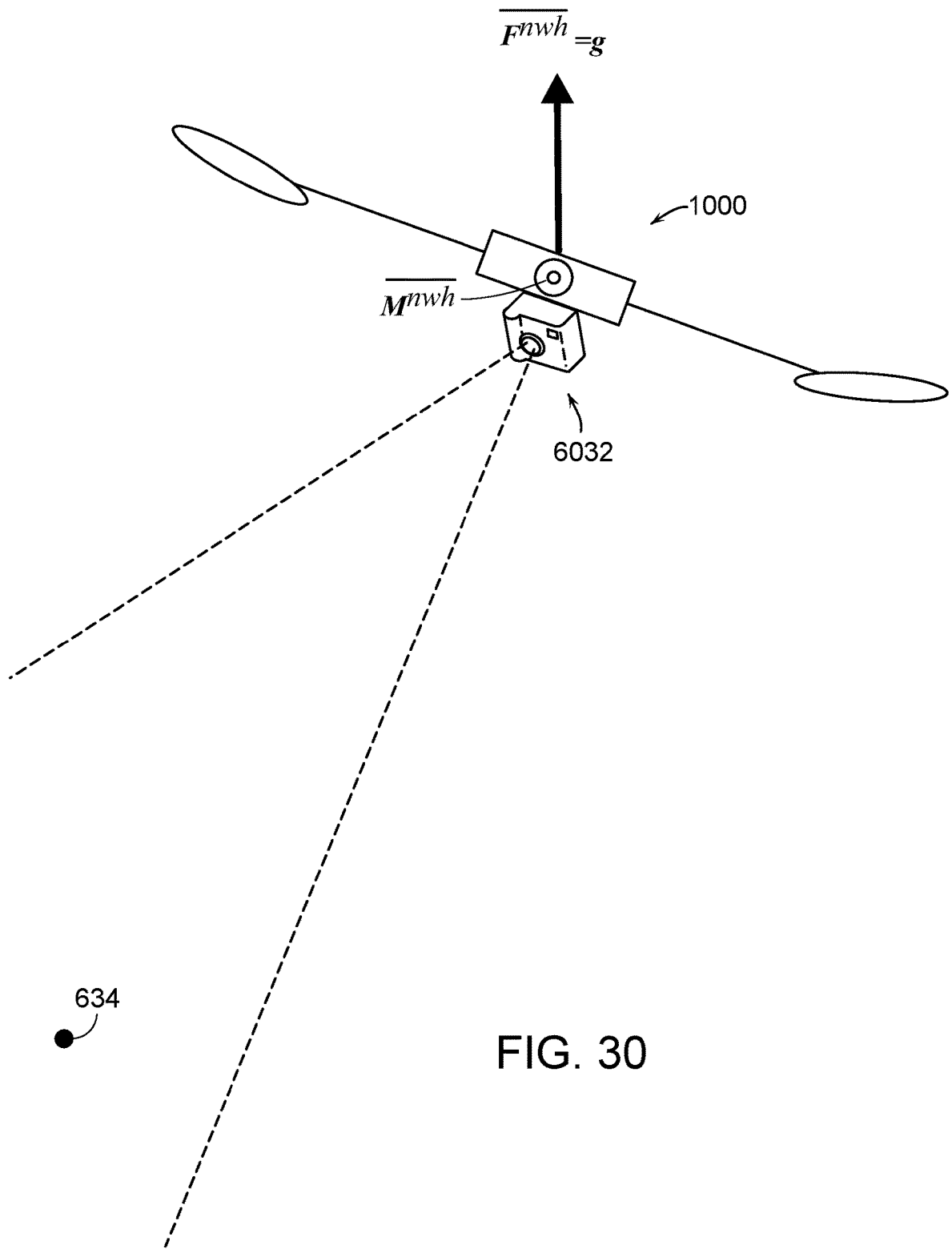
FIG. 30 shows the multi-rotor helicopter rotating without changing its position.

Referring to FIG. 30, it is often the case that an imaging sensor 6032 (e.g., a camera) is attached to the multi-rotor helicopter 1000 for the purpose of capturing images of a point of interest 634 on the ground beneath the multi-rotor helicopter 1000. In general, it is often desirable to have the multi-rotor helicopter 1000 hover in one place while the imaging sensor 6032 captures images. Conventional multi-rotor helicopters are unable to orient the imaging sensor 6032 without tilting their frames (and causing horizontal movement) and therefore require expensive and heavy gimbals for orienting their imaging sensors.

The approaches described above obviate the need for such gimbals by allowing the multi-rotor helicopter 1000 to rotate its frame in the inertial plane while maintaining its position in the inertial plane. In this way, the imaging sensor 6032 can be statically attached to the frame of the multi-rotor helicopter 1000 and the helicopter can tilt its frame to orient the imaging sensor 6032 without causing horizontal movement of the helicopter. To do so, upon receiving a control signal characterizing a desired imaging sensor orientation, $\overline{\Phi}$, the control system described above causes the moment vector, $\overline{M^{mvi}}$, of the multi-rotor helicopter 1000 to extend in a direction along the horizontal (n, w) plane in the inertial frame of reference, with a magnitude corresponding to the desired amount of rotation. To maintain the position, $\overline{x}$, of the multi-rotor helicopter 1000 in the inertial frame of reference, the control system causes the multi-rotor helicopter 1000 to vector its net thrust such that a force vector, $\overline{F^{mvi}}$, is applied to the multi-rotor helicopter 1000. The force vector, $\overline{F^{mvi}}$, extends only along the h-axis of the inertial frame of reference and has a magnitude equal to the gravitational constant, g. By independently setting the force vector, $\overline{F^{mvi}}$, and the moment vector, $\overline{M^{mvi}}$, the multi-rotor helicopter 1000 can rotate about its center while hovering in one place.

As is noted above, conventional multi-rotor helicopters are controlled in roll, pitch, yaw, and net thrust. Such helicopters can become unstable (e.g., an oscillation in the orientation of the helicopter) when hovering in place. Some such helicopters include gimbaled imaging sensors. When a conventional helicopter hovers in place, its unstable behavior can require that constant maintenance of the orientation of gimbaled imaging sensor to compensate for the helicopter's instability.

Figure 31:
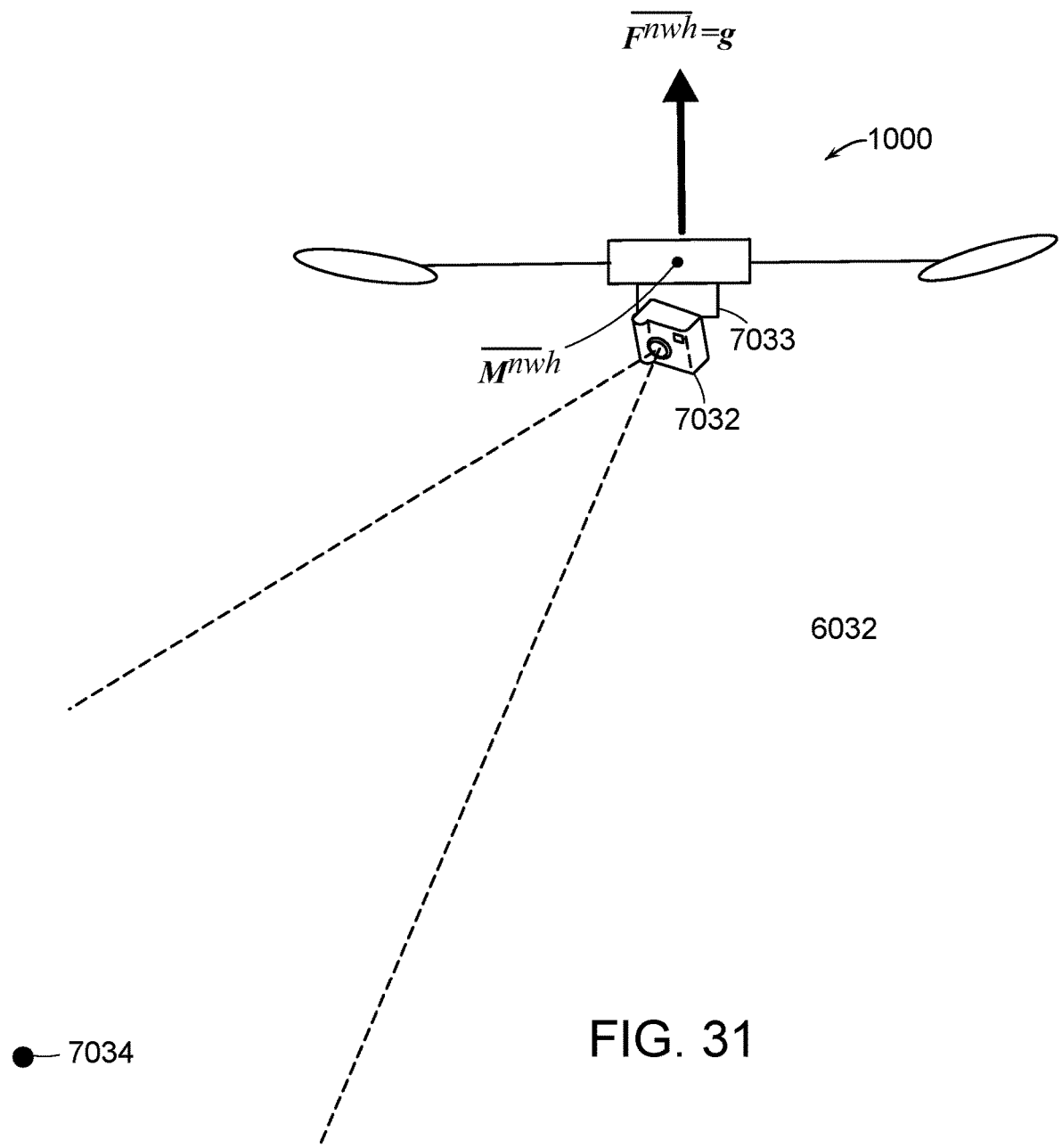
FIG. 31 shows the multi-rotor helicopter including a gimbaled imaging sensor hovering.

Referring to FIG. 31, the approaches described above advantageously reduce or eliminate the instability of a multi-rotor helicopter 1000 when hovering by allowing for independent control of each axis of the helicopter's orientation. In FIG. 31, an imaging sensor 7032 is attached to the multi-rotor helicopter 1000 by a gimbal 7033. The imaging sensor 7032 is configured to capture images on the ground beneath the multi-rotor helicopter 1000. In general, it is often desirable to have the multi-rotor helicopter 1000 hover in one place while the imaging sensor 7032 is captures images of a given point of interest 7034.

To hover in one place with high stability, the multi-rotor helicopter 1000 receives a control signal characterizing a desired spatial position, $\overline{x}$, and a desired spatial orientation, $\overline{\Phi}$, for the multi-rotor helicopter 1000. In the example of FIG. 31, the desired spatial orientation for the helicopter 1000 has the helicopter hovering horizontally with respect to the inertial frame of reference.

The control system described above receives the control signal and maintains the spatial position, $\overline{x}$, of the multi-rotor helicopter 1000 in the inertial frame of reference by causing the multi-rotor helicopter 1000 to vector its net thrust such that a force vector, $\overline{F^{mvi}}$, is applied to the multi-rotor helicopter 1000. The force vector, $\overline{F^{mvi}}$, extends only along the h-axis of the inertial frame of reference and has a magnitude equal to the gravitational constant, g.

The control system maintains the spatial orientation, $\overline{\Phi}$, of the multi-rotor helicopter 1000 by causing the multi-rotor helicopter 1000 to vector its moment such that a moment vector, $\overline{M^{mvi}}$, has a magnitude of approximately zero. The control system maintains the force vector, $\overline{F^{mvi}}$, and the moment vector, $\overline{M^{mvi}}$, such that the multi-rotor helicopter 1000 hovers in place with high stability.

Due to the high stability of the hovering multi-rotor helicopter 1000, little or no maintenance of the gimbal orientation is necessary to train the imaging sensor 7032 on the point of interest 7034.

In some examples, an imaging sensor 7032 and/or other sensor type (i.e., a speed sensor, a position sensor, laser range finder, acoustic sensor etc.) may be attached to each spar of the multi-rotor helicopter 1000 with a stationary mount or by a gimbal 7033.

In some examples, an aerodynamic body can be added to the multi-rotor helicopter 1000 to reduce drag due to prevailing winds.

While the above approaches describe a helicopter including multiple thrusters, other types of thrust generators could be used instead of the thrusters.

While the above description relates mostly to the use of multi-rotor UAVs, other types of UAVs, such as those well known in the art can be used.

In some examples, the UAV (i.e., UAV 1102 and/or multi-rotor helicopter 1000) includes deployable flaps that are deployed by the UAV to gain positive lift. The deployable flaps may be added to the rotors of the UAV. For example, the flaps may be situated on the trailing edge of each rotor to increase the lift. The UAV may retract the flaps for increased stability while hovering.

In some examples, the UAV is programmed such that it always moves to a location where there are not people present directly underneath the UAV before it lowers or drops the package.

While many of the UAV airframes described above include an even number of rotors, in some examples, an odd number of rotors can be used (e.g., in cases where one of the rotors is used for lateral movement of the UAV while the other rotors are used to provide vertical thrust).

It is to be understood that the foregoing description is intended to illustrate and not to limit the scope of the invention, which is defined by the scope of the appended claims. Other embodiments are within the scope of the following claims.

In some examples, a hybrid control scheme is used to control the multi-rotor helicopter. For example, the multi-rotor helicopter may use the thrust vectoring approaches described above to maintain its position in the presence of light winds but may switch to a classical tilting strategy if the prevailing wind becomes too strong to overcome with the thrust vectoring approaches.

It is noted that the control systems described above are only examples of a control systems that can be used to control the multi-rotor helicopter and other control systems using, for example, non-linear special Euclidean group 3 (i.e., SE(3)) techniques, can also be used.

In the examples described above, a multi-rotor helicopter includes six thrust generators, each thrust generator generating thrust in a different direction from all of the other thrust generators. By generating thrust in six different directions, all of the forces and moments on the multi-rotor helicopter can be decoupled (i.e., the system can be expressed as a system of six equations with six unknowns). In some examples, the multi-rotor helicopter can include additional (e.g., ten) thrust generators, each generating thrust in a different direction from all of the other thrust generators. In such examples, the system is overdetermined, allowing for finer control of at least some of the forces and moments on the multi-rotor helicopter. In other examples, the multi-rotor helicopter can include fewer than six thrust generators, each generating thrust in a different direction from all of the other thrust generators.

In such examples, decoupling all of the forces and moments on the multi-rotor helicopter is not possible since the expression of such a system would be underdetermined (i.e., there would be more unknowns than there would be equations). However, a system designer may select certain forces and/or moments to control independently, still yielding performance advantages in certain scenarios.

It should be understood that the configuration of the thrust locations, thrust directions, motor directions of rotation, and maximum rotation speed or thrust produced by each motor can be selected according to various criteria, while maintaining the ability to control the multiple (e.g., six) motor speeds according to net linear thrust force (e.g. three constraints) and net torque (e.g., a further three constraints). In some examples, all the motors rotate in the same direction. For a given set of thrust locations (e.g., a symmetric arrangement with the thrust locations at a fixed radius and spaced at 60 degrees), the thrust direction are selected according to a design criterion. For example, the thrust directions are selected to provide equal thrust in a hover mode with the net force being vertical and no net torque. In some examples, the thrust directions are selected to achieve a desired controllability "envelope", or optimize such an envelope subject to a criterion or a set of constraints, of achievable net thrust vectors given constraints on the motor rotation speeds. As an example, the following set of thrust directions provides equal torque and common rotation direction in a hover mode:

In one exemplary configuration, the twist angles are equal, but changing in sign. For example, the dihedral angle for each of the motors is +15 degrees, and the twist angle for the motors alternates between +/−15 degrees. For this exemplary configuration, the matrix $$\begin{bmatrix} -2.50 & -0.72 & 6.79 & 0.63 & 1.18 & 0.18 \\ 2.50 & -0.72 & -6.79 & 0.63 & -1.18 & 0.18 \\ 1.87 & -1.81 & 6.79 & -1.33 & -0.05 & 0.18 \\ -0.63 & 2.52 & -6.79 & 0.71 & 1.13 & 0.18 \\ 0.63 & 2.52 & 6.79 & 0.71 & -1.13 & 0.18 \\ -1.87 & -1.81 & -6.79 & -1.33 & 0.05 & 0.18 \end{bmatrix}$$

satisfies all of the above conditions.

If, however, the dihedral angle for the above configuration is −15, then the matrix $$\begin{bmatrix} 0.63 & -2.52 & 6.79 & 0.71 & 1.13 & 0.18 \\ -0.63 & -2.52 & -6.79 & 0.71 & -1.13 & 0.18 \\ 1.87 & 1.81 & 6.79 & -1.33 & 0.05 & 0.18 \\ 2.50 & 0.72 & -6.79 & 0.63 & 1.18 & 0.18 \\ -2.50 & 0.72 & 6.79 & 0.63 & -1.18 & 0.18 \\ -1.87 & 1.81 & -6.79 & -1.33 & -0.05 & 0.18 \end{bmatrix}$$

satisfies all of the above conditions.

In another exemplary configuration, the dihedral angle is +15, the propellers all spin counter-clockwise, and the twist angle for the motors alternates between −22 and +8 degrees, then the matrix $$\begin{bmatrix} 1.18 & -1.92 & 3.69 & 0.78 & 1.16 & 0.18 \\ -0.16 & -3.43 & -3.46 & 0.78 & -1.16 & 0.18 \\ 1.08 & 1.98 & 3.69 & -1.39 & 0.10 & 0.18 \\ 3.05 & 1.58 & -3.46 & 0.61 & 1.25 & 0.18 \\ -2.25 & -0.06 & 3.69 & 0.61 & -1.25 & 0.18 \\ -2.89 & 1.85 & -3.46 & -1.39 & -0.10 & 0.18 \end{bmatrix}$$

satisfies all of the above conditions.

Referring to FIGS. 8-11, a number of plots illustrate a controllability envelope for an aerial vehicle configured with its motors spinning in alternating directions, a 15 degree dihedral angle, and alternating 15 degree twist angle. In the configuration shown in the figures, the yaw torque on the vehicle is commanded to be 0 Nm and the propeller curve for a 17×9" propeller is used. Note that the propeller constant does not affect generality.

Figure 32:
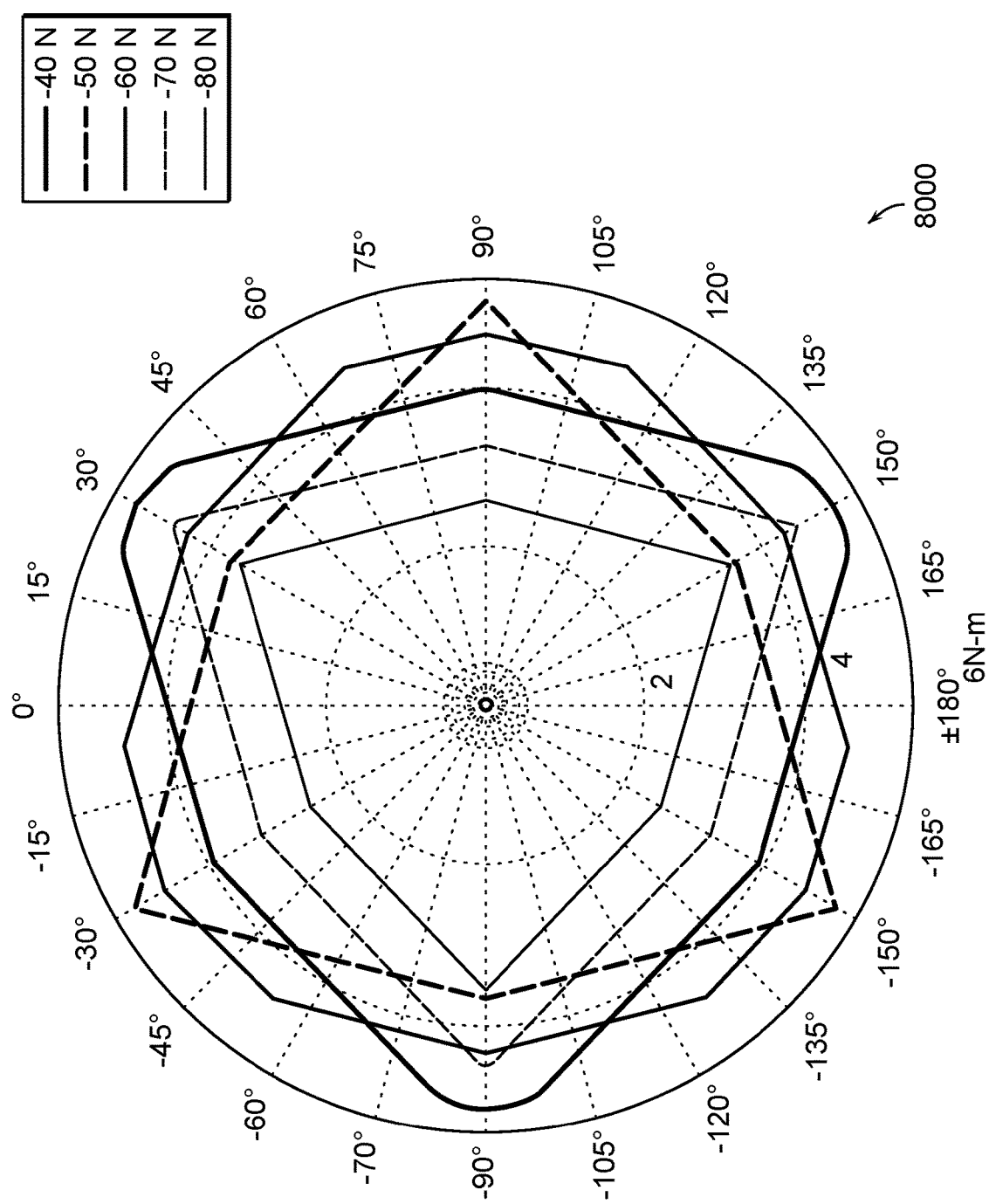
FIG. 32 is a plot showing a roll and pitch controllability envelope in Nm at various weights, with no lateral thrust being generated.

Referring to FIG. 32, a plot 8000 shows a roll and pitch controllability envelope in Nm at various vehicle weights, with no lateral thrust being generated.

Figure 33:
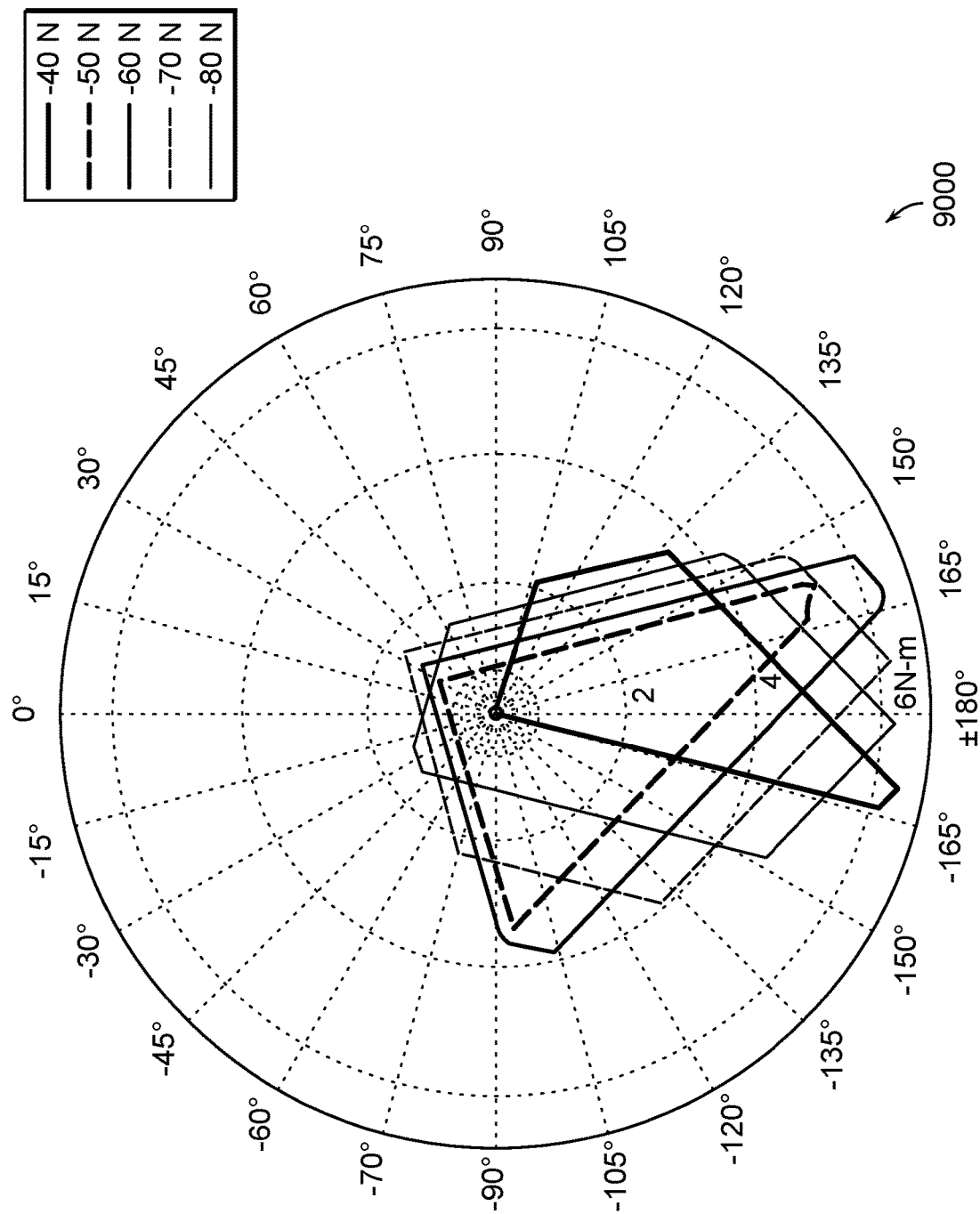
FIG. 33 is a plot showing a roll and pitch controllability envelope in Nm at various weights with a 1 m/s$^2$ rightward thrust being generated.

Referring to FIG. 33, a plot 9000 shows a roll and pitch controllability envelope in Nm at various vehicle weights with a 1 m/s² rightward thrust being generated.

Figure 34:
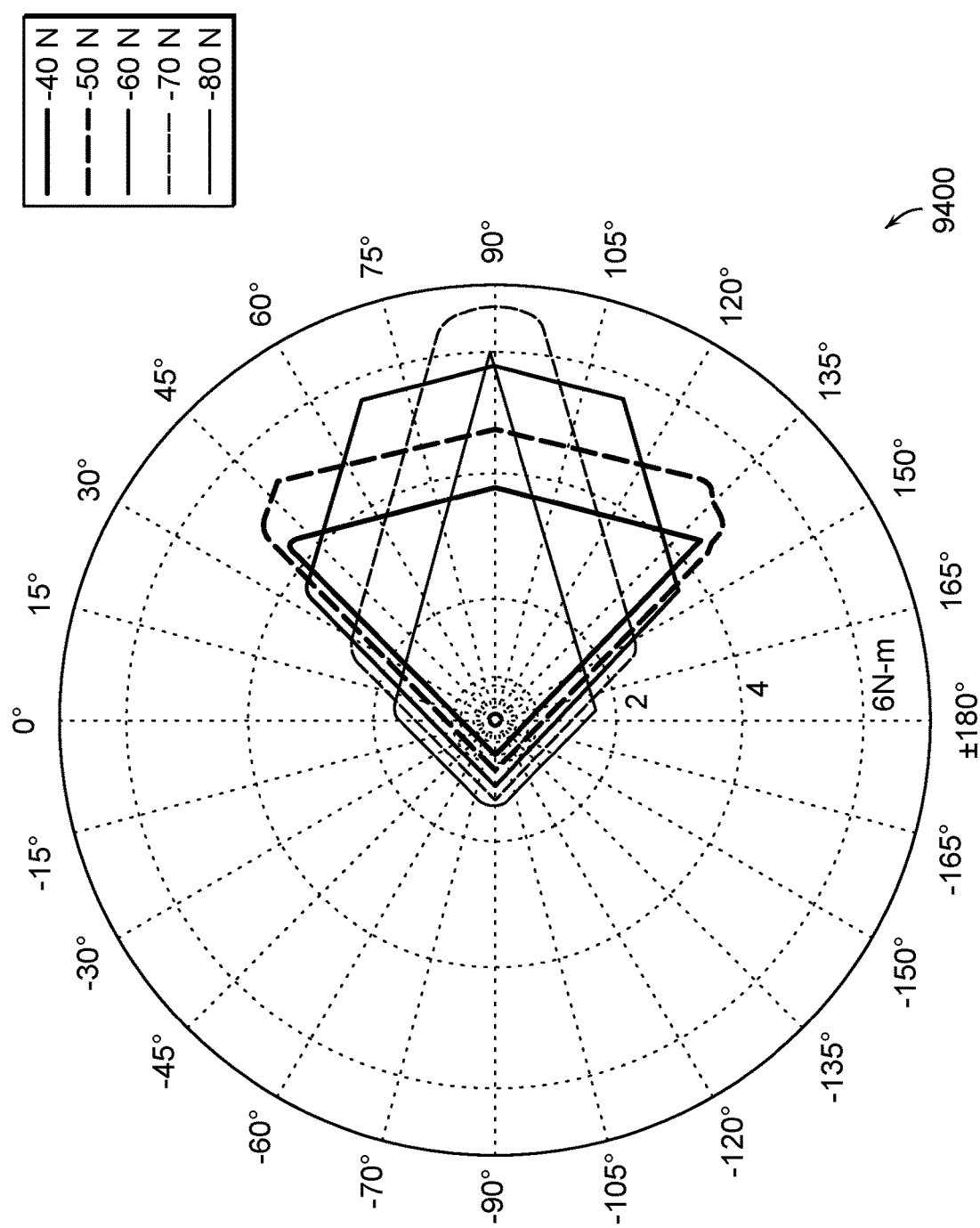
FIG. 34 is a plot showing a roll and pitch controllability envelope in Nm at various weights with a 1 m/s$^2$ forward thrust being generated.

Referring to FIG. 34, a plot 9400 shows a roll and pitch controllability envelope in Nm at various vehicle weights with a 1 m/s² forward thrust being generated.

Figure 35:
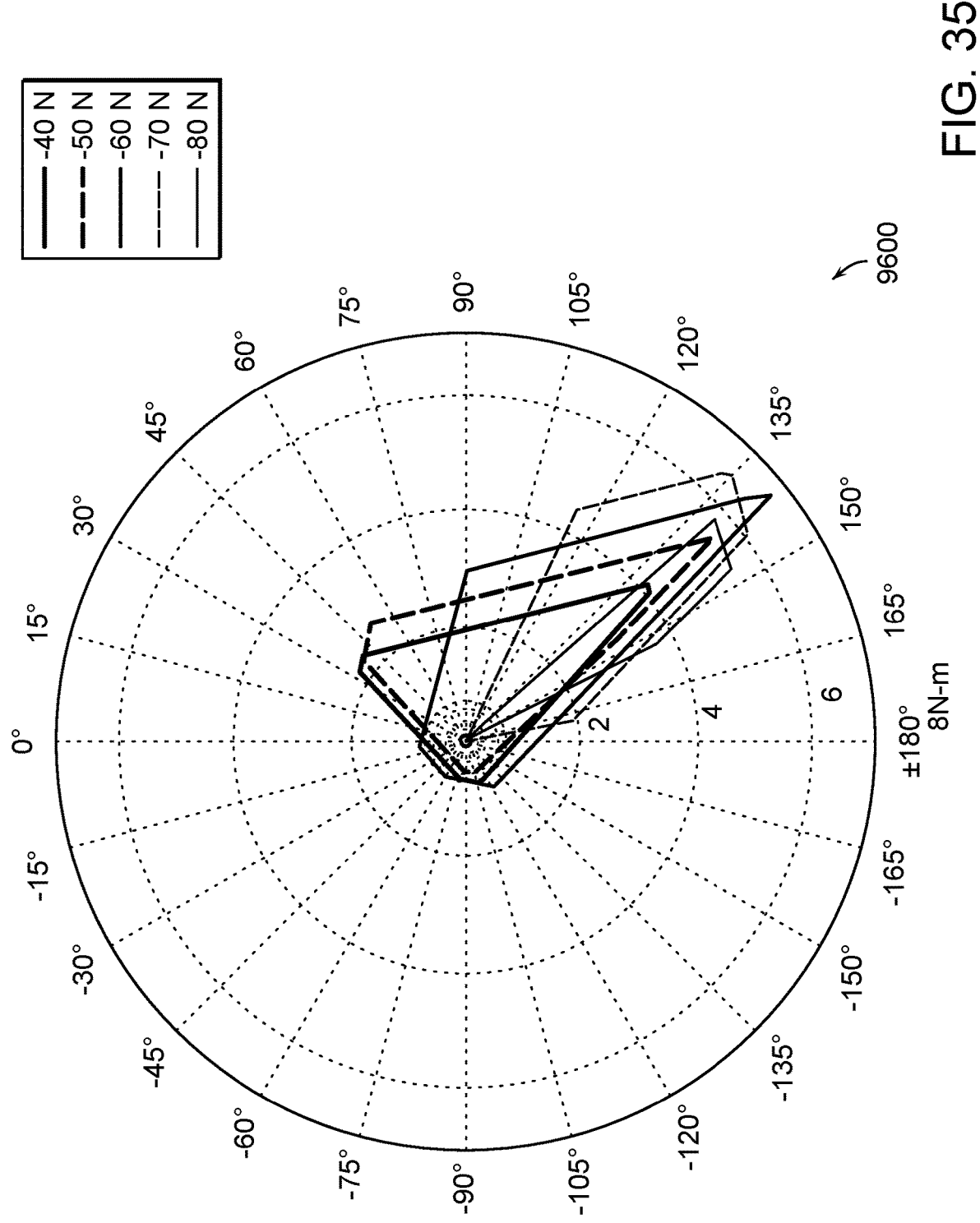
FIG. 35 is a plot showing a roll and pitch controllability envelope in Nm at various weights with a 1 m/s$^2$ forward thrust and 1 m/s$^2$ right thrust being generated.

Referring to FIG. 35, a plot 9600 shows a roll and pitch controllability envelope in Nm at various vehicle weights with a 1 m/s² forward thrust and 1 m/s² right thrust being generated.

Figure 36:
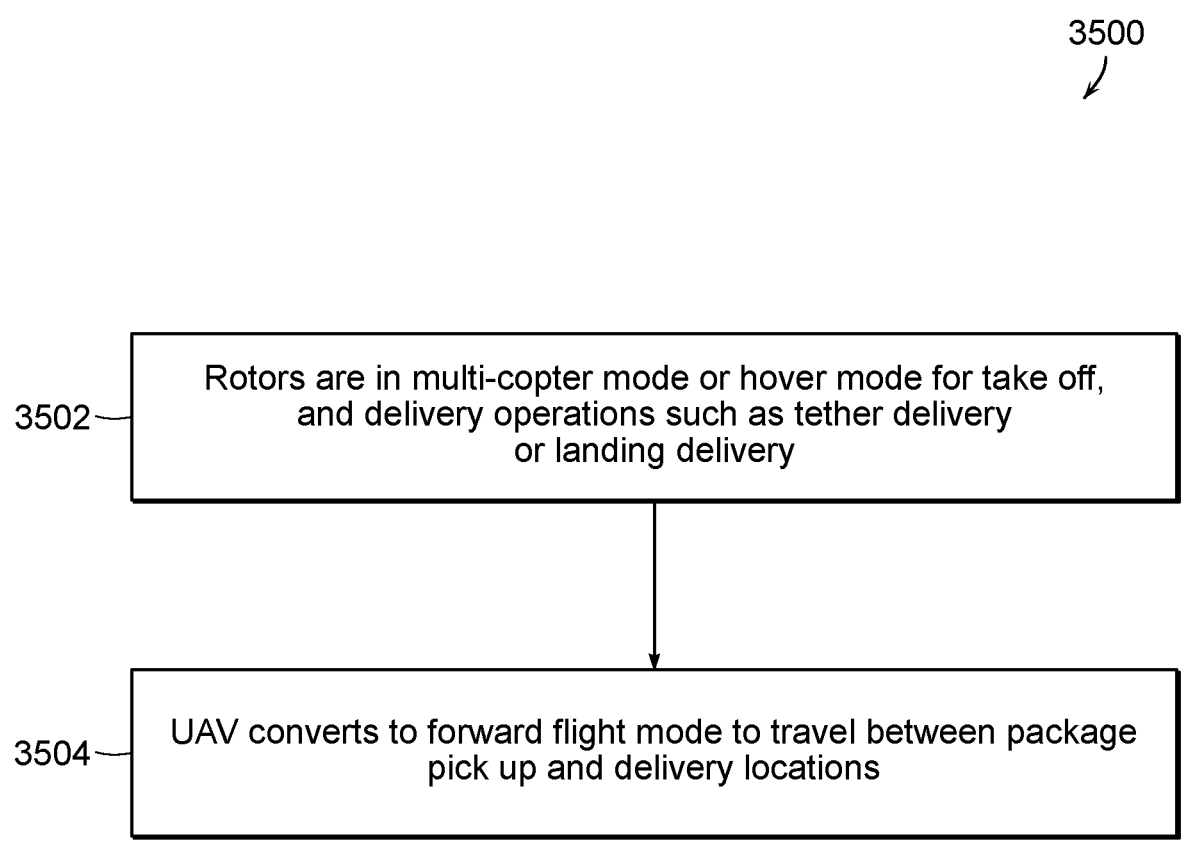
FIG. 36 is a flowchart of an exemplary operation of a multi-rotor UAV converting between a multi-copter mode and a forward flight mode.

FIG. 36 is a flowchart 3500 of an exemplary operation of a multi-rotor UAV converting between a multi-copter mode and a forward flight mode. At operation 3502, the rotors are in multi-copter mode. In multi-copter mode, the rotors are all in a substantially horizontal configuration (i.e., substantially parallel to the ground) allowing for vertical take-off and landing, hovering, and low speed flight. In some examples, the at least some rotors tilt or rotate from a substantially vertical configuration into a substantially horizontal configuration.

At operation 3504, the UAV converts to forward flight mode when at least some of the rotors tilt or rotate such that they are in a substantially vertical configuration (i.e., substantially perpendicular to the ground) allowing for higher speed forward flight. For example, the lifting surfaces on the spars connecting the at least some rotors to the center of the fuselage rotate from a substantially horizontal configuration into a substantially vertical configuration. Similarly, when the at least some rotors tilt or rotate from a substantially horizontal configuration into a substantially vertical configuration, the lifting surfaces on the spars rotate from a substantially vertical configuration to a substantially horizontal configuration.

In other examples, when the at least some rotors tilt or rotate between a substantially vertical configuration and a substantially horizontal configuration, the lifting surfaces on the spars of the at least some rotors remain in a substantially horizontal configuration.

Figure 37:
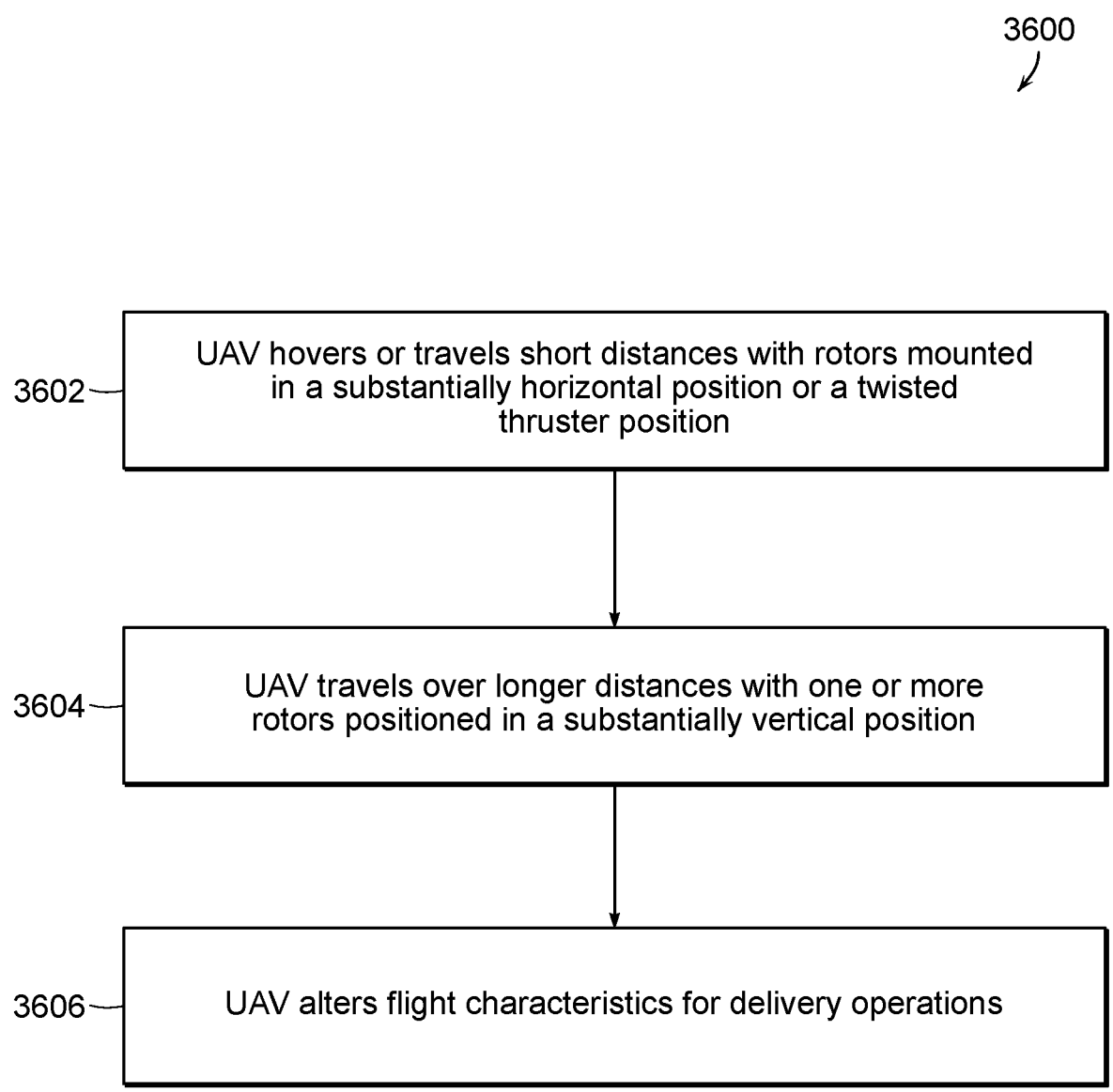
FIG. 37 is a flowchart of an exemplary multi-rotor UAV flying a long distance in forward flight mode and a short distance in multi-copter mode.

FIG. 37 is a flowchart 3600 of an exemplary multi-rotor UAV flying a long distance in forward flight mode and a short distance in multi-copter mode. In operation 3602, the UAV hovers or travel over short distances and the rotors that are mounted in a substantially horizontal position are used primarily, with the rotor mounted in a substantially vertical position being used little, if at all.

In operation 3604, the UAV travels over longer distances with the rotor mounted in a substantially vertical position relative to the ground acting as a propeller, moving the UAV in a lateral direction, with the streamlined fuselage providing lift. The UAV may use the rotors mounted in a horizontal position to provide additional lift, if necessary.

In some examples, the spar that the horizontally mounted rotor is mounted upon is rotatable relative to the other spars of the UAV. In operation 3606, the spar may be rotated to alter the flight characteristics of the UAV and/or when the UAV switches between a hovering and a flying mode.

Figure 38:
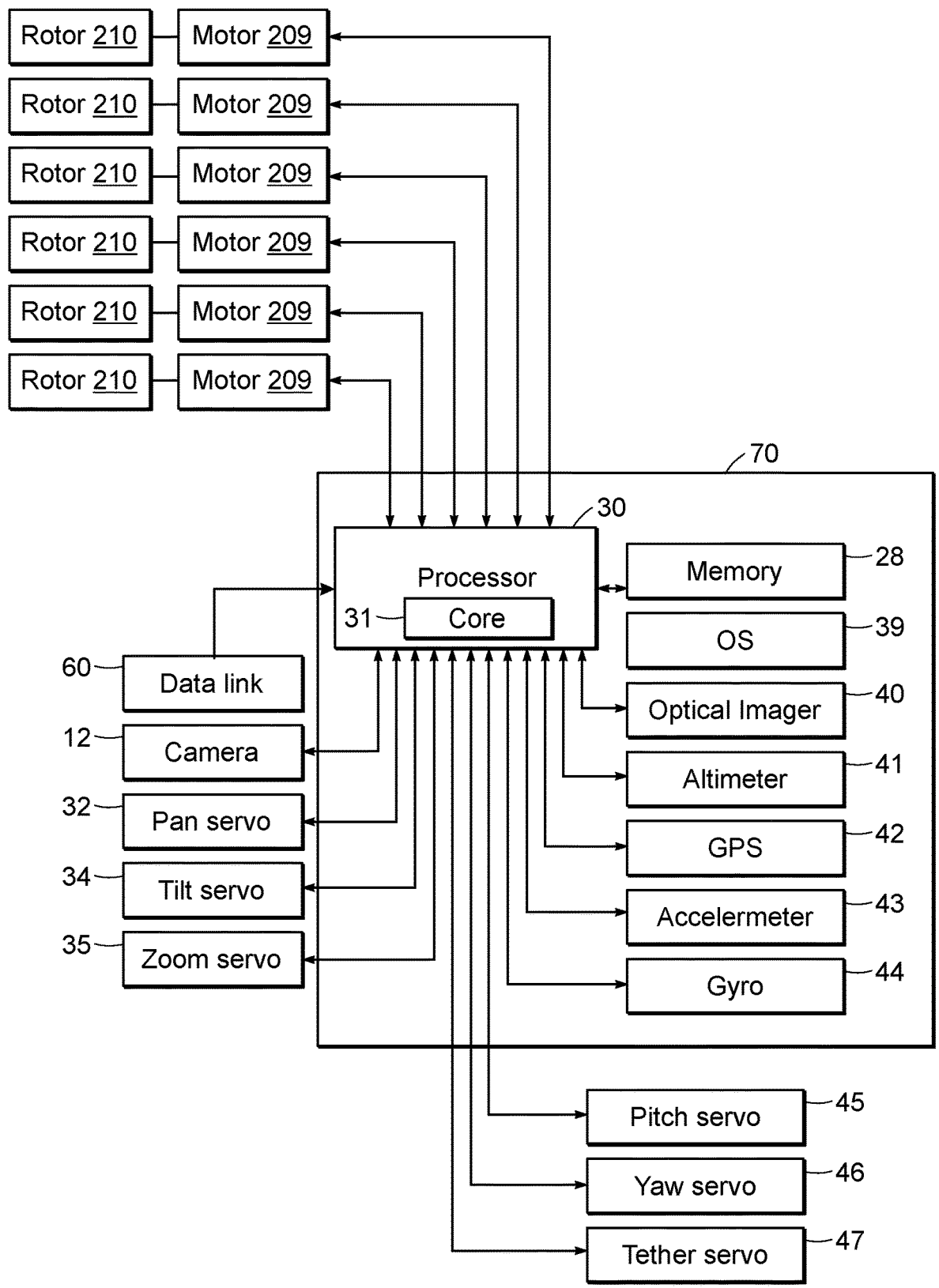
FIG. 38 illustrates a flight control system for a six rotor unmanned aerial vehicle.

FIG. 38 is an electronics and control schematic block diagram for the UAV (i.e., UAV 1102 and/or multi-rotor helicopter 1000), according to one embodiment of the present disclosure. The UAV includes a system 70 on a circuit board that integrates all components of a computer or other electronic system using integrated circuits. In one embodiment, system 70 manages the collection, scheduling, computation, transmission, and receipt of data.

System 70 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more USB flashdrives), and the like. For example, a memory 28 included in system 70 can store computer-readable and computer-executable instructions or software for implementing exemplary embodiments. System 70 also includes a processor 30 and an associated core 31, and optionally, one or more additional processor(s) 30' and associated core(s) 31' (for example, in the case of computer systems having multiple processors/cores), for executing computer-readable and computer-executable instructions or software stored in memory 28 and other programs for controlling system hardware. Processor 30 and processor(s) 30' can each be a single core processor or multiple core (31 and 31') processor. Memory 28 can include a computer system memory or random access memory, such as DRAM, SRAM, EDO RAM, and the like. Memory 28 can include other types of memory as well, or combinations thereof.

System 70 can also include one or more storage devices, such as a hard-drive, CD-ROM, or other computer readable media, for storing data and computer-readable instructions and/or software, that implements embodiments of the control systems, as described herein, or portions thereof. Exemplary storage device can also store one or more storage devices for storing any suitable information required to implement exemplary embodiments and examples.

System 70 can include a data link 60 capable of secure transmission and receipt of data placed on a tether or transmitted and received wirelessly. Data link 60 may be configured to transmit and receive data via one or more network devices with one or more networks, for example, using a tethered connection or a wireless connections, or some combination of the above. The data link 60 may include a built-in network adapter, network interface card, wireless network adapter, USB network adapter, modem or any other device suitable for interfacing the UAV to any type of network capable of communication and performing the operations described herein. In one embodiment, data link 60 is a serial link, which may include a commercially available twisted pair transceiver integrated circuit.

In some embodiments, a user can interact with the UAV through a visual display device, such as a computer monitor. The visual display device may also display other aspects, elements and/or information or data associated with exemplary embodiments. The UAV may include other I/O devices for receiving input from a user, for example, a keyboard and a pointing device coupled to the visual display device. The UAV may include other suitable conventional I/O peripherals.

System 70 can run an operating system 39, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 39 can be run in native mode or emulated mode. In an exemplary embodiment, the operating system 39 can be run on one or more cloud machine instances.

In one embodiment, one or more on-board data sensors may communicate with the processor 30. For example, a gyroscope 44 may continuously measure and integrate the angular rotation of the UAV. The gyroscope 44 may comprise a micro-machined silicon integrated circuit available, for example, from Analog Devices (ADI-16300 300 degrees per second gyroscope). The processor 30 may continuously receive data from the gyroscope 44 and may compute and direct any correction to one or more of the electric motors 209. In an exemplary embodiment, the UAV includes six rotors 210 with each of the six rotors 210 is coupled to a motor 209 to rotate the associated rotor 210. Motor 209 can include first and second motor elements, the first to control rotor speed, the second to rotate the rotor assembly.

The processor 30 may also use data from the gyroscope 44 to correct angular drift by activating pitch servos 45, yaw servos 46, or a combination of both. The processor 30 may also control a tether servo 47 to wind and unwind a tether from a spool. The processor 30 and other control components may communicate via wireless signals when the tether is disconnected. Accordingly, in one embodiment, the processor 30 and/or other control components or sensors described herein may comprise wireless controls or sensors, or a wireless data receiver or transceiver interface.

In some cases, an accelerometer 43 continuously measures and integrates accelerations in the three orthogonal physical planes of the UAV. In one embodiment, the accelerometer 43 comprises an integrated circuit available from Analog Devices (ADI-16100 integrated 2 and 3 axis accelerometer).

The UAV may also include an altimeter 41. The altimeter 41 allows the processor 30 to precisely hold altitude, or to ascend or descend in a controlled manner. The altimeter 41 may facilitate, for example, traversing a stairwell or transitioning between floors of a building. In one embodiment, the altimeter 41 is a digital pressure sensor.

Further, the UAV may have a global positioning system (GPS) module 42 that can facilitate continuous monitoring of the position of the UAV. The processor 30 may act on the positional data provided by the GPS module 42 to allow the UAV to traverse particular paths. The GPS module 42 may also report back an actual GPS position of the UAV to a ground station. In one embodiment, the GPS module 42 is a miniature GPS receiver.

In one embodiment, an optical imager digital signal processor (DSP) circuit 40 may utilize built-in optical computational features of an optical mouse data pointing chip. Utilizing a suitable lens combination pointing toward the earth's surface, the optical imager DSP circuit 40 can update changes in physical position up to 6000 times per second. For example, the optical imager DSP 40 may be an Optical Mouse Digital Signal Processing engine.

In one embodiment of the UAV including an observation device 12, the processor may communicate with the observation device 12 as well as a pan servo 32, a tilt servo 34 operating servo motors, and a zoom servo 35.

In certain configurations, the processor 30, the optical imager DSP 40, the altimeter 41, the GPS module 42, the accelerometer 43, and the gyroscope 44 can be fabricated as one or more integrated circuits that reside on a printed circuit board assembly. The system can operate based on wireless communications under battery power or can operate using power transmitted through a tether as described in U.S. Pat. No. 9,290,269, the entire contents of which is incorporated herein by reference. The system can include flight stabilization and camera stabilization systems as described in U.S. Pat. Nos. 7,631,834 and 8,736,676, the entire contents of these patents being incorporated herein by reference. System 70 can include an inertial measurement unit (IMU) or be connected to a separate IMU circuit device.

The onboard processor can generate a change in flight path by altering rotor speed, or altering rotor tilt angle, or a combination of both. Such command signals can be sent in response to on-board sensor data indicating that a flight path change is needed to avoid a collision. Alternatively, the system can receive wireless commands from an external flight controller that determines a collision avoidance path must be implemented to avoid a collision with other objects such as buildings or other vehicles. Alternatively a remote pilot can assume control of the vehicle to avoid a collision. A parachute or automatic landing instruction can also be used to land the vehicle.

System 70 transmits signals to one or more motors of the one or more rotors to adjust a configuration of the one or more rotors. In an exemplary embodiment, system 70 instructs the one or more motors to adjust the one or more of the rotors into a tilted, vertical or horizontal configuration.

Figure 39:
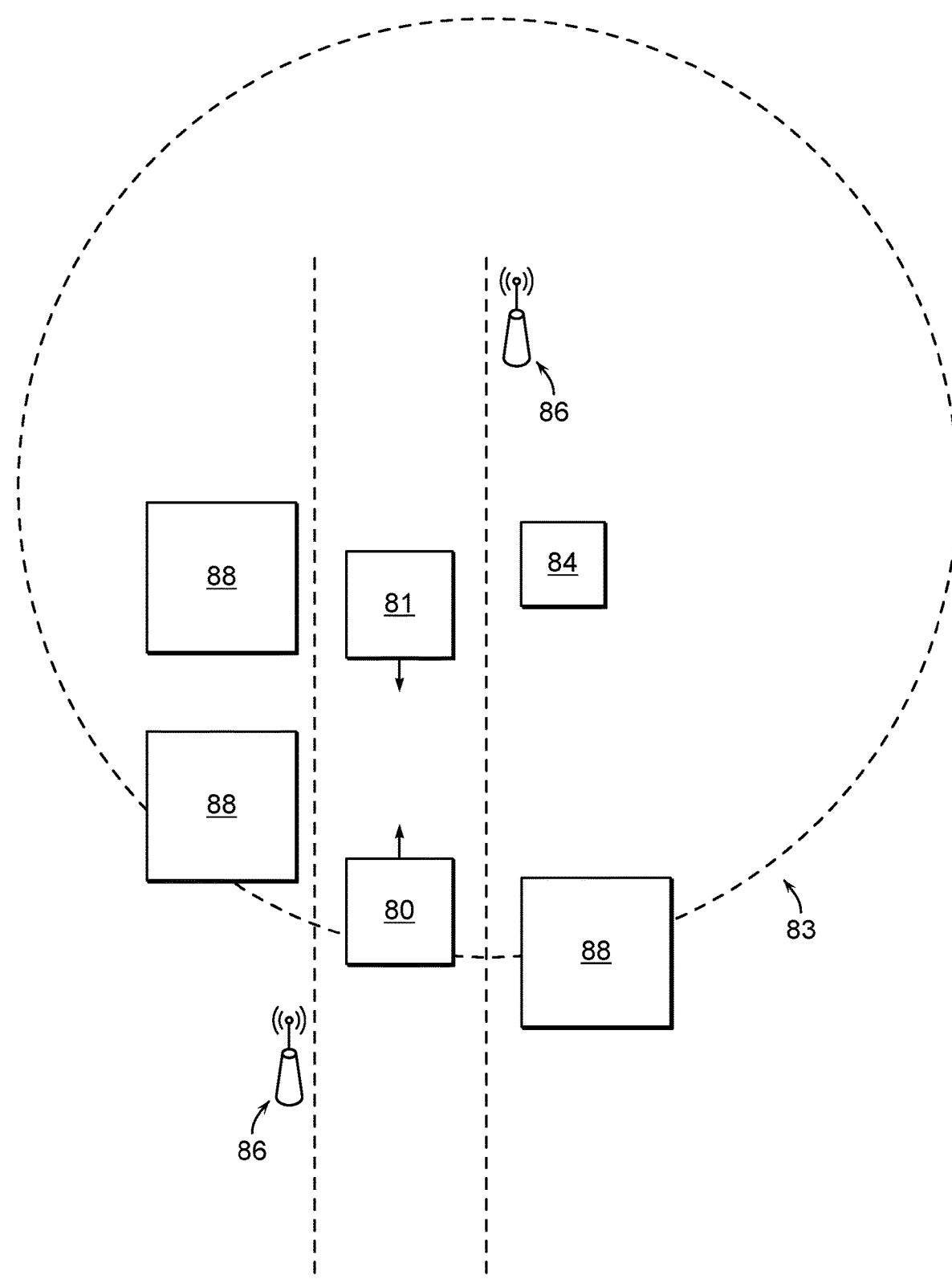
FIG. 39 illustrates a system for flight control of UAV corridors to provide traffic management and collision avoidances.

FIG. 39 is a block diagram of an UAV anti-collusion system, according to one embodiment of the present disclosure. The system includes one or more drones (drone 80 and drone 81 shown), one or more control towers 84 and one or more beacons 86. In the exemplary embodiment, drones 80, 81 travel in a predetermined designated route. Each drone 80, 81 includes a transponder or another mechanism to detect and transmit signals to monitor location. As the drones 80, 81 travel through a given airspace division 83, the drones 80, 81 are monitored by a first control towers 84 responsible for that division. The first control tower 84 monitors the location and velocity of the drones 80, 81 and transmits instructions to the drones 80, 81. For example, the control tower 84 communicates instructions to the drone 80 to avoid collisions with hazards, such as drone 81 and buildings 88 within the airspace division 83. The control tower 84 may, for example, instruct the drone 80 to increase its height to avoid the drone 81. As each drone 80, 81 leaves that airspace division 83 and enters another, the first control tower 84 passes it off to a second control tower 84 responsible for the new airspace division.

The one or more beacons 86 are further located along the predetermined designated route. The one or more beacons 86 transmit location information to drones 80, 81. Drones 80, 81 may use the location information to stay within the designated route and/or avoid hazards.

Figure 40:
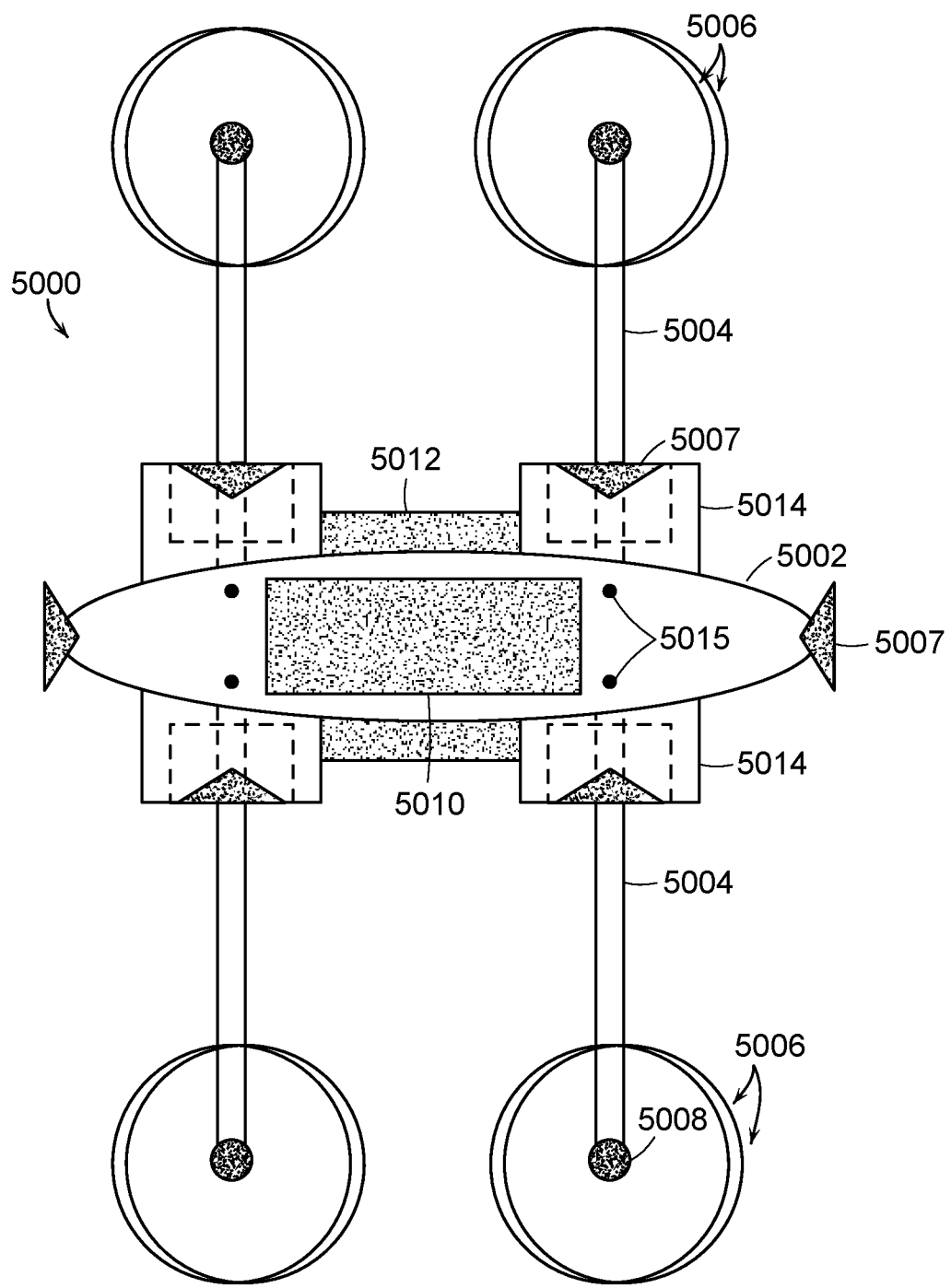
FIG. 40 illustrates an 8 rotor system having a plurality of flight modes with a sensor array for collision avoidance.
Figure 41:
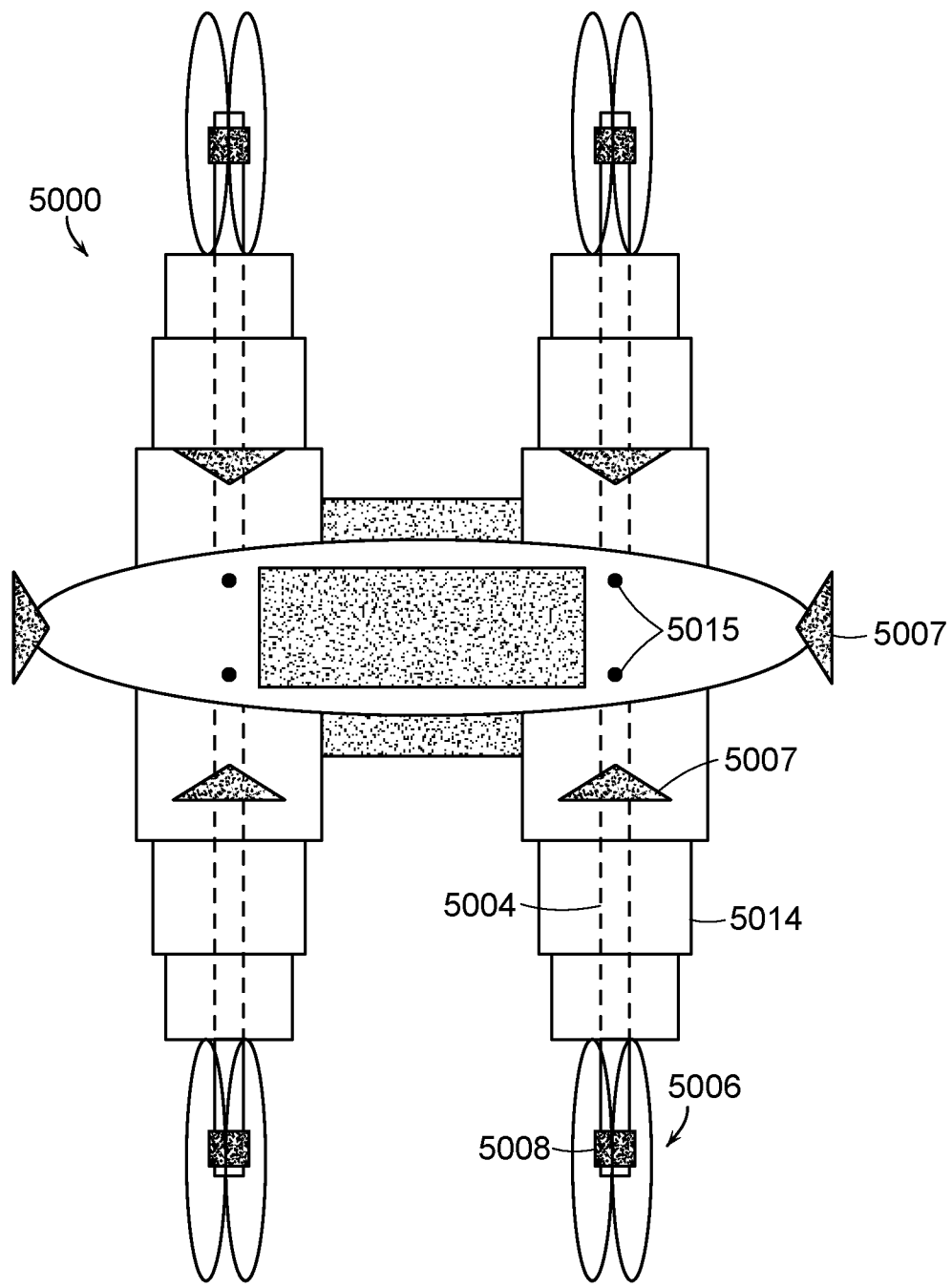
FIG. 41 illustrates the system of FIG. 39 with rotors tilted onto parallel axes for high speed flight.

FIG. 40 is a multi-rotor helicopter 5000 includes a central body 5002 from which a number (i.e., n) of rigid spars 5004 radially extend. The end of each rigid spar 5004 includes two coaxial rotors 5006 rigidly mounted thereon. In the depicted embodiment, the rotors 5006 are in a horizontal configuration. In some examples, each of the rotors 5006 includes an electric motor 5008 (e.g., a brushless DC motor) which drives rotors 5006 to generate thrust. In some examples, the motor 5008 may be used to tilt the associated rotor 5006. Generally, in operation the central body 5002 includes a power source (for example, batteries 5012) which provides power to the motors 5008 which in turn cause the rotors 5006 to rotate. While rotating, each of the rotors 5006 forces air above the helicopter 5000 in a generally downward direction to generate a thrust having a magnitude and direction that can be represented as a thrust vector (i.e., thrust vector 112). Multi-rotor helicopter 5000 includes a plurality of sensors 5007 to detect surroundings, a plurality of motors 5008 used to operate the rotors 5006, a payload bay 5010, and one or more batteries 5012. Sensors 5007 are located on each spar 5004 and may include, but not limited to, cameras and/or range finders, such as sonar or Lidar. Multi-rotor helicopter 5000 includes stowed wings 5014 during a hover configuration. Each wing 5014 includes a motor 5015 to extend and retract the wing 5014. Wings 5014 are extendable, as shown in FIG. 39.

FIG. 40 is the multi-rotor helicopter 5000 as shown in FIG. 38 with the wings 5014 in an extended configuration. The wings 5014 extend to form a continuous wing shape with a curve surface. The wings 5014 are located above the rigid spar 5004. In the depicted embodiment, the rotors 5006 are in a tilted and/or vertical configuration.

Figure 42:
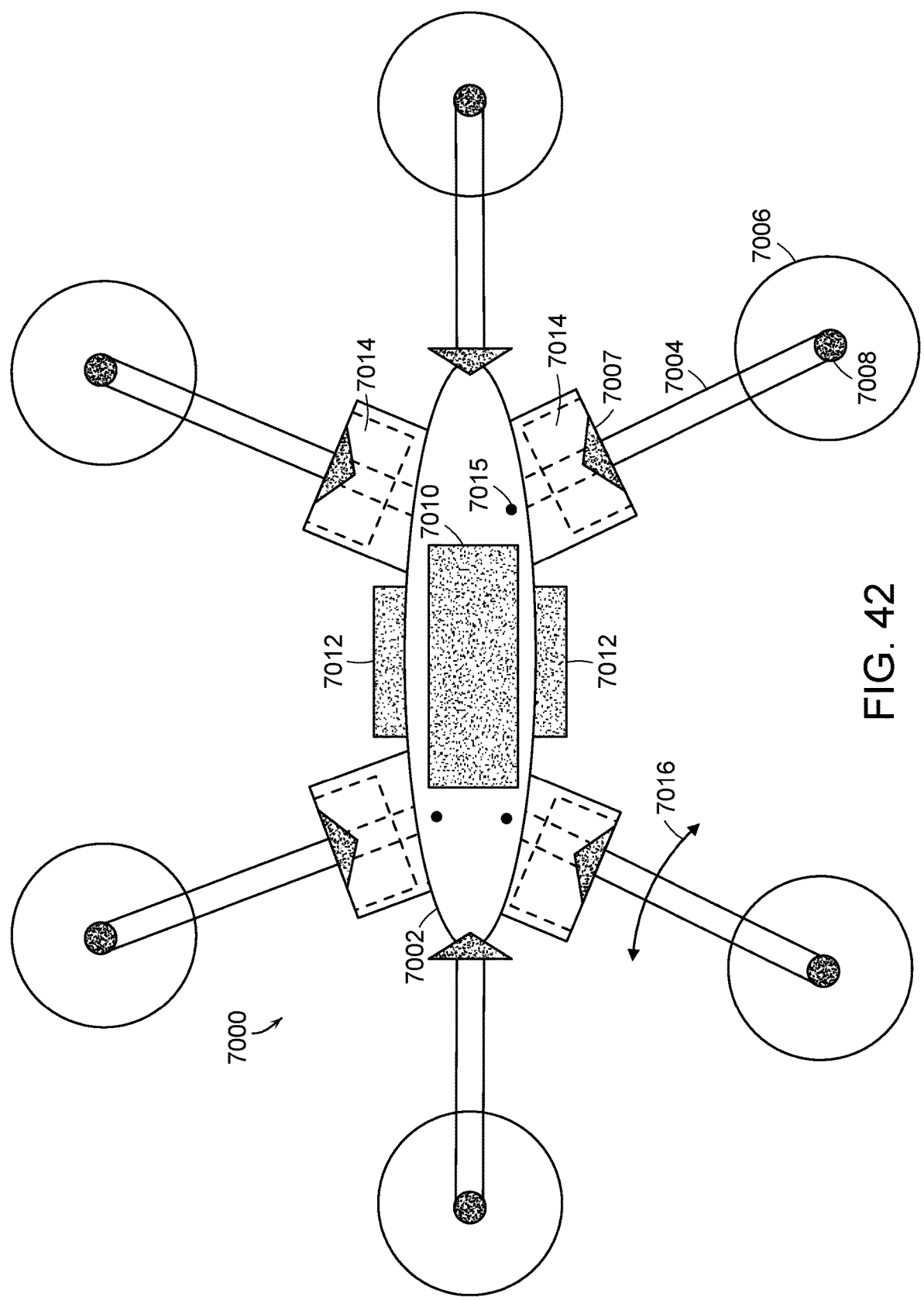
FIG. 42 illustrates a six rotor system for adaptive thrust control of UAV flight operations.

FIG. 42 is a multi-rotor helicopter 7000 includes a central body 7002 from which a number (i.e., n) of rigid spars 7004 radially extend. The end of each rigid spar 7004 includes a rotor 7006 rigidly mounted thereon. In the depicted embodiment, the rotors 7006 are in a horizontal configuration. In some examples, each of the rotors 7006 includes an electric motor 7008 (e.g., a brushless DC motor) which drives rotors 7006 to generate thrust. In some examples, the motor 7008 may be used to tilt the associated rotor 7006. Generally, in operation the central body 7002 includes a power source (or example, batteries 7012) which provides power to the motors 7008 which in turn cause the rotors 7006 to rotate. While rotating, each of the rotors 7006 forces air above the helicopter 7000 in a generally downward direction to generate a thrust having a magnitude and direction that can be represented as a thrust vector (i.e., thrust vector 112). Multi-rotor helicopter 7000 includes a plurality of sensors 7007 to detect surroundings, a plurality of motors 7008 used to operate the rotors 7006, a payload bay 7010, and one or more batteries 7012. Multi-rotor helicopter 7000 includes stowed wings 7014 during a hover configuration. Each wing 7014 includes a motor 7015 to extend and retract the wing 7014. Wings 7014 are extendable, as depicted in FIG. 39. The wing surface area can be adjusted in combination with tilt angle and rotor speed to provide the required lift to the vehicle. Note that the spars 7004 can be rotated 7016 vertically and/or horizontally in certain embodiments to improve stability.

Figure 43:
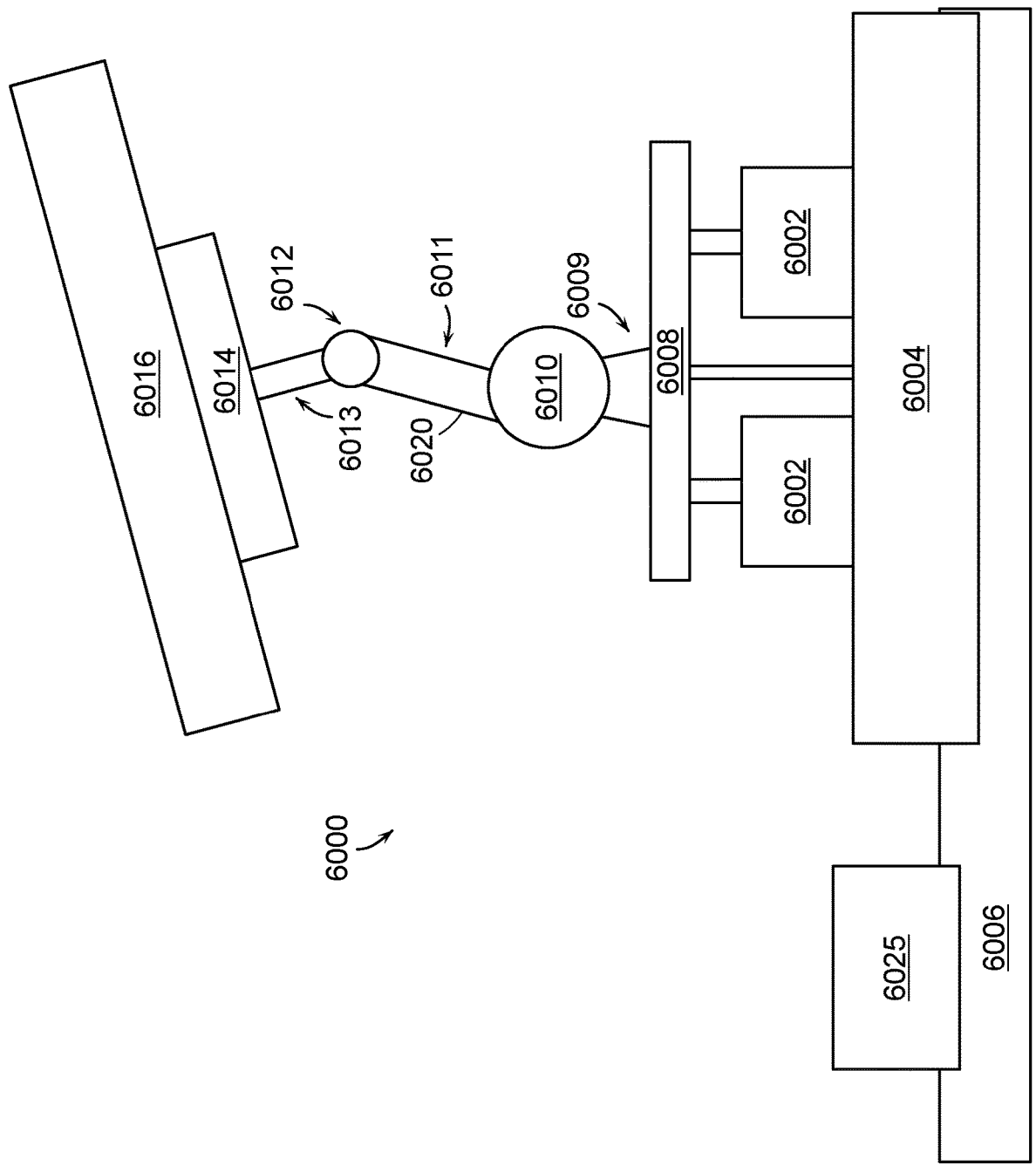
FIG. 43 illustrates a system for tilting a rotor thrust axis to alter the thrust vector.

FIG. 43 is a block diagram of a rotor assembly 6000 using adaptive thrust vectoring to change rotor positioning in a UAV (i.e., UAV 1102 and/or multi-rotor helicopter 1000), according to one embodiment of the present disclosure. In an exemplary embodiment, two motor mount servos 6002 are mounted to a motor mount 6004. The motor mount 6004 coupled to a spar 6006. The motor mount servos 6002 are also coupled to a placement plate 6008. The placement plate 6008 is movable on a horizontal plane by the motor mount servos 6002. Movement of the placement plate 6008 causes motion in a first linkage 6009 coupled to a first ball joint 6010. Movement in the first ball joint 6010 causes motion in a second linkage 6011. The second linkage 6011 is coupled to a second ball joint 6012. Movement of the second linkage 6011 causes motion in the second ball joint 6012, which in turn causes motion in a third linkage 6013. The third linkage 6013 is coupled to an axis platform 6014 coupled to a rotor 6016. The movement of the third linkage 6013 in turn tilts the axis platform 6014 and the rotor 6016.

The ball joints 6010, 6012 permit movement of linkages 6009, 6011, and 6013. The tilting of the axis platform 6014 is dependent on the degree of movement of the placement plate 6008 controlled by the motor mount servos 6002. An axis 6020 runs through the center of linkages 6009, 6011, and 6013. In one embodiment, the axis 6020 is a metal rod.

The motor mount servos 6002 are used for fine tuning and control of the tilting of rotor 6016. The motor mount servos 6002 controls the tilting and/or pitch of the rotor 6016 by the linkage, which tilts the rotor 6016 in varies degrees of freedom.

In some embodiments, the spar 6006 is coupled to a motor 6025 configured to rotate the rotor assembly 6000.

Figure 44:
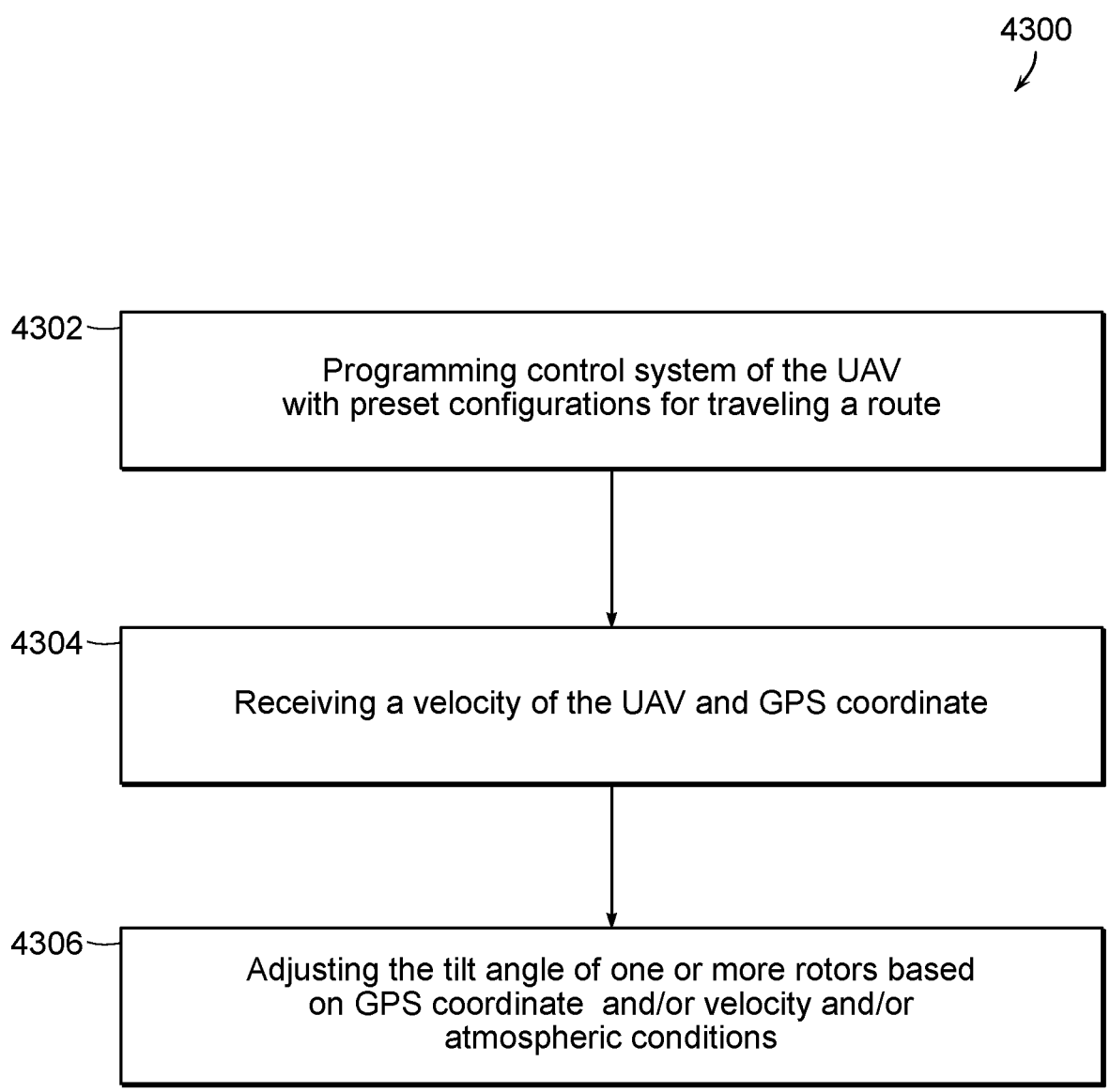
FIG. 44 is a flowchart of an exemplary multi-rotor UAV configured to tilt one or more rotors while traveling a route.

Referring to FIG. 44 is a flowchart 4300 of an exemplary multi-rotor UAV (i.e., UAV 1102 and/or multi-rotor helicopter 1000) configured to tilt one or more rotors while traveling a route. In an exemplary embodiment, the route may include different velocities required at different portions of the route and/or different atmospheric conditions at different portions of the route. For example, a portion of the route may require a traveling speed of a UAV limited to 35 miles per hour.

At operation 4302, a control system (i.e., system 70) of the UAV is programmed with preset configurations for traveling the route. In a preferred embodiment, the twist angle can be adjusted before or during flight based on one or more factors. The programmed velocity or the control systems' response to received instructions to increase velocity can be implemented by an increase in rotor speed of one or more rotors, by increasing the tilt angle of one or more rotors, or a combination of both. For example, by increasing the tilt angle, the lateral and/or rotational velocity of the vehicle can be increased. If all the rotors (e.g. four, six or eight rotors) are all tilted to an increased angle between 25 and 35 degrees, for example, there is a decrease in vertical lift capacity but an increase in the lateral velocity that the vehicle can achieve at a given rotor speed. If the aerial vehicle has limited lift surface area, it can be desirable to retain a fraction of lift capacity for a given desired lateral velocity. As there can be different velocities required at different portions of the route, or the direction of the wind can change at different portions of the route that require a change in the twist angle to maintain velocity, there can be selected presets on the tilt angle that are programmed into the system. For example, the UAV may have twist angles of +/−25 degrees at launch, then rotate the twist angles to +/−35 degrees to increase lateral velocity to a certain level after a specified altitude and position are reached. The vehicle can then navigate to another point along its flight path where it can further increase flight speed and consequently shift the twist angle a second time to +/−40 degrees. The vehicle can then reduce the twist angle to +/−25 degrees as it approaches a landing or hovering location. Note that the dihedral angle can also be adjusted dynamically as well with the use of motors within the aerial vehicle body that can move the spars both vertically and laterally. The preset tilt angle can have ranges, such as 30-40 degrees, 40-50 degrees, or 50-60 degrees as required for the specific application and flight conditions. This system can be used to adjust the tilt angle of each rotor independently over the range of 0-90 degrees to obtain a selected flight path. This procedure can be used for additional applications in addition to package delivery, such as surveillance, launching or landing on a moving vehicle, target tracking, and in both tethered and non-tethered modes of operation.

At operation 4304, the control system receives a velocity of the UAV and a GPS coordinate to determine a current location on the route. At operation 4306, the control system adjusts the tilt angle of one or more rotors based on the GPS coordinate and/or the velocity and/or atmospheric conditions. For example, based on the GPS coordinate, the control system may determine that the UAV is located within an area of the route where the velocity is limited to predefined parameters. The control system then adjusts the tilt angle of one or more rotors to decrease or increase the velocity of the UAV to within the predefined parameters The one or more rotors can be tilted at different angles in order to control the direction and the velocity of the UAV.

The control system may control the direction and the velocity of the UAV using fine motor control or gross motor control. Gross motor control includes rotating one or more spars using a motor. Fine motor control includes tilting the one or more rotors using, for example, motor mount servos.

An advantage of this control system is the ability to adjust to different weight distributions for articles that are loaded onto the vehicle for transport. For the delivery of articles purchased by customers using the process depicted in FIG. 1, for example, it may not be possible to mount an item or package into the payload without altering the center of gravity of the vehicle. The flight control system can automatically account for this change in weight distribution by adjusting rotor speed, twist angle, dihedral angle of one or more spars or the lateral orientation of one or more spars relative to the aerial body, or by adjusting flight control surfaces such as flaps or wings.

Figure 45:
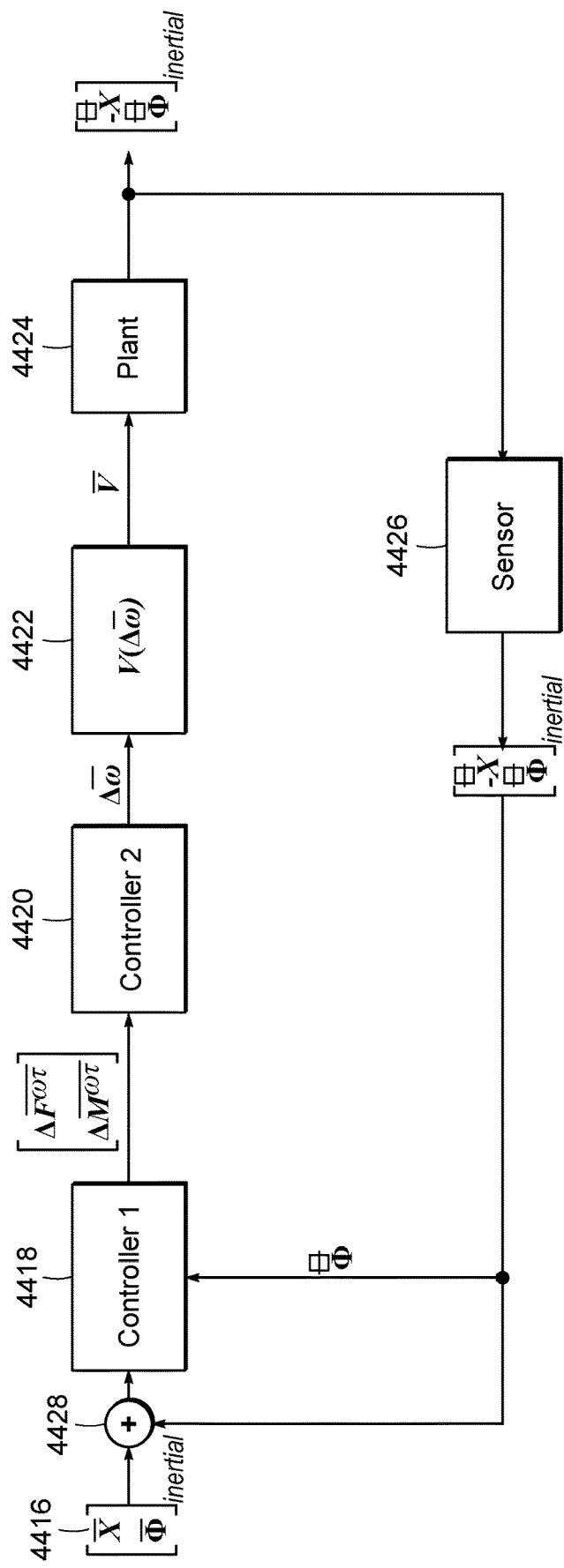
FIG. 45 is a block diagram of a third control system.

Referring to FIG. 45, in an exemplary approach to controlling a vehicle 100, a multi-rotor helicopter control system 4400 receives a control signal 4416 including a desired position, $\bar{x}$, in the inertial frame of reference (specified as an n, w, h (i.e., North, West, height) coordinate system (where the terms "inertial frame of reference" and n, w, h coordinate system are used interchangeably), and a desired rotational orientation, $\bar{\Phi}$, in the inertial frame of reference (specified as a roll (R), pitch (P), and yaw (Y) in the inertial frame of reference), and generates a vector of voltages $\bar{V}$ which are used to drive the thrusters 1008 of the multi-rotor helicopter 1000 to move the multi-rotor helicopter 1000 to the desired position in space and the desired rotational orientation.

The control system 4400 includes a first controller module 4418, a second controller module 4420, an angular speed to voltage mapping function 4422, a plant 4424 (i.e., the multi-rotor helicopter 1000), and an observation module 4426. The control signal 4416, which is specified in the inertial frame of reference is provided to the first controller 4418 which processes the control signal 4416 to determine a differential thrust force vector, $\Delta \overline{F^{vx}}$ and a differential moment vector, $\Delta \overline{M^{vx}}$, each specified in the frame of reference of the multi-rotor helicopter 1000 (i.e., the x, y, z coordinate system). In some examples, differential vectors can be viewed as a scaling of a desired thrust vector. For example, the gain values for the control system 4400 may be found using empiric tuning procedures and therefore encapsulates a scaling factor. For this reason, in at least some embodiments, the scaling factor does not need to be explicitly determined by the control system 4400. In some examples, the differential vectors can be used to linearize the multi-rotor helicopter system around a localized operating point.

In some examples, the first controller 4418 maintains an estimate of the current force vector and uses the estimate to determine the differential force vector in the inertial frame of reference, $\Delta \overline{F^{inertial}}$, as a difference in the force vector required to achieve the desired position in the inertial frame of reference. Similarly, the first controller 4418 maintains an estimate of the current moment vector in the inertial frame of reference and uses the estimate to determine the differential moment vector in the inertial frame of reference, $\Delta \overline{M^{inertial}}$, as a difference in the moment vector required to achieve the desired rotational orientation in the inertial frame of reference. The first controller 4418 then applies a rotation matrix to the differential force vector in the inertial frame, $\Delta \overline{F^{inertial}}$, to determine its representation in the x, y, z coordinate system of the multi-rotor helicopter 1000, $\Delta \overline{F^{vx}}$. Similarly, the first controller 4418 applies the rotation matrix to the differential moment vector in the inertial frame of reference, $\Delta \overline{M^{inertial}}$, to determine its representation in the x, y, z coordinate system of the multi-rotor helicopter 1000, $\Delta \overline{M^{vx}}$.

The representation of the differential force vector in the x, y, z coordinate system, $\Delta \overline{F^{vx}}$, and the representation of the differential moment vector in the x, y, z coordinate system, $\Delta \overline{M^{vx}}$, are provided to the second controller 4420 which determines a vector of differential angular motor speeds:

$$\Delta \bar{\omega} = \begin{bmatrix} \Delta \omega_1 \\ \Delta \omega_2 \\ \vdots \\ \Delta \omega_n \end{bmatrix}$$

As can be seen above, the vector of differential angular motor speeds, $\Delta \bar{\omega}$, includes a single differential angular motor speed for each of the n thrusters 1006 of the multi-rotor helicopter 1000. Taken together, the differential angular motor speeds represent the change in angular speed of the motors 1008 required to achieve the desired position and rotational orientation of the multi-rotor helicopter 1000 in the inertial frame of reference.

In some examples, the second controller 4420 maintains a vector of the current state of the angular motor speeds and uses the vector of the current state of the angular motor speeds to determine the difference in the angular motor speeds required to achieve the desired position and rotational orientation of the multi-rotor helicopter 1000 in the inertial frame of reference.

The vector of differential angular motor speeds, $\Delta \bar{\omega}$, is provided to the angular speed to voltage mapping function 4422 which determines a vector of driving voltages:

$$\bar{V} = \begin{bmatrix} V_1 \\ V_2 \\ \vdots \\ V_n \end{bmatrix}$$

As can be seen above, the vector of driving voltages, $\bar{V}$, includes a driving voltage for each motor 1008 of the n thrusters 1006. The driving voltages cause the motors 1008 to rotate at the angular speeds required to achieve the desired position and rotational orientation of the multi-rotor helicopter 1000 in the inertial frame of reference.

In some examples, the angular speed to voltage mapping function 4422 maintains a vector of present driving voltages, the vector including the present driving voltage for each motor 1008. To determine the vector of driving voltages, $\bar{V}$, the angular speed to voltage mapping function 4422 maps the differential angular speed $\Delta \omega_i$ for each motor 1008 to a differential voltage. The differential voltage for each motor 1008 is applied to the present driving voltage for the motor 1008, resulting in the updated driving voltage for the motor, $V_i$. The vector of driving voltages, $\bar{V}$, includes the updated driving voltages for each motor 1008 of the i thrusters 1006.

The vector of driving voltages, $\bar{V}$, is provided to the plant 4424 where the voltages are used to drive the motors 1008 of the i thrusters 1006, resulting in the multi-rotor helicopter 1000 translating and rotating to a new estimate of position and orientation:

$$\begin{bmatrix} \bar{X} \\ \bar{\Phi} \end{bmatrix}$$

Figure 46:
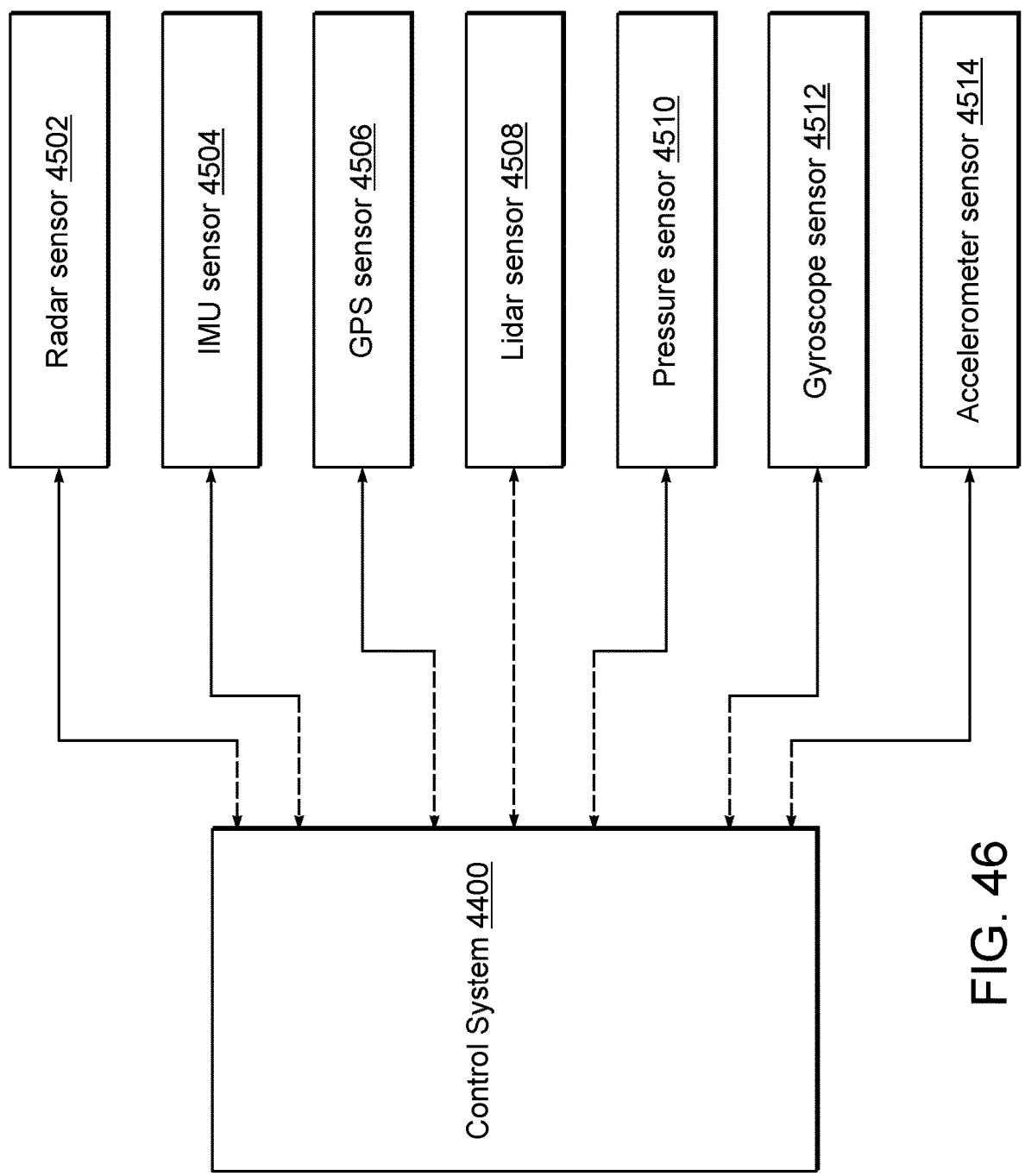
FIG. 46 is an schematic block diagram of at least one sensor used in a multi-rotor helicopter control system for controlling a vehicle.

At least one sensor 4426 includes one or more of an inertial measurement unit (IMU) sensor, gyroscope and accelerometer sensors, a GPS sensor, a Lidar sensor, or a radar sensor, as further described in FIG. 46. The sensor 4426 obtains data and feeds it back to a combination node 4428 as an error signal. The control system 4400 repeats this process, achieving and maintaining the multi-rotor helicopter 1000 as close as possible to the desired position and rotational orientation in the inertial frame of reference.

FIG. 46 is an schematic block diagram of the at least one sensor 4426 shown in FIG. 45 used in the multi-rotor helicopter control system 4400 for controlling a vehicle 100. Sensor 4426 includes one or more of a radar sensor 4502, an inertial measurement unit (IMU) sensor 4504, a GPS sensor 4506, a Lidar sensor 4508, a pressure sensor 4510, a gyroscope sensor 4512, and an accelerometer sensor 4514.

The data collected from the IMU sensor 4504 enables the control system 4400 to track the UAV's position, i.e., using, for example, dead reckoning, or to adjust for wind.

The pressure sensor 4510 measures atmospheric pressure. Data provided by the pressure sensor 4510 enabling the control system 4400 to adjust other parameters (i.e., rotor speed, tilting angle, etc.) based on the atmospheric pressure.

The radar sensor 4502 provide detection of objects, reliable distance measurement, collision avoidance, and driver assistance. Data provided by the radar sensor 4502 is used by the control system 4400 to compute updated rotor speed to avoid collisions.

The GPS sensor 4506 provides accurate position and velocity information. Data provided by the GPS sensor 4506 is used by the control system 4400 to compute updated location and velocity information.

The Lidar sensor 4508, which measures distance to a target by illuminating that target with a laser light, provide detection of objects, reliable distance measurement, collision avoidance and driver assistance. Data provided by the Lidar sensor 4502 is used by the control system 4400 to compute updated rotor speed to avoid collisions.

The gyroscope sensor 4512 measures the angular rotational velocity, and assists with orientation and stability in navigation. The accelerometer sensor 4514 measures linear acceleration of movement. Data provided by the gyroscope sensor 4512 and accelerometer sensor 4514 is used by the control system 4400 to compute updated linear and rotation velocity.

Figure 47:
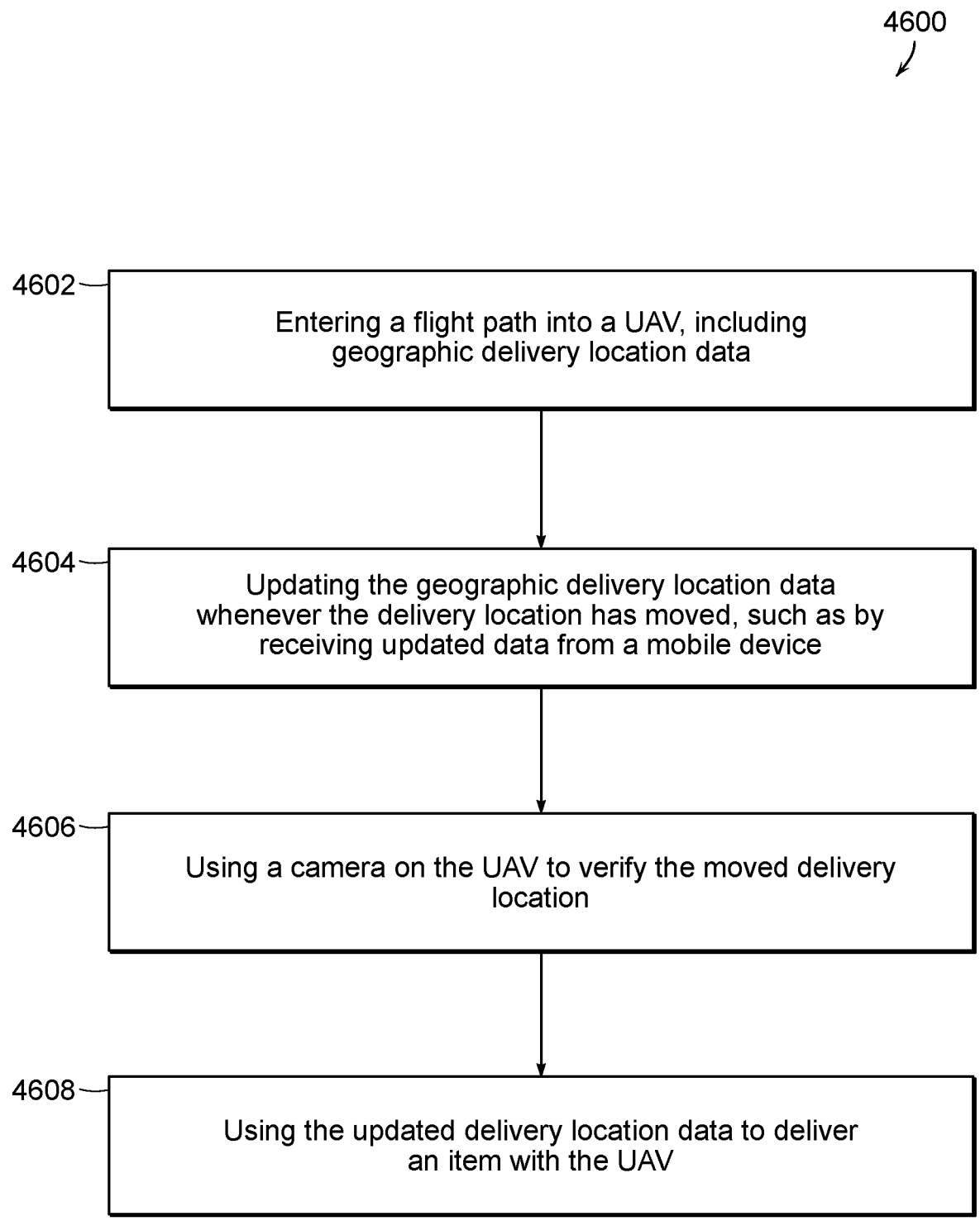
FIG. 47 is a flowchart of an exemplary multi-rotor UAV configured to deliver items to a mobile delivery location.

FIG. 47 is a flowchart 4600 of an exemplary multi-rotor UAV configured to deliver items to a mobile delivery location, such as directly to a customer at the location of their mobile device. At operation 4602, a flight path is entered into a UAV, including geographic delivery location data. At operation 4604, the UAV updates the geographic delivery location data whenever the delivery location has moved, such as by receiving updated data from a mobile device.

In some embodiments, at operation 4606, the UAV uses a camera to verify the moved delivery location. At operation 4608, the UAV uses the updated delivery location data to deliver an item.

What is claimed is:

1. A multi-rotor unmanned aerial vehicle for package delivery comprising:
an aerodynamic body streamlined for forward flight, the aerodynamic body comprising a bay for holding a package to be delivered;
a plurality of spatially separated thrusters coupled to the aerodynamic body, each thruster comprising a rotor coupled to a motor, each thruster configured to produce thrust along a corresponding thrust vector, wherein for one or more of the thrusters, a coupling between the one or more thrusters and the aerodynamic body is configured such that an orientation of a rotor of the one or more thrusters relative to the aerodynamic body has a thrust vector for forward flight;
a plurality of spars, wherein each of the plurality of thrusters is mounted on one of the plurality of spars, wherein at least one thruster is rotatable, relative to its respective spar, around at least two respective non-parallel axes, so that the thruster's thrust vector is rotatable relative to the respective spar around the two non-parallel axes; and
a navigation device onboard the aerial vehicle configured to:
receive instructions, and operate the multi-rotor unmanned aerial vehicle in response to the instructions to rotate the at least one thruster's thrust vector relative to the spar around any one of the two non-parallel axes.

2. The multi-rotor aerial vehicle of claim 1, wherein one or more of a plurality of anti-collision sensors are mounted on the spars.

3. The multi-rotor aerial vehicle of claim 1, further comprising one or more additional thrusters each statically coupled to the aerodynamic body such that an orientation of a thrust vector of the thruster is fixed relative to the aerodynamic body.

4. The multi-rotor aerial vehicle of claim 1, wherein each spar is pivotably coupled to the aerodynamic body, wherein the navigation device is configured to change an orientation of each spar relative to the aerodynamic body from a first configuration in a multi-axis hover mode to a second configuration in a forward flight mode.

5. The multi-rotor aerial vehicle of claim 1, wherein each of the plurality of spars has a lift surface.

6. The multi-rotor aerial vehicle of claim 1, wherein each spar comprises a plurality of aerodynamic portions in a telescoping arrangement, each aerodynamic portion having a lift surface.

7. The multi-rotor aerial vehicle of any one of claim 1, wherein the plurality of thrusters includes at least four thrusters and the plurality of spars include at least four spars.

8. The multi-rotor aerial vehicle of claim 7, wherein each thruster includes a counter-rotating second rotor.

9. The multi-rotor aerial vehicle of any one of claim 1, wherein the plurality of thrusters includes at least six thrusters and the plurality of spars includes at least six spars configured to operate with up to six degrees of freedom.

10. The multi-rotor aerial vehicle of claim 1, further comprising an imaging device controlled by a control system.

11. The multi-rotor aerial vehicle of claim 1, wherein the navigation device is further configured to track a target.

12. The multi-rotor aerial vehicle of claim 11, further comprising an imaging device controlled by the navigation device; and wherein the target is tracked based on information from the imaging device.

13. The multi-rotor aerial vehicle of claim 1, wherein the navigation device is configured to transmit a global positioning system (GPS) signal corresponding a current location of the multi-rotor aerial vehicle.

14. The multi-rotor aerial vehicle of claim 1, further comprising an antenna configured to receive a signal from a beacon.

15. The multi-rotor aerial vehicle of claim 1, wherein the rotors for the plurality of thrusters are oriented such the thrust vectors of at least six of the rotors are not parallel to each other in the multi-axis mode.

16. The multi-rotor aerial vehicle of claim 1 further comprising a range finding sensor, a LIDAR array, an ultrasound sensor, a radar assembly or an imaging sensor.

17. The multi-rotor aerial vehicle of claim 1, wherein the navigation device is configured to:
  operate the multi-rotor unmanned aerial vehicle in at least two modes including a hover mode and a forward flight mode;
  operate the rotors relative to the aerodynamic body during flight including an orientation corresponding to a hover mode and an orientation corresponding to the forward flight mode for one or more of the thrusters, wherein the rotors for the one or more of the thrusters are oriented such that the corresponding thrust vectors are oriented relative to each other in the hover flight mode;
  individually control an angular speed of each motor to independently control a position and an orientation of the unmanned aerial vehicle; and
  fly the multi-rotor unmanned aerial vehicle to a location based on a stored delivery path and a stored delivery location.

18. The multi-rotor aerial vehicle of claim 17, wherein a control system is further configured to:
  operate the multi-rotor unmanned aerial vehicle in a parallel rotor axis hover flight mode; and
  change an orientation each rotor relative to the aerodynamic body during flight between an orientation corresponding to the hover flight mode, an orientation corresponding to the forward flight mode, and an orientation corresponding to the parallel axis hover mode, wherein the plurality of rotors are oriented such that the corresponding thrust vectors are substantially parallel to each other and oriented to produce thrust in a vertical direction relative to the aerodynamic body.

19. The multi-rotor aerial vehicle of claim 17, wherein for four or more of the thrusters, a coupling between the thruster and the aerodynamic body is configured such that an orientation of the rotor of the thruster relative to the aerodynamic body can be changed during flight thereby changing an orientation of the corresponding thrust vector relative to the aerodynamic body during flight for the four or more of the thrusters,
  wherein the navigation device is configured to change the orientation of the rotor relative to the aerodynamic body during flight between an orientation corresponding to the multi-axis mode and an orientation corresponding to the forward flight mode for four or more of the thrusters.

20. The multi-rotor aerial vehicle of claim 1, wherein the at least one thruster is rotatable around the at least two non-parallel axes during flight.

21. The multi-rotor aerial vehicle of claim 1, wherein the at least one thruster is one of a set of multiple thrusters each of which is rotatable, relative to its respective spar, around at least two respective non-parallel axes, so that the thruster's thrust vector is rotatable during flight relative to the respective spar around the two respective non-parallel axes; and the navigation device is configured to:
  rotate the thrust vector of each thruster in the set relative to the respective spar around any one of the two respective non-parallel axes.

22. The multi-rotor aerial vehicle of claim 21, wherein each of the set of multiple thrusters is rotatable around the at least two respective non-parallel axes during flight.

23. The multi-rotor aerial vehicle of claim 1, wherein rotation around one of the two non-parallel axes changes the at least one thruster's dihedral angle, and rotation around the other one of the two non-parallel axes change the at least on thruster's twist angle around the respective spar's longitudinal axis.

24. A method for using the multi-rotor unmanned aerial vehicle of claim 1, the method comprising:
  receiving instructions by the navigation device to rotate the at least one thruster around at least one of the two axes;
  in response to the instructions, operating the at least one thruster by the navigation device to rotate the at least one thruster's thrust vector;
  wherein the instructions are responsive to wind conditions during flight.

25. A method for using the multi-rotor unmanned aerial vehicle of claim 1, the method comprising:
  placing the package into the bay;
  receiving instructions by the navigation device to rotate the at least one thruster around at least one of the two axes;
  operating the at least one thruster by the navigation device to rotate the at least one thruster's thrust vector;
  wherein the instructions are responsive to weight distribution of the aerial vehicle with the package.

26. A multi-rotor unmanned aerial vehicle for package delivery comprising:
  a body comprising a bay for holding a package to be delivered;
  a plurality of spatially separated thrusters coupled to the body, each thruster comprising a rotor coupled to a motor, each thruster configured to produce thrust along a corresponding thrust vector, wherein for one or more of the thrusters;
  a plurality of spars, wherein each of the plurality of thrusters is mounted on one of the plurality of spars, wherein at least one thruster is rotatable relative to its respective spar to adjust the thruster's dihedral angle and to adjust the thruster's twist angle around the respective spar's longitudinal axis; and
  a navigation device onboard the aerial vehicle configured to:
    receive instructions, and operate the multi-rotor unmanned aerial vehicle in response to the instructions to rotate the at least one thruster to adjust any one of the dihedral angle and the twist angle.

27. The multi-rotor aerial vehicle of claim 26, wherein the dihedral and twist angles are adjustable during flight.

28. The multi-rotor aerial vehicle of claim 26, wherein the at least one thruster is one of a set of multiple thrusters each of which is rotatable, relative to its respective spar, to adjust the thruster's dihedral angle relative to the body and the thruster's twist angle around the respective spar's longitudinal axis; and
  the navigation device is configured to:
    rotate the thrust vector of each thruster in the set relative to the respective spar to adjust the thruster's dihedral and twist angles.

29. The multi-rotor aerial vehicle of claim 28, wherein each of the set of multiple thrusters is rotatable to adjust the thruster's dihedral and twist angles during flight.

30. A method for using the multi-rotor unmanned aerial vehicle of claim 26, the method comprising:
- receiving instructions by the navigation device to rotate the at least one thruster to adjust at least one of the dihedral and twist angles;
- in response to the instructions, operating the at least one thruster by the navigation device to adjust at least one of the dihedral and twist angles;
- wherein the instructions are responsive to wind conditions during flight.

31. A method for using the multi-rotor unmanned aerial vehicle of claim 26, the method comprising:
- placing the package into the bay;
- receiving instructions by the navigation device to rotate the at least one thruster to adjust at least one of the dihedral and twist angles;
- in response to the instructions, operating the at least one thruster by the navigation device to adjust at least one of the dihedral and twist angles;
- wherein the instructions are responsive to weight distribution of the aerial vehicle with the package.

* * * * *